United States Patent [19]

Smith

[11] Patent Number: 5,309,344
[45] Date of Patent: May 3, 1994

[54] DUAL ACTIVE CLAMP, ZERO VOLTAGE SWITCHING POWER CONVERTER

[75] Inventor: David A. Smith, Kowloon, Hong Kong

[73] Assignee: Astec International, Ltd., Hong Kong, Hong Kong

[21] Appl. No.: 943,008

[22] Filed: Sep. 9, 1992

Related U.S. Application Data

[63] Continuation-in-part of Ser. No. 668,587, Mar. 13, 1991, Pat. No. 5,173,846.

[51] Int. Cl.$^5$ .......................................... H02M 3/335
[52] U.S. Cl. ..................................... 363/20; 363/65; 363/71; 363/97; 363/131
[58] Field of Search ....................... 363/20, 21, 65, 71, 363/86, 89, 95, 97, 131

[56] References Cited

U.S. PATENT DOCUMENTS

| | | | |
|---|---|---|---|
| 4,417,153 | 11/1983 | Onodera et al. | 363/20 |
| 4,441,146 | 4/1984 | Vianciarelli | 363/20 |
| 4,559,590 | 12/1985 | Davidson | 363/21 |
| 4,618,919 | 10/1986 | Martin | 363/21 |
| 4,635,179 | 1/1987 | Carsten | 363/70 |
| 4,669,039 | 5/1987 | Brakus | 363/71 |
| 4,809,148 | 2/1989 | Barn | 363/131 |
| 4,870,554 | 9/1989 | Smith | 363/131 |
| 4,870,555 | 9/1989 | White | 363/21 |
| 4,959,764 | 9/1990 | Bassett | 363/20 |
| 4,975,821 | 12/1990 | Lethallier | 363/97 |
| 5,001,620 | 3/1991 | Smith | 363/89 |
| 5,126,931 | 6/1992 | Jitaru | 363/21 |
| 5,173,846 | 12/1992 | Smith | 363/20 |
| 5,229,928 | 7/1993 | Karlsson et al. | 363/65 |

FOREIGN PATENT DOCUMENTS 60-96175 (A) 5/1985 Japan .......................... H02M 3/28

OTHER PUBLICATIONS

Carsten, "High Power SMPS Require Intrinsic Reliability," *Proceedings of the PCI*, Mar. 1982, pp. 456–471.
Carsten, "Design Tricks, Techniques and Tribulations at High Conversion Frequencies," *Proceedings of the HPFC*, Apr. 1987, pp. 139–152.
UNITRODE Integrated Circuits Corp., datasheet for the "UC1825 High Speed PWM Controller," *Linear Integrated Circuits Data and Applications Handbook*, Apr. 1990, pp. 4-120 through 4-126.
ASTEC Semiconductor, datasheet for the "ASTEC AS3842/3/4/5 Current Mode PWM Controller," Sep. 1990, pp. 1–12.
UNITRODE Integrated Circuits Corp., datasheet for the "UC1842/3/4/5 Current Mode PWM Controller," *Linear Integrated Circuits Databook*, Dec. 1987, pp. 3-107 to 3-112.
UNITRODE Inegrated Circuits Corp., application notes for "UC3842/3/4/5 Provides Low-Cost Current-Mode Control" and UC3842/3/4/5 Series of Current-Mode PWM IC's, *Linear Integrated Circuits Databook*, Dec. 1987, pp. 9-105 to 9-118.

*Primary Examiner*—Jeffrey Sterrett
*Attorney, Agent, or Firm*—McCubbrey, Bartels, & Ward

[57] ABSTRACT

A dual active clamp (DAC) converter comprising two active-clamp, zero-voltage switching (ZVS) converters for converting electrical power from an input source to an output load is described. The two active-clamp ZVS converters are coupled in parallel to one another at their respective inputs and outputs, and are operated in a manner which reduces the overall input and output ripple currents of the DAC converter, which reduces the EMI emissions of the DAC converter. Each of the active-clamp ZVS converters achieves zero-voltage switching on its primary switch means, which also improves EMI emissions. Each active-clamp ZVS converter includes a transformer having a primary winding and a secondary winding, the secondary winding being coupled to the output load and the primary switch means being coupled between the primary winding and a voltage source, and an active clamp circuit comprising a series combination of a storage capacitor and a first switch means. The active clamp is coupled to the transformer to capture energy released from the transformer at specific times, which is then used to reset the transformer's core and to create a zero voltage switching condition across the primary switch means. A second switch means is connected in series with the secondary winding of the transformer and is operated to prevent the loading effects of the secondary from interrupting the creation of the zero-voltage switching condition.

29 Claims, 17 Drawing Sheets

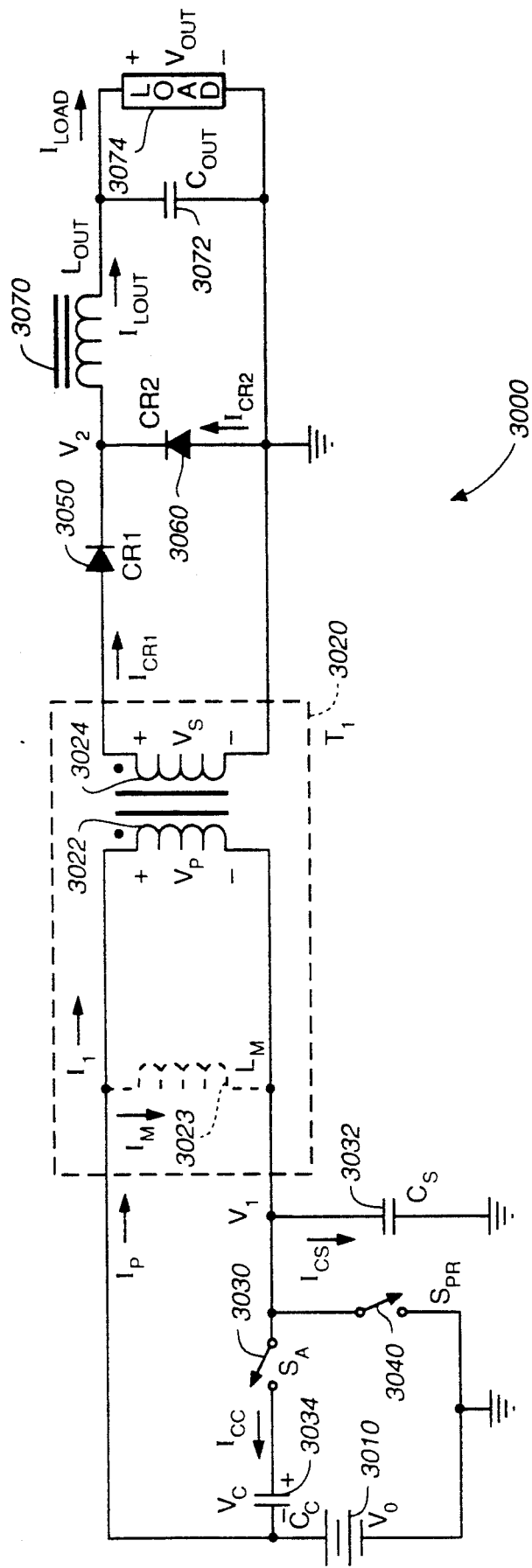
FIG._1
*(PRIOR ART)*

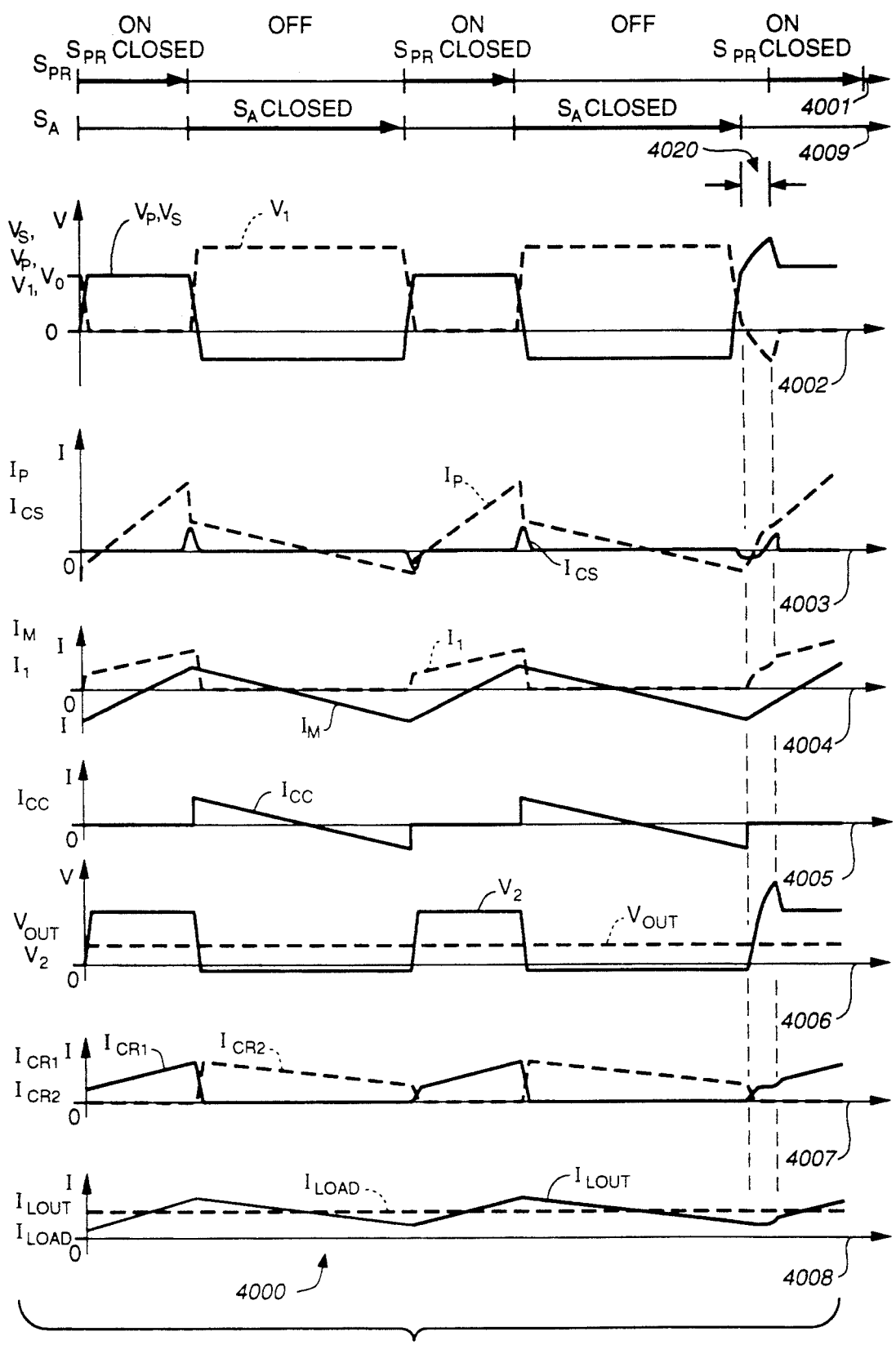
FIG._2

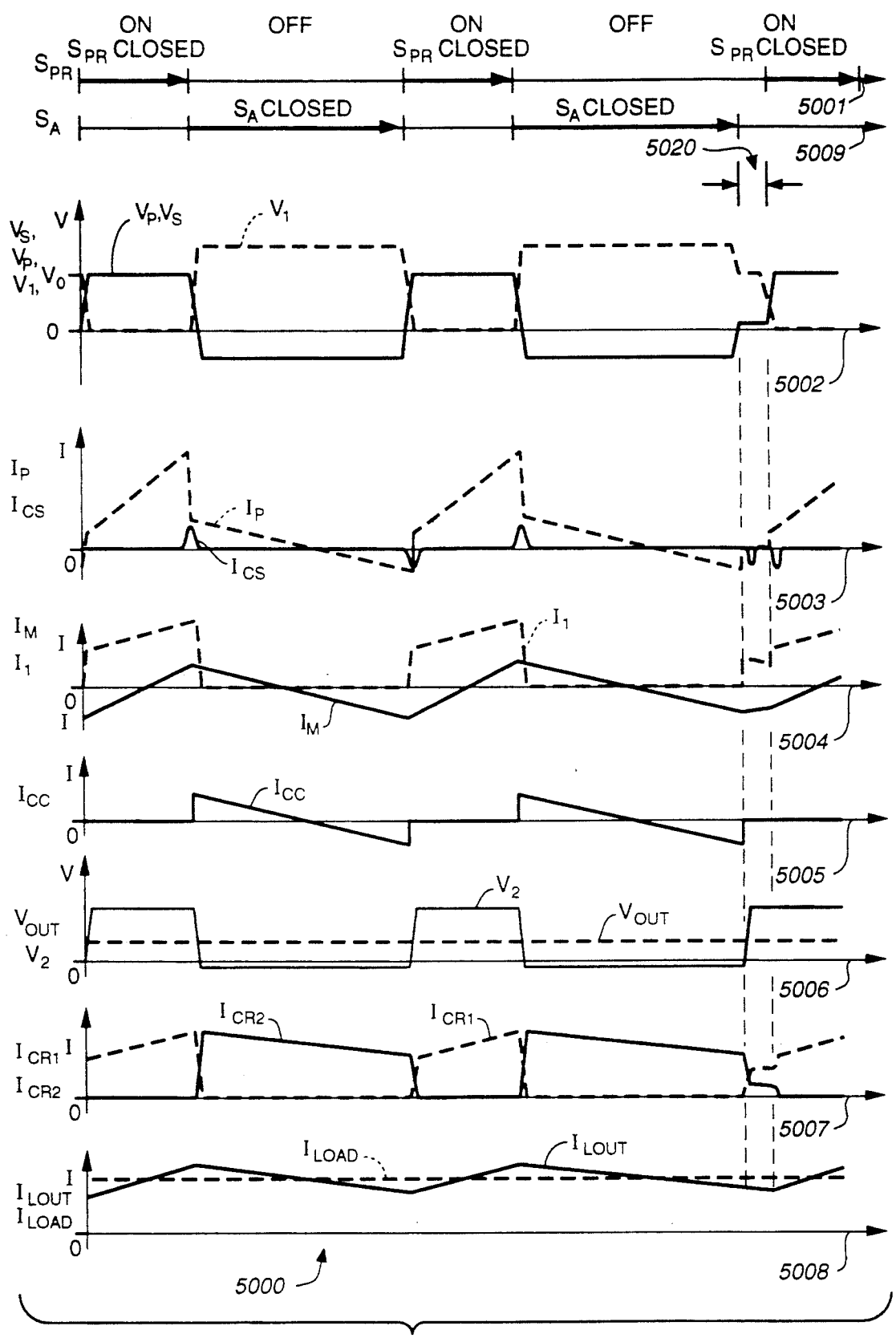
FIG._3

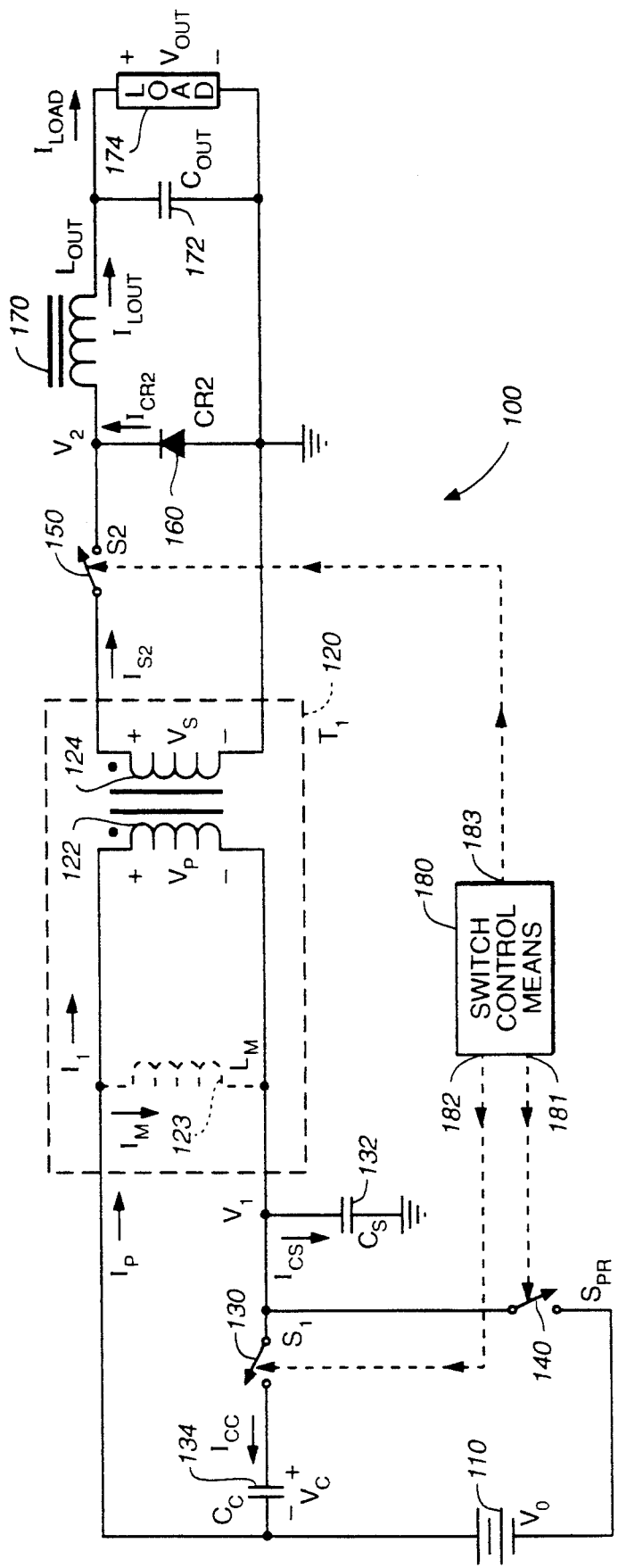
FIG._4

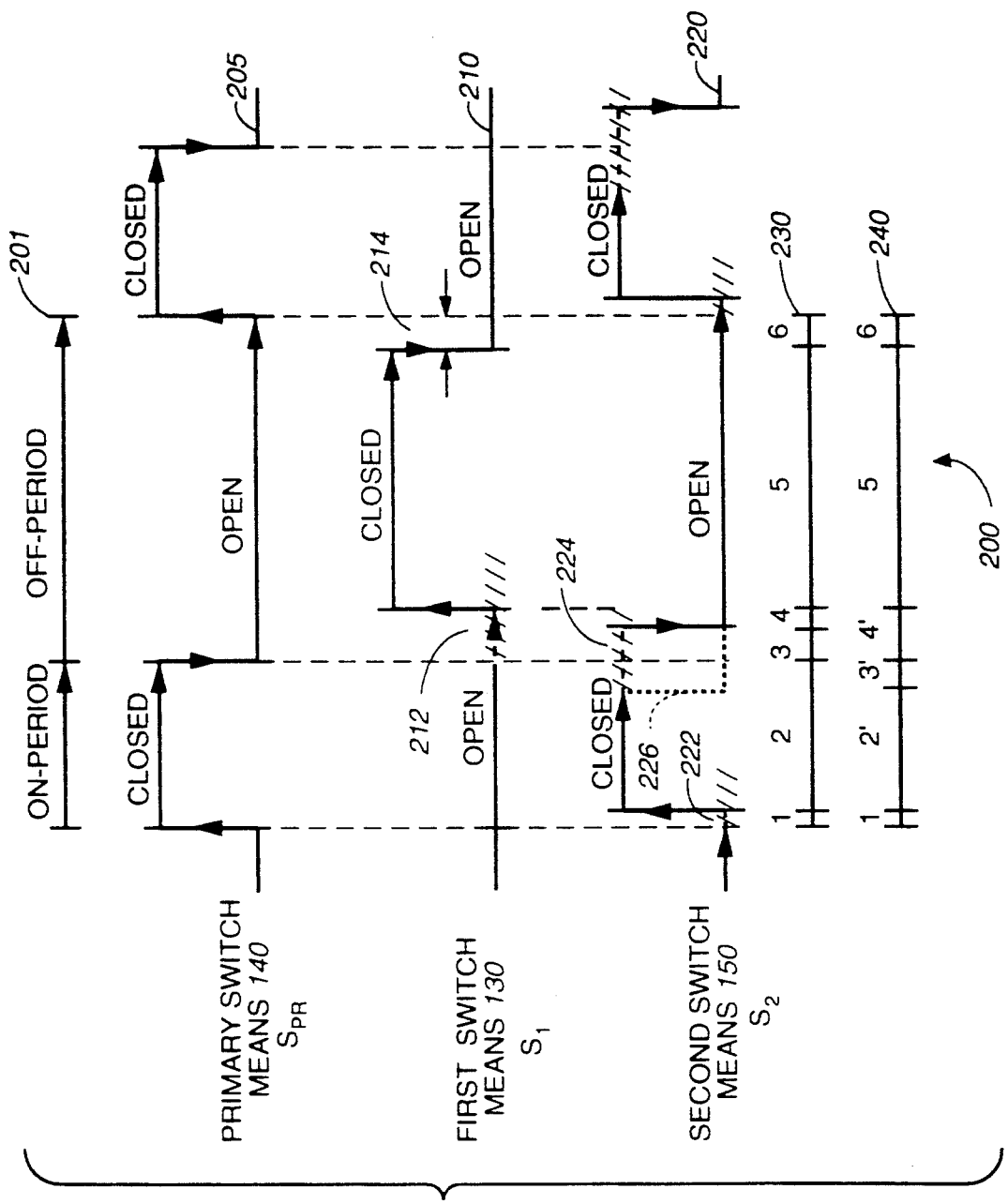
FIG._5

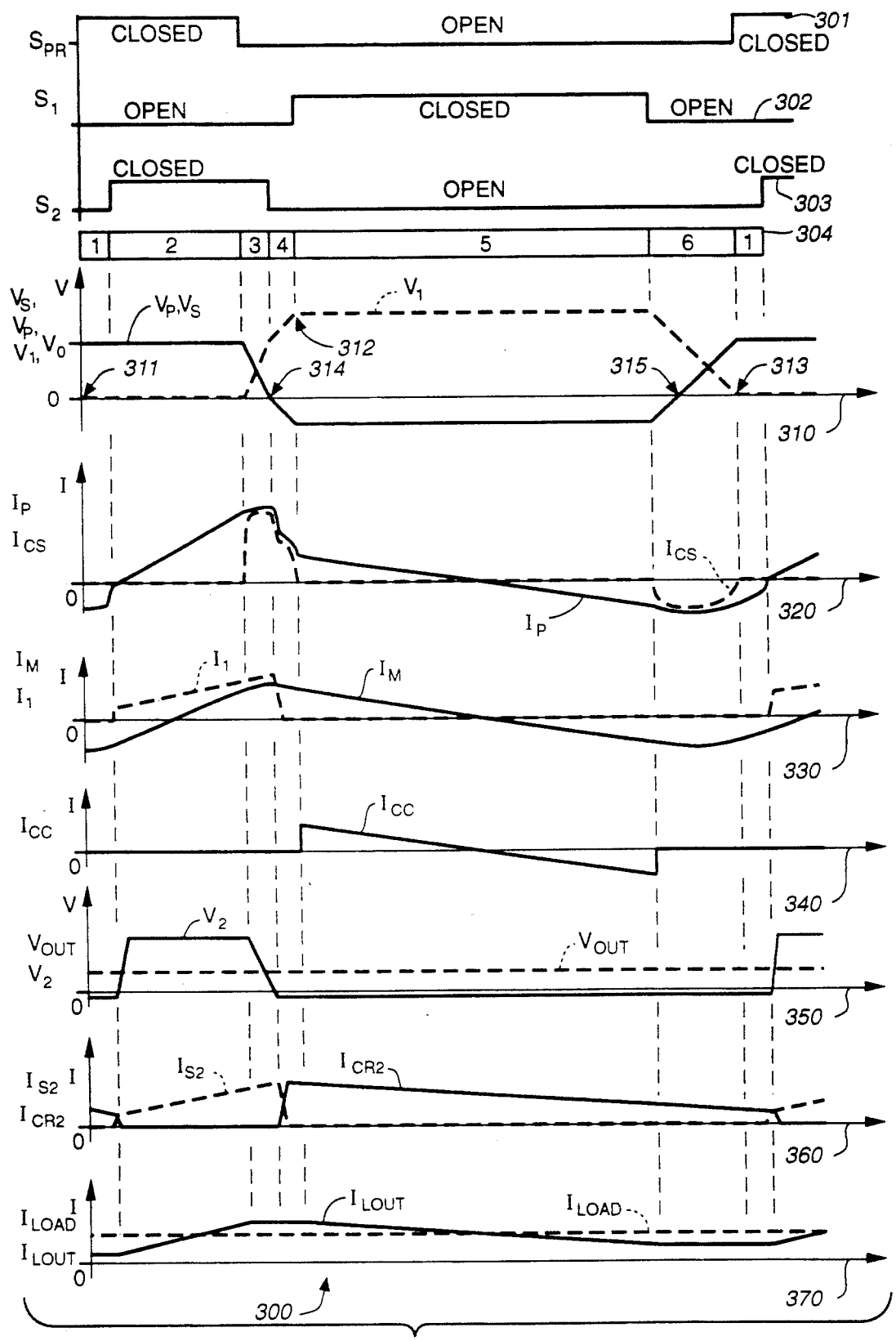
FIG._6

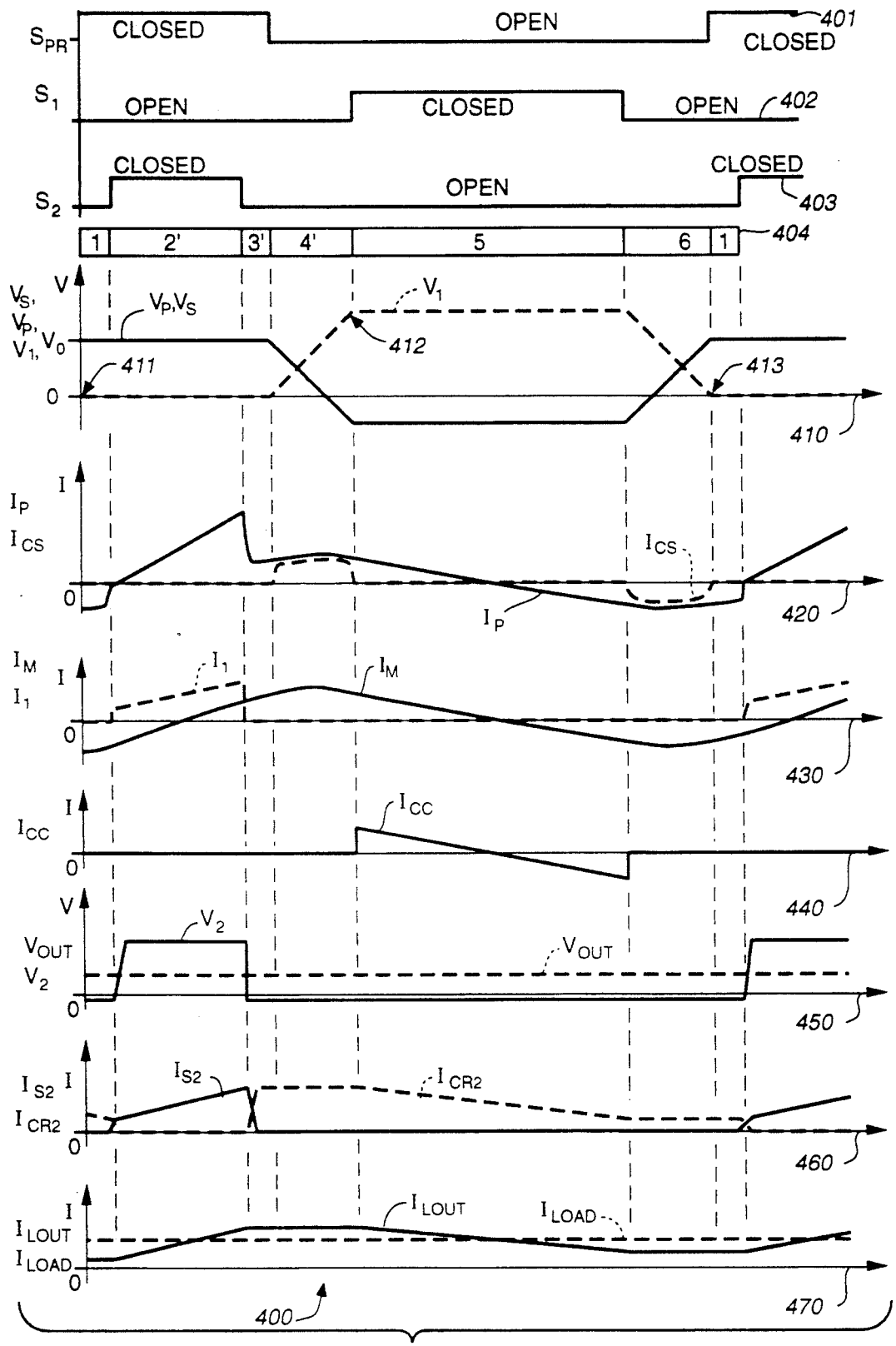
FIG._7

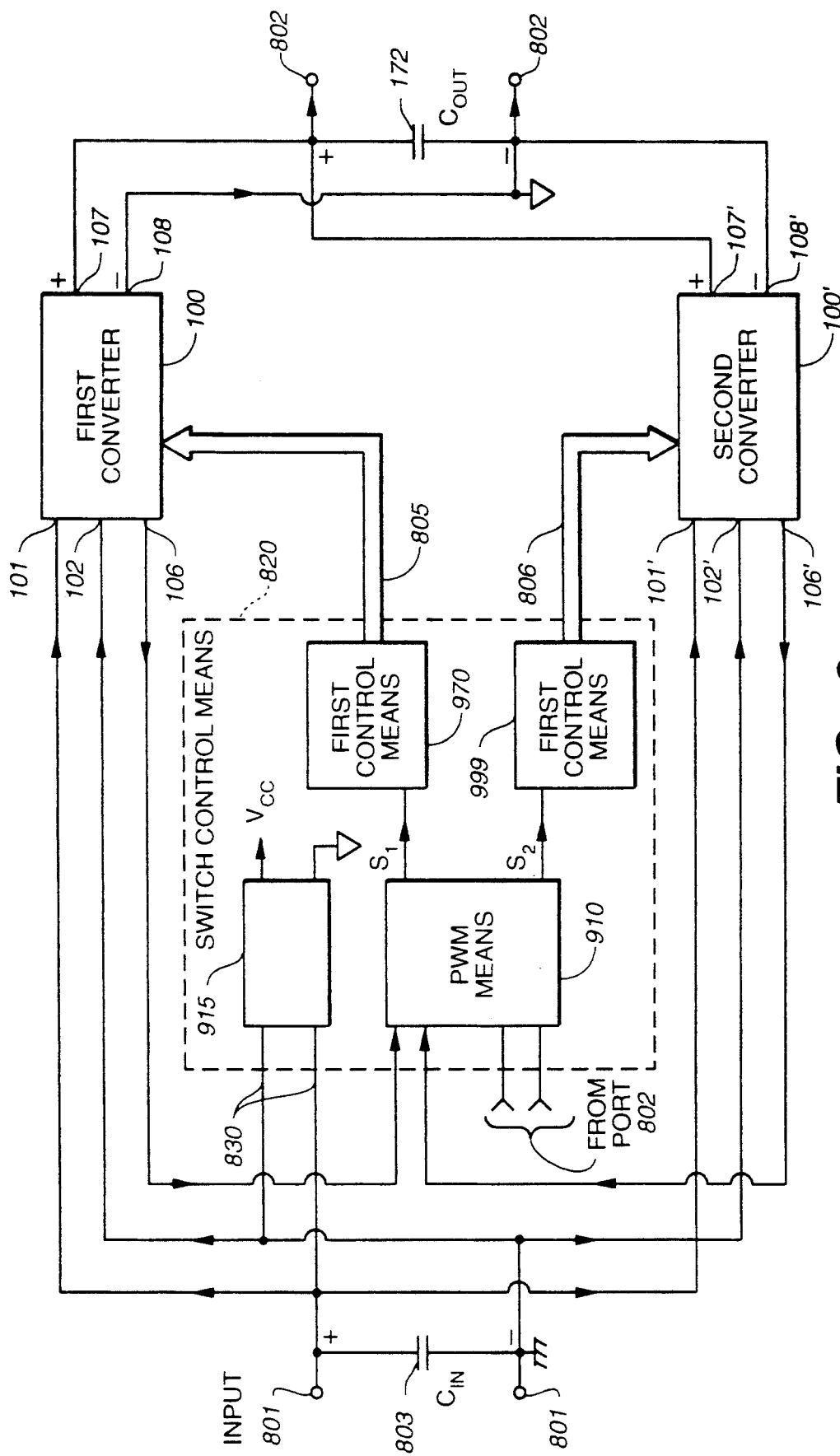
FIG._8

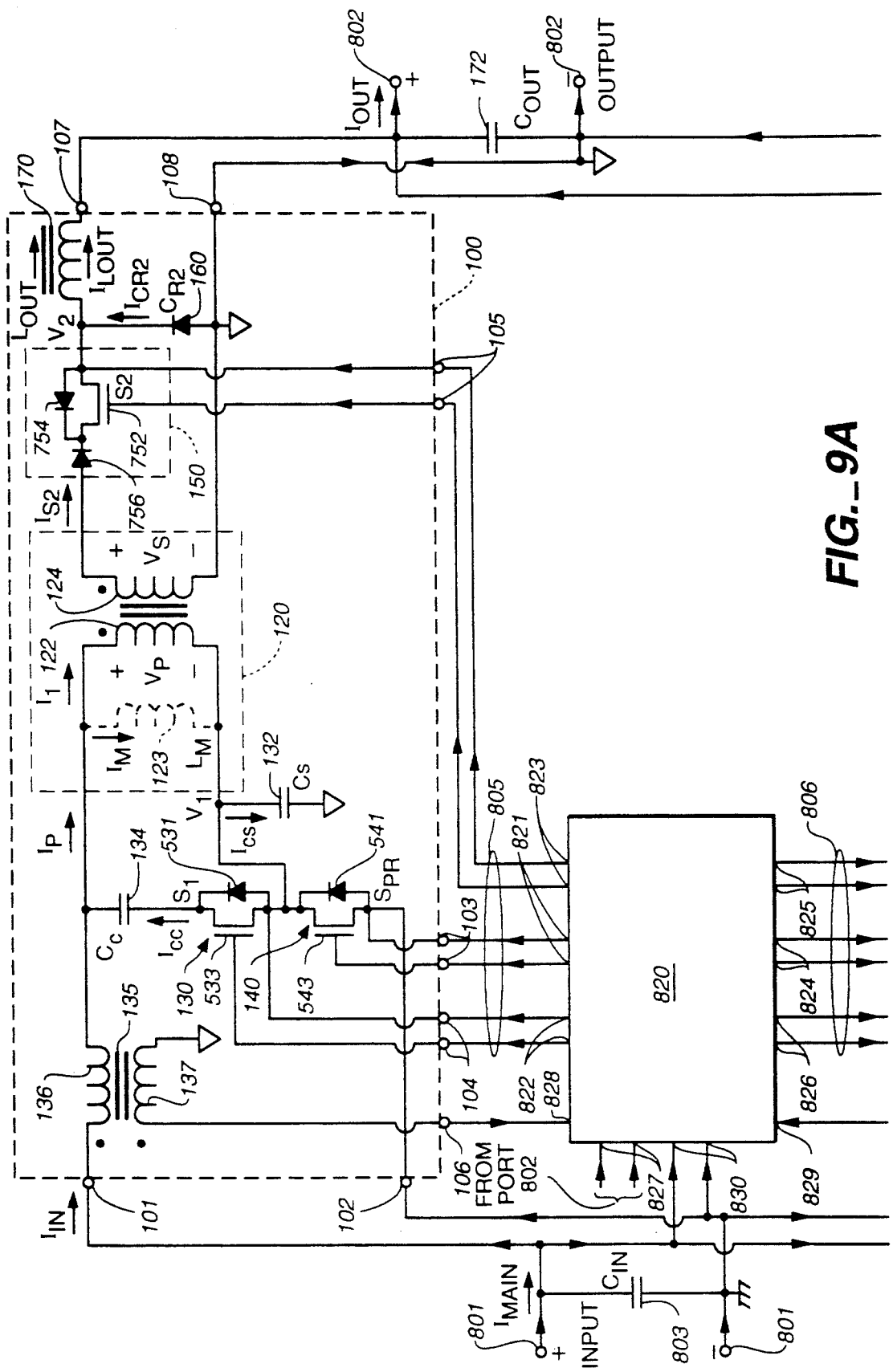
FIG._9A

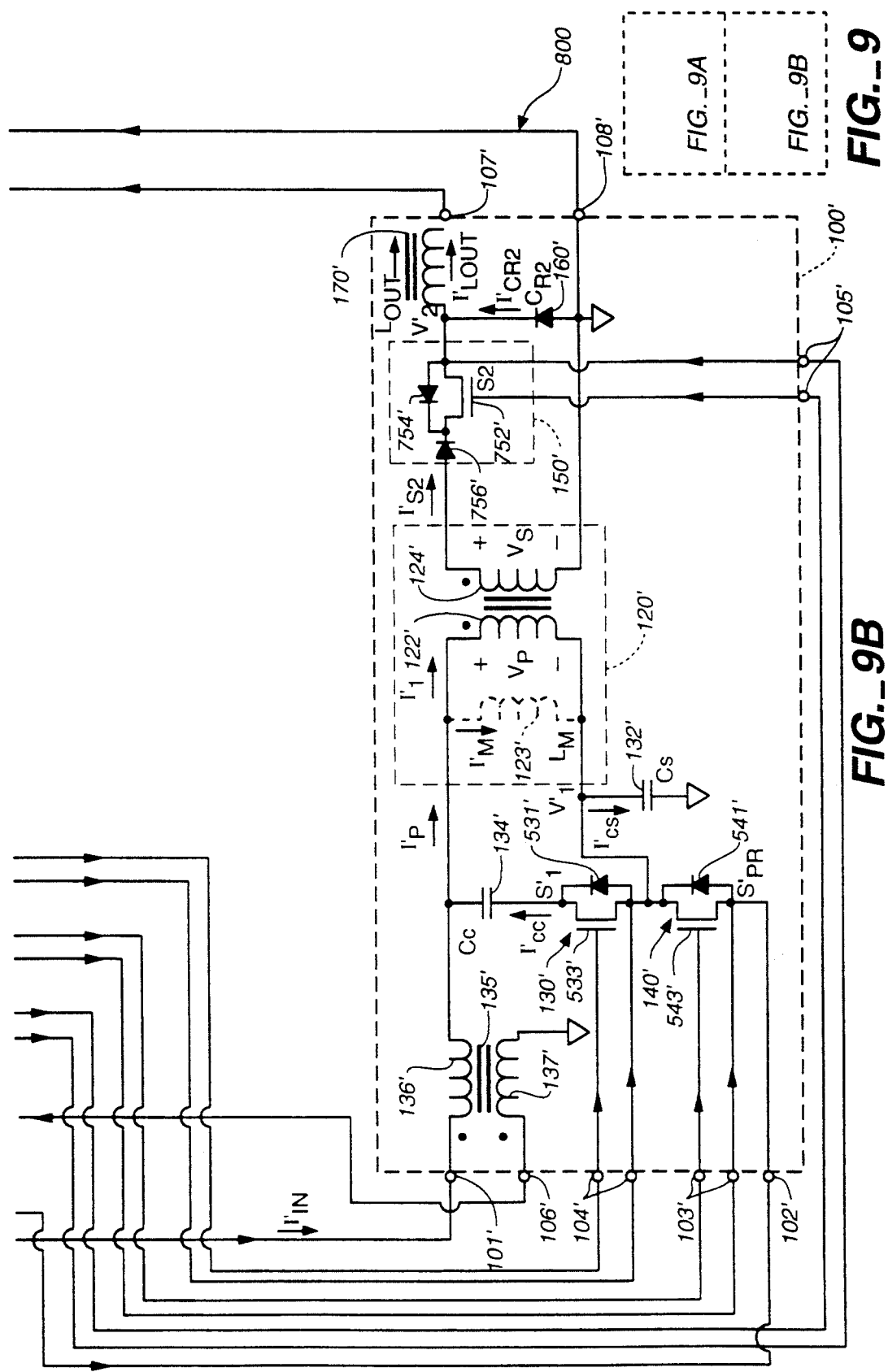

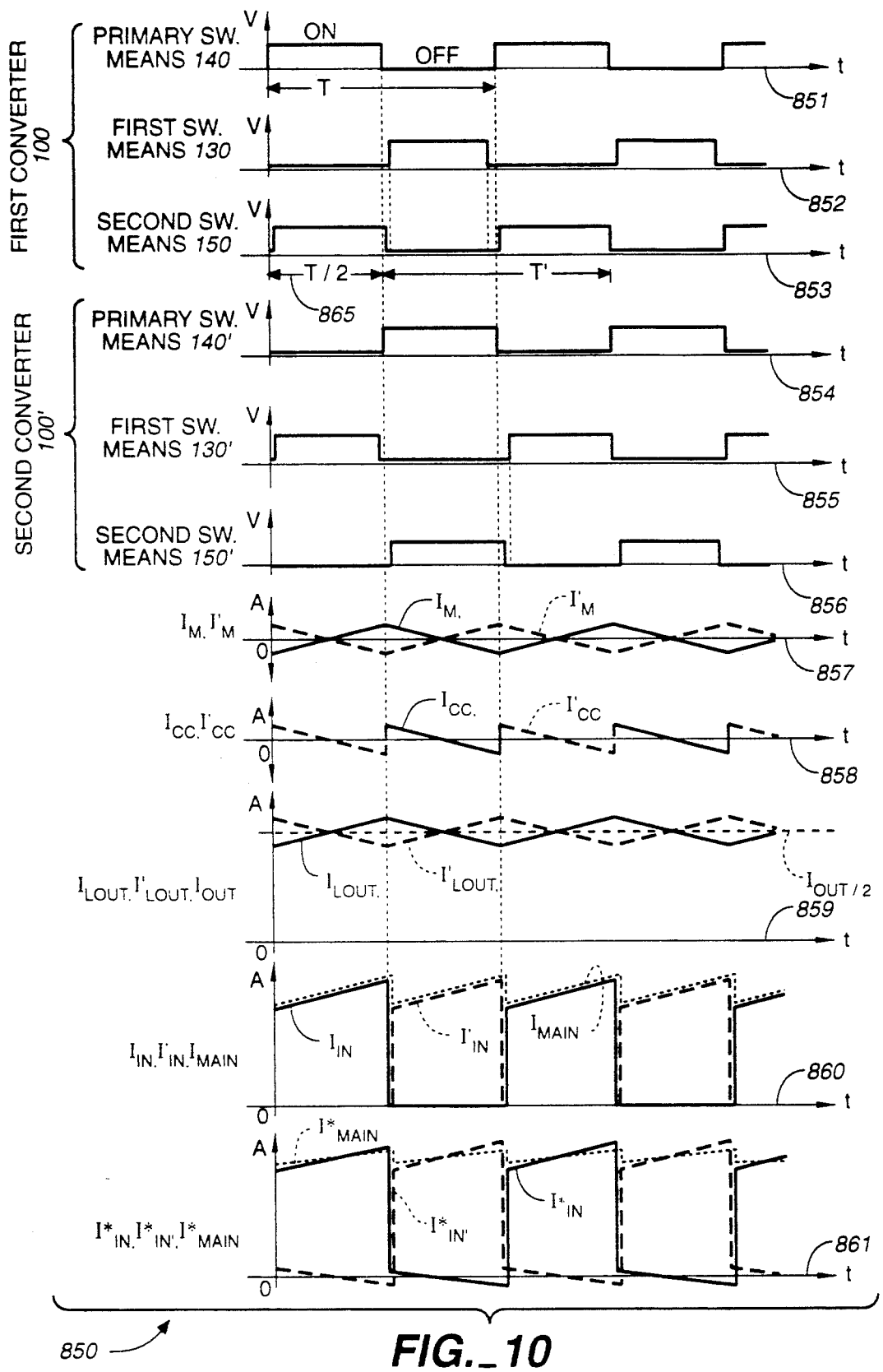
FIG._10

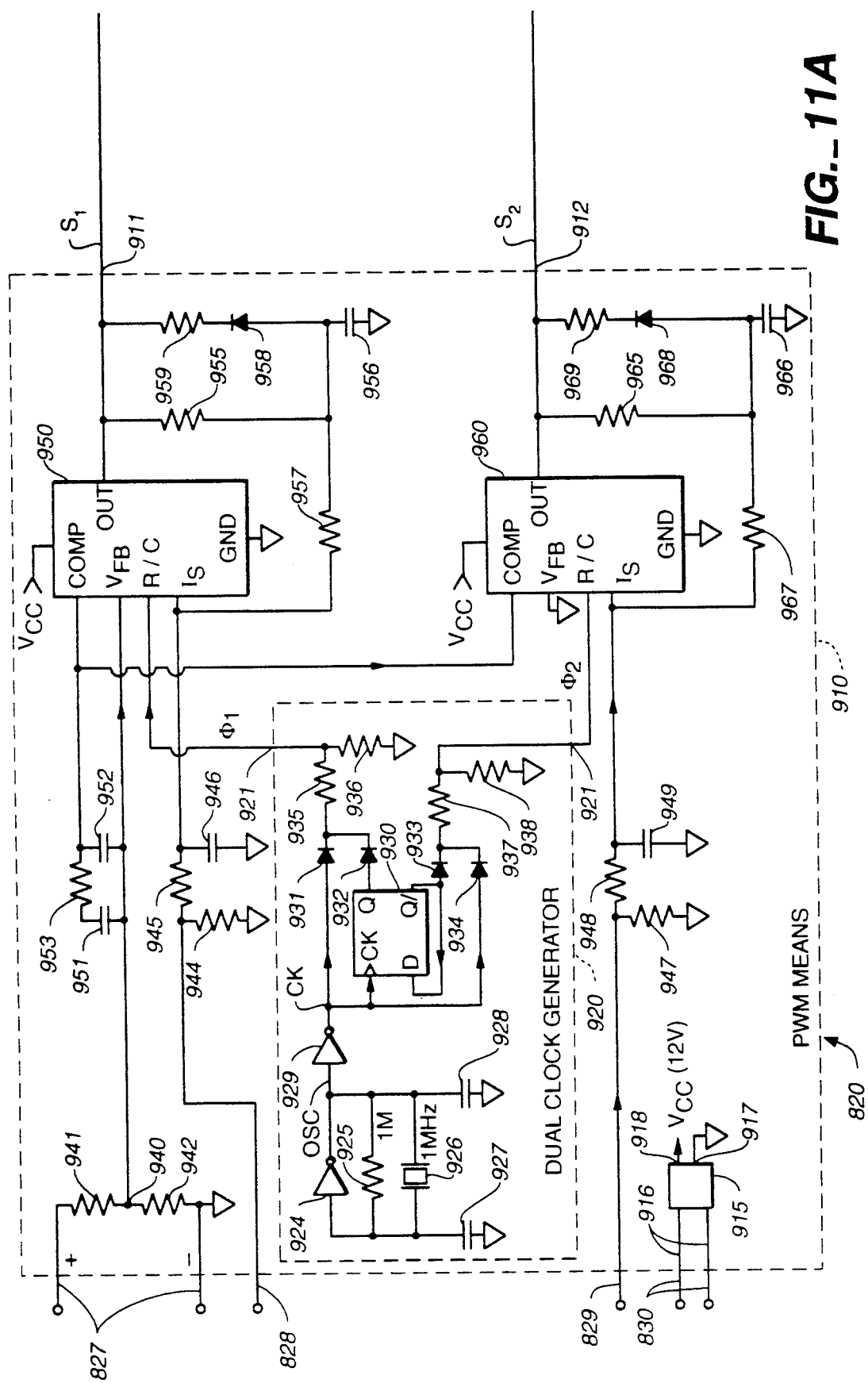
FIG._11A

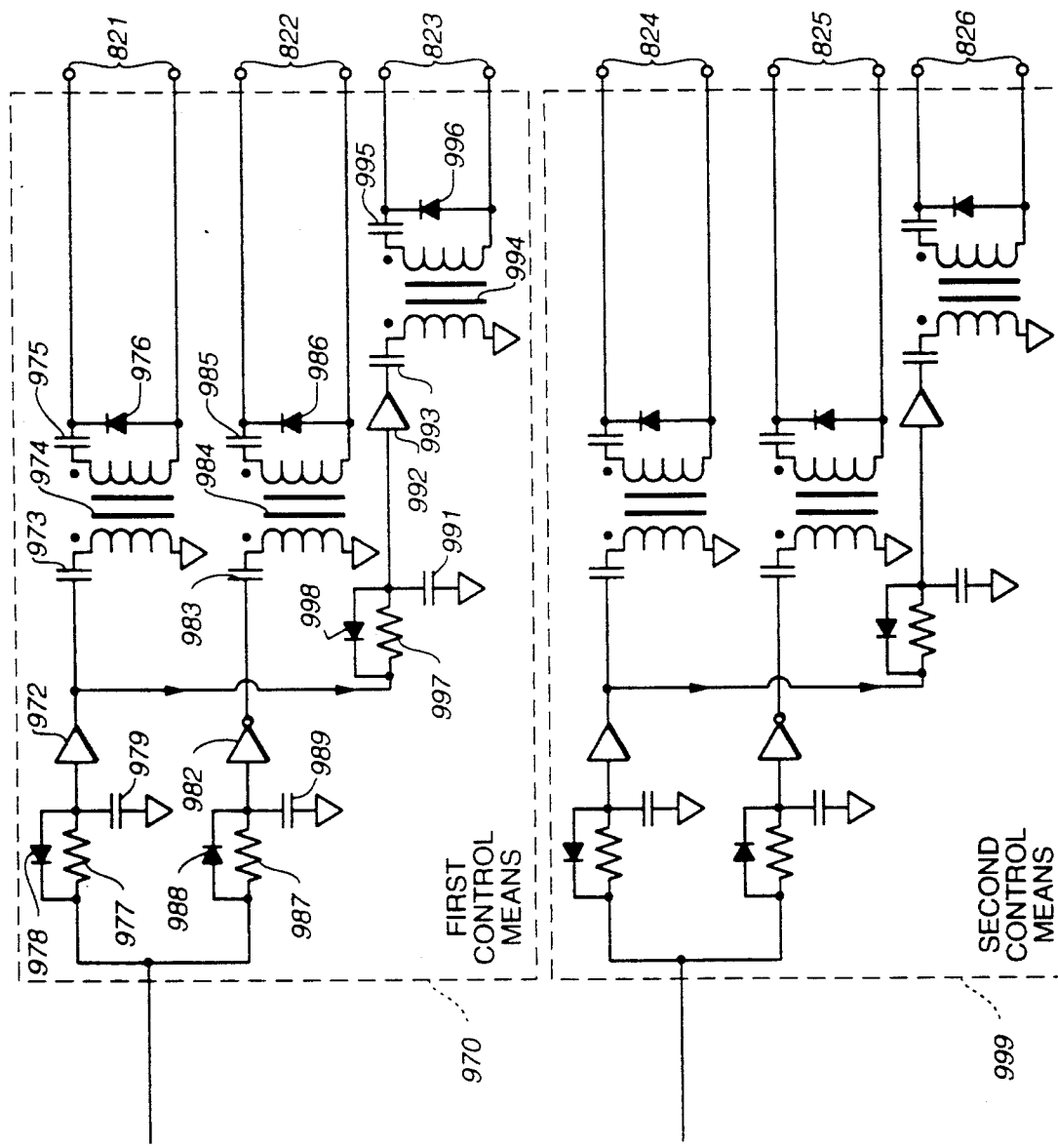

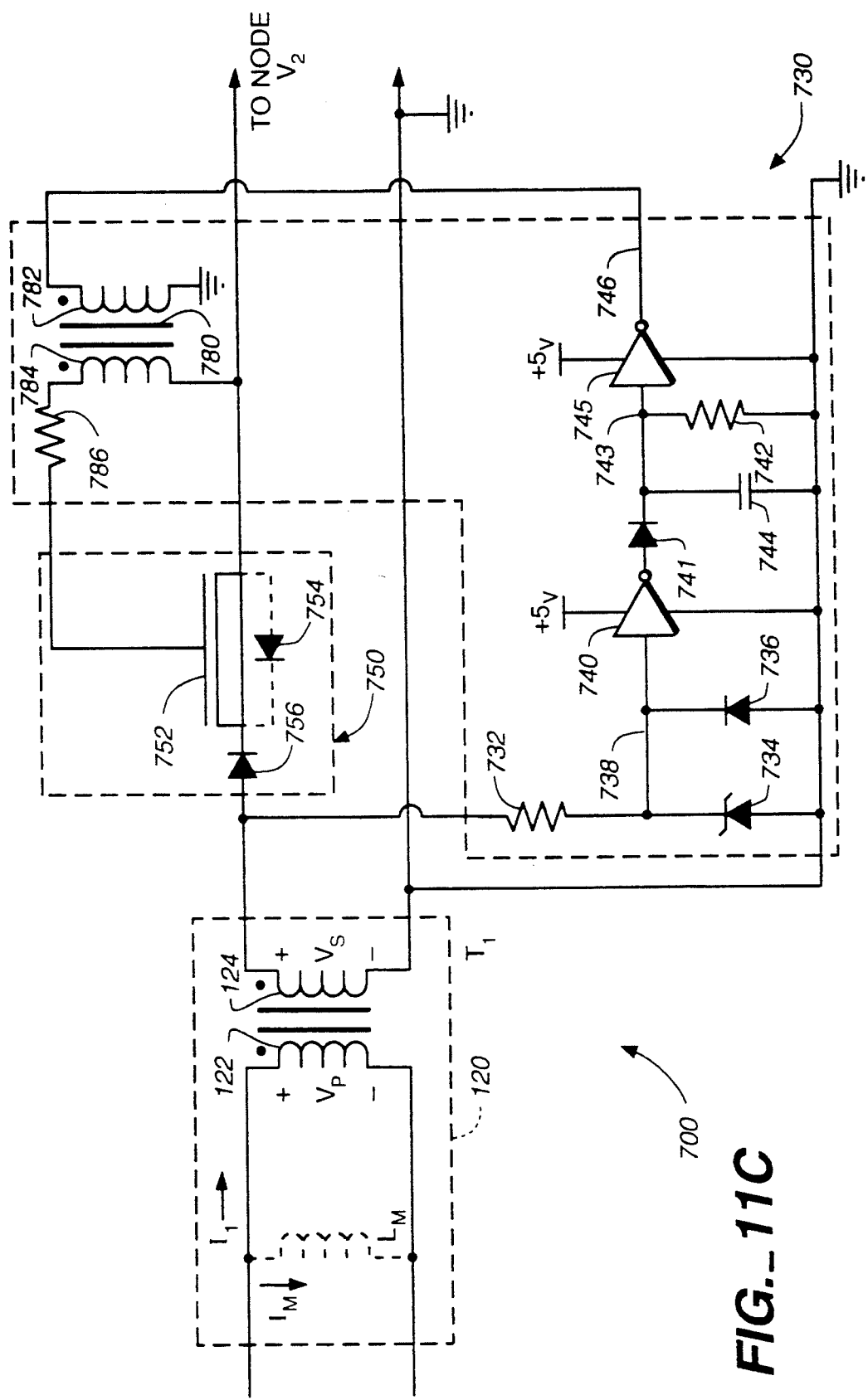
FIG._11C

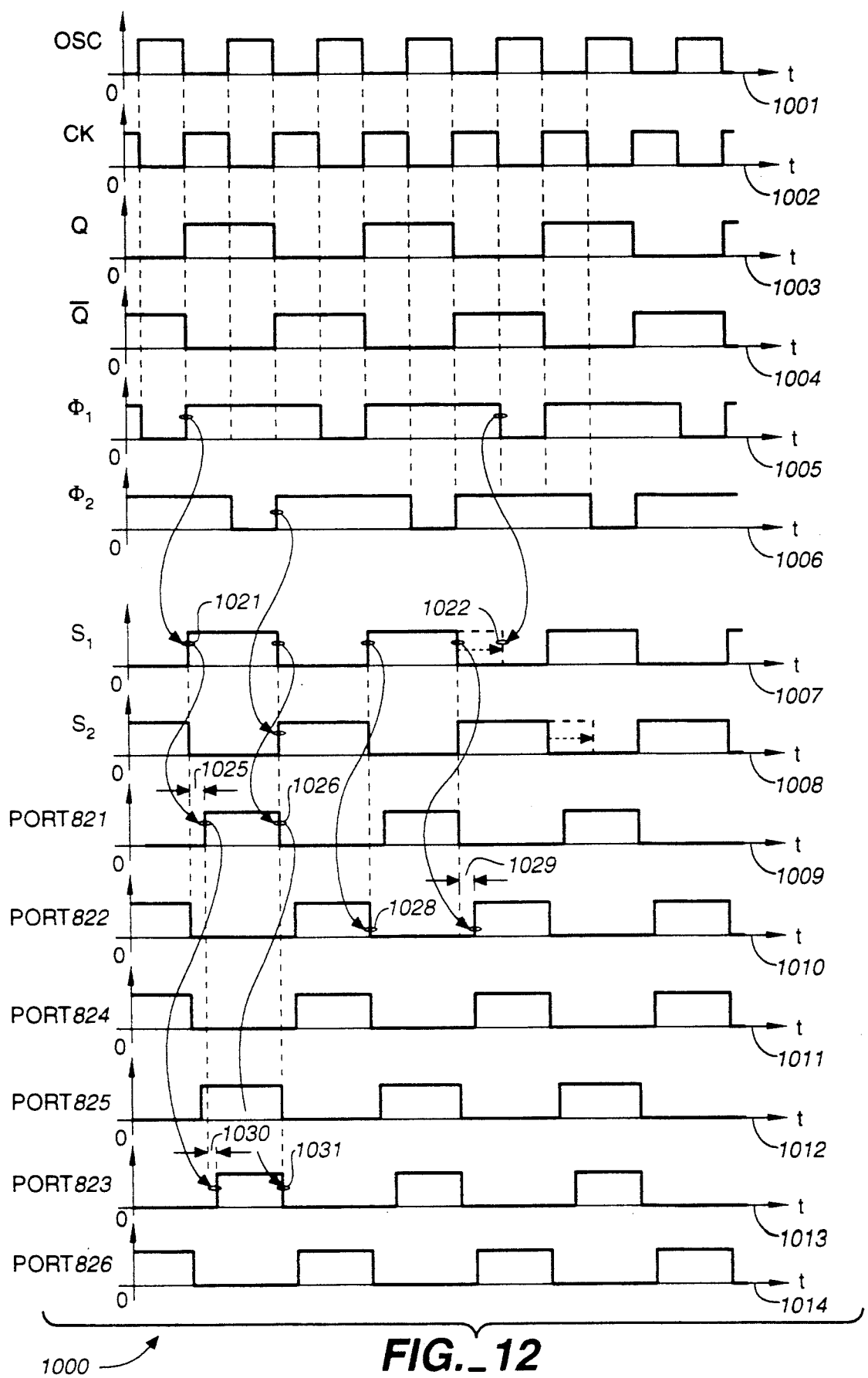
FIG._12

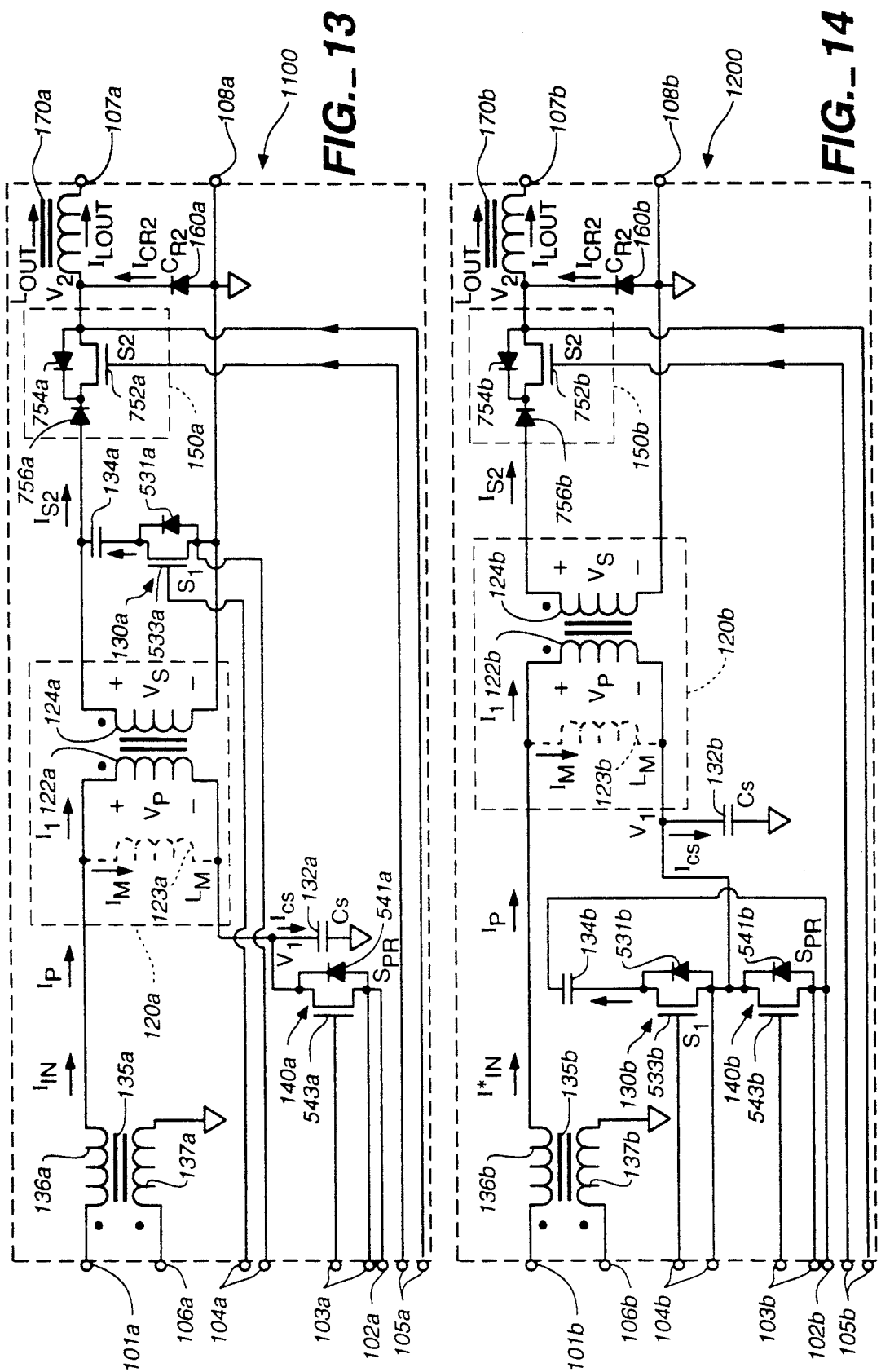

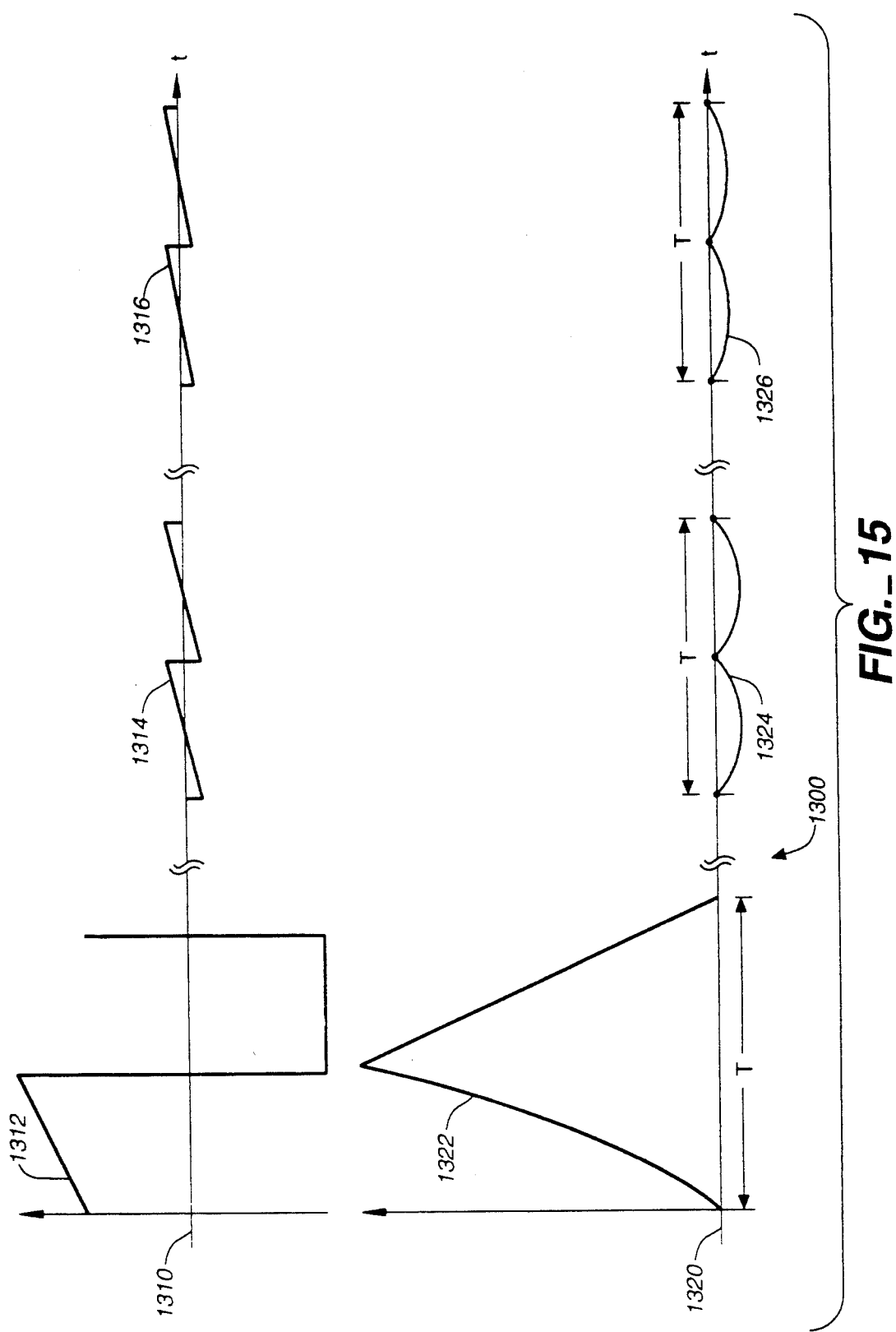
FIG._15

DUAL ACTIVE CLAMP, ZERO VOLTAGE SWITCHING POWER CONVERTER

This application is a continuation-in-part of U.S. patent application Ser. No. 07/668,587, filed Mar. 13, 1991 for Zero Voltage Switching Power Converter now U.S. Pat. No. 5,173,846.

FIELD OF THE INVENTION

The present invention relates to DC-to-DC switching power converters which transfer power from a source supply at a given voltage potential to a destination load at a different voltage potential. In particular, the invention relates to the control of energy in transformers of DC-to-DC forward converters.

BACKGROUND OF THE INVENTION

The forward converter is a common circuit topology used to transform electric energy from a source at a given potential to a destination load at a different potential. Typically, the forward converter requires fewer components than other converter topologies and is smaller and lighter. The standard forward converter comprises a transformer having a primary winding, a secondary winding, and a third winding. The primary winding is coupled to a source of power, usually DC power, via a primary switch and the secondary winding is coupled to a load via two commutating diodes. The primary switch generally comprises a semiconductor switching device such as a field-effect transistor (FET) or a bipolar-junction transistor (BJT). When the primary winding is energized by the closing of the primary switch, energy is immediately transferred to the secondary winding, hence the name forward converter. The third winding is coupled to the power source via a rectifying diode and serves to reset the ferromagnetic core of the transformer when the primary switch is opened. The transformer's third winding provides a current path for discharging the transformer's magnetizing current, which is created when the primary winding is energized.

The standard forward converter is particularly well suited for low and medium power-conversion applications. However, it is not as efficient as other topologies in converting power, particularly in low power applications. The following factors contribute to the lower efficiency of the forward converter.

First, the core-reset operation in the forward converter using the third winding is not as efficient as other core-reset operations in other converter topologies. The rectifier in series with the third winding causes an amount of power dissipation and, more importantly, the addition of a third winding to the transformer increases the transformer's dimensions and thereby reduces the transformer efficiency by increasing the core losses, the resistance of each winding, and the self inductance of each winding.

Second, the forward converter only uses the first quadrant of the transformer's core B-H characteristic, leaving the third quadrant unused. As a result, the size of the transformer must be increased to enlarge the operating range of the first quadrant at the expense of higher core losses and higher winding resistances.

Third, the power dissipation in the primary switch when it is switched on (a turn-on event) is greater than the power dissipation in comparable switches in other topologies. The power dissipation in a switch during a switching event depends upon the product of the voltage across the switch and the current through the switch. In a forward converter, the voltage difference across the primary switch changes from a value equal to the input voltage of the power source to a value near zero when the switch is closed. Additionally, the primary current begins immediately since the forward converter provides current to the secondary winding immediately upon energizing the primary winding. The high input voltage and the instantaneous current flow in the primary switch leads to a high power dissipation loss in the primary switch. The power dissipation losses during switching events become more significant as the switching frequency of the forward converter is increased, as is done to improve the conversion efficiency of the converter's transformer. The direct power dissipation losses become more significant as the switching frequency increases because the duration of each switching event comprises a larger fraction of each switching cycle duration as the switching frequency increases.

The above first and second factors have been addressed in U.S. Pat. No. 4,441,146 issued to Vinciarelli. In U.S. Pat. No. 4,441,146, the third winding is eliminated and replaced by a series combination of a storage capacitor and an auxiliary switch coupled across either the primary or secondary winding. The auxiliary switch is operated counter to the primary switch, i.e., the auxiliary switch is open when the primary switch is closed and closed when the primary switch is open. When the primary switch is open, the storage capacitor and auxiliary switch operate to capture and store the transformer's magnetizing current, which was built up when the primary winding was energized, and then to return the magnetizing current to the transformer in a manner which resets the transformer's core. The elimination of the third winding addresses the first above efficiency factor. Additionally, the returning of the magnetizing current to the transformer creates a condition where the first and third quadrants of the transformer core's B-H characteristic are utilized, thereby addressing the second above efficiency factor. This converter is often referred to as an active clamp forward converter because the series combination of the auxiliary switch and storage capacitor acts as a voltage clamp which is actively (i.e., selectively) coupled to the transformer's windings.

The third efficiency factor, however, is not addressed by the prior art. In this respect, the present invention provides improvements to the basic forward-converter topology by reducing the power dissipation during switching events, thereby increasing the power-conversion efficiency of the basic forward-converter topology.

Another drawback of the standard forward converter, as well as the active-clamp forward converter, is the problem of excessive "switching noise" on its input current line. This noise on the input current is primarily due to the "chopping" of the primary circuit current. The ripple noise has thus far prevented the use of the standard forward converter and active clamp forward converter in low noise applications, such as 48 VDC-to-5 VDC supplies for telephone exchange equipment. These ripple currents tend to create high-frequency electromagnetic interference (EMI), which can disturb the operation of nearby digital and communication equipment. Many countries are increasingly regulating the amount of EMI that can be generated by power supplies, forcing power supply manufactures to seek more complex, and often more expensive, power supply designs. The forward converter and active-clamp forward converter arts have attempted to correct the switching noise problem by incorporating large filtering capacitors at the inputs of these converters. However, this greatly increases the size of the converters, and somewhat decreases the efficiency of the converters since a large ripple current is caused to flow through the equivalent series resistance (esr) of the input filter capacitors. The present invention is also directed towards reducing this switching noise, and to do so while maintaining a compact converter size and high efficiency.

Presently, there is a great need for a compact, low noise, and highly efficient power converter, which is currently not being provided by the forward converter and active clamp forward converter topologies due to the above-described problems.

SUMMARY OF THE INVENTION

The present invention recognizes that the magnetizing current in the forward converter's transformer is a source of energy that could be used to reduce the voltage across the converter's primary switch to a value near zero volts before the primary switch is closed to energize the primary winding. A reduction of voltage to near zero volts in magnitude (either positive or negative in value) just prior when the primary switch is closed greatly reduces the power dissipation in the primary switch means and is referred to as a zero-voltage-switching condition. The present invention further recognizes that the loading on the converter's secondary winding diverts some or all of the magnetizing current away from the primary winding into the secondary winding in the portion of the converter's switching cycle prior to the closing of the primary switch, thereby preventing such a zero-voltage-switching condition for the converter's primary switch under most operating conditions. The present invention also recognizes that a switch coupled in series with the secondary winding and operated in a specific manner may be used to block this loading by the secondary circuit. The present invention further recognizes that the input ripple current of one active clamp forward converter has a characteristic waveform which could be substantially "canceled" by another similar active clamp forward converter operating at the same switching-frequency but in opposite phase, i.e., at a phase difference of substantially 180 degrees. The present invention further recognizes that two such active clamp forward converters operated in this manner may replace a single active clamp converter to provide the same output power level, while using substantially the same power transformer core volume and reducing the size of the input filter capacitance.

Broadly stated, the present invention encompasses a dual active clamp (DAC) forward converter including two zero-voltage-switching (ZVS) active-clamp forward converters coupled in parallel and operated in a manner so as to substantially reduce the input ripple current of the DAC converter so that the resultant compact size and low cost of the active clamp forward converters may be exploited for low-noise and high efficiency power supply applications. The present invention further encompasses, in each of the two ZVS active-clamp forward converters, means for isolating the loading effects of the secondary winding from the converter's transformer during the portion of the converter's switching cycle prior to the closing of the primary switch and means for reducing the voltage across the converter's primary switch to a value near zero before the primary switch is closed to energize the primary winding.

More specifically, the present invention comprises an input port for receiving a source of power, an output port for providing power to a load, a first ZVS active-clamp forward converter, and a second ZVS active-clamp forward converter. Each ZVS active clamp converter includes a power transformer having a primary winding coupled to the input port and a secondary winding coupled to the output port, a primary switch means coupled in series between the primary winding and the input port, and an active clamp circuit including a series combination of a first switch and a storage capacitor. In a preferred embodiment of the present invention, the active clamp circuit in each converter may be coupled across the primary winding, the secondary winding, or the primary switch means of the ZVS active-clamp converter. The primary switch means causes energy to be stored in the transformer when the primary switch means is closed during an ON-period and causes the energy to be released from the transformer when the primary switch means is open during an OFF-period.

The present invention further comprises means for generating a first duty-cycle signal and a second duty-cycle signal for controlling the switching state of the primary switch means of the respective ZVS active-clamp forward converters, each of the first and second duty-cycle signals having a first state and a second state. Each of the first and second duty-cycle signals alternate between its respective first state and its respective second state. Additionally, the second duty-cycle signal is phase-shifted in time by substantially 180 degrees from the first duty-cycle signal.

For each ZVS active-clamp converter, the present invention comprises circuitry for isolating the loading effects of the secondary winding from the converter's transformer in a time interval preceding the closing of the primary switch means and for utilizing the magnetizing energy stored in the transformer to reduce the voltage across the primary switch means to a value near zero before the primary switch means is closed. This circuitry comprises the above-described active clamp, a second switch means 150 connected in series with the secondary winding of the converter's transformer, and a switch control means for operating the first and second switch means in relation to the ON-periods and OFF-periods of the primary switch means. The switch control means closes the first switch substantially when the primary switch means opens and opens the first switch means prior to when the primary switch means closes to create a zero-voltage switching condition across the primary switch means when the primary switch means is next closed. Additionally, the switch control means closes the second switch means on or after the primary switch means closes and opens the second switch means before the first switch means closes. As such, the second switch means remains open in the portion of the converter's switching cycle prior to the closing of the primary switch means. This isolates the loading effects of the secondary winding from the converter's transformer and creates a zero-voltage-switching across the primary switch means when the primary switch means is next closed.

The coupling and operation of the first and second converters in the above described manner significantly reduces power dissipated in the primary switch means of the converters and significantly reduces the input ripple current and output ripple current at the input and output ports, respectively, of a dual converter according to the present invention.

Accordingly, it is an object of the present invention to provide greater power conversion efficiencies for the plurality of forward-converter circuit topologies over a greater dynamic range of load current levels.

It is another object of the present invention to provide zero-voltage-switching conditions for the primary switch means of a forward converter topology and to provide these conditions over a large dynamic range of load current levels.

It is another object of the present invention to minimize the input and output ripple currents of the single-ended converter topology.

It is yet another object of the present invention to reduce the electromagnetic interference (EMI) radiation effects of the single-ended power converter topology.

It is still another object of the present invention to provide a low-cost, compact converter having a low input ripple current characteristic.

It is still a further object of the present invention to provide a switch control means for controlling the second switch means which operates in an autonomous manner with respect to the means for controlling the primary switch means.

These and other objects of the present invention will become apparent to those skilled in the art from the following detailed description of the invention and from the accompanying drawings.

BRIEF DESCRIPTION OF THE DRAWINGS

FIG. 1 is a circuit diagram of a prior art forward converter having a series combination of a storage capacitor and auxiliary switch coupled in parallel with the primary transformer winding according to the prior art.

FIG. 2 is a first timing diagram of key voltages and currents of the prior art forward converter shown in FIG. 1 under light loading conditions.

FIG. 3 is a second timing diagram of key voltages and currents of the prior art forward converter shown in FIG. 1 under heavy loading conditions.

FIG. 4 is a circuit diagram of an exemplary embodiment of a forward converter preferably used as one of the two forward converters of the dual active clamp converter according to the present invention.

FIG. 5 is a timing-requirement diagram showing the operation of the first and second switch means of the exemplary embodiment of the forward converter shown in FIG. 4.

FIG. 6 is a first timing diagram of key voltages and currents of the exemplary embodiment of the forward converter shown in FIG. 4 under a first switching-event sequence.

FIG. 7 is a second timing diagram of key voltages and currents of the exemplary embodiment of the forward converter shown in FIG. 4 under a second switching-event sequence.

FIG. 8 is a block diagram of a first embodiment of the dual active clamp converter according to the present invention.

FIGS. 9, 9A, and 9B show more detailed partial block and schematic diagrams of the first embodiment of the dual active clamp converter according to the present invention.

FIG. 10 is a timing diagram of key currents and voltages of the dual active clamp forward converter according to the present invention shown in FIG. 9.

FIGS. 11, 11A, and 11B are a more detailed embodiment of the control means according to the present invention.

FIG. 11C is a schematic diagram of an autonomous switch control means for the second switch means according to the present invention.

FIG. 12 is a timing diagram of key signals of the control means according to the present invention shown in FIGS. 11A and 11B.

FIG. 13 is a second embodiment of the active-clamp forward converter according to the present invention.

FIG. 14 is a third embodiment of the active-clamp forward converter according to the present invention.

FIG. 15 is a set of graphs comparing the relative input ripple voltage produced by a single active clamp forward converter and by two dual active clamp forward converters according to the present invention.

DETAILED DESCRIPTION OF THE PRESENT INVENTION

The features of the present invention may be better appreciated and comprehended with a more detailed description of the prior art development of the forward converter. The basic topology of the forward converter comprises a power transformer having a primary winding and secondary winding, a primary switch connected in series with the primary winding, and two commutating rectifiers which direct power from the secondary winding to a load. A voltage source $V_0$ supplies power to the primary winding, and a choke inductor and a load capacitor filter the power delivered to the load. The operation of basic forward converter is governed by the primary switch, which causes the forward converter to enter an ON-period when it is closed and to enter an OFF-period when it is open. The duration of the ON-period, with respect to the duration of the OFF-period, is varied to supply a desired amount of voltage and power to the load.

When the primary switch is closed, magnetizing current and magnetic energy build up in the power transformer due to the voltage applied across the primary winding. The voltage across the primary winding is also applied to the secondary winding by transformer action and a current in the secondary winding is induced to flow through the commutating rectifiers towards the load. A current related to the current in the secondary winding is reflected back to primary winding by transformer action. The power transformer further includes a third winding for resetting the core of the transformer during the OFF period of the primary switch. The third winding is coupled to the input voltage source $V_0$ by way of a rectifier and discharges, during the OFF-period, the magnetizing current (and energy) built up in the power transformer during the preceding ON-period.

There are several critical operational aspects which affect the reliability and power-conversion efficiency of the basic forward converter. One aspect relates to the magnetic operation of the power transformer, which is usually constructed with a core of soft ferromagnetic material of negligible hysteresis. Due to the physical properties of the ferromagnetic material, the core can only support a maximum amount of magnetic flux density, B. Since the magnetic flux $\Phi$ is proportional to the magnetic flux density B by the number of turns and the cross-sectional area of the winding, the core can only support a maximum amount of magnetic flux and, hence, magnetizing current. This amount is referred to as the saturation flux value. Beyond the saturation flux value, the transformer ceases to operate.

The saturation of magnetic flux limits the amount of power that the basic forward converter may provide to the load during each ON-period. To increase the saturation flux value, the number of turns in each winding can be increased or the cross-sectional area can be increased. Either of these actions, however, increases the parasitic resistances of the windings and thereby decreases the efficiency of the basic forward converter. As noted in U.S. Pat. No. 4,441,146 issued to Vinciarelli, the basic forward converter only uses the first quadrant of the transformer's B-H curve and, hence, only uses one half of the transformer's flux range. As suggested in that patent, if both the first and third quadrant of the transformer's B-H curve are used instead of only the first quadrant, the transformer of a forward converter can be re-designed to reduce the winding resistances and thereby increasing the converter's efficiency.

Another operational aspect of the basic forward converter relates to the voltages and currents of the primary switch during switching events. The primary switch generally comprises a semiconductor device such as a field-effect transistor (FET) or a bipolar-junction transistor (BJT). When switching from the OFF-period to the ON-period, it takes a finite amount of time for the voltage across the primary switch to decrease to zero as the current through the primary switch increases, resulting in a large power dissipation in the primary switch. The dissipated power is equal to the product of both the current and voltage and is zero if either quantity is zero. The power dissipated during the switching transitions directly reduces the conversion efficiency of the forward converter by converting electrical energy into heat. In turn, the reliability and lifetime of the primary switch is reduced by the heating. The present invention addresses this power conversion loss by providing means for driving the voltage across the primary switch means to near zero volts before the primary switch means is closed. The condition whereby the voltage across the primary switch means is driven to zero volts before the primary switch is closed is herein referred to as a zero-voltage-switching condition.

While switching from the ON-period to the OFF-period, it takes a finite amount of time for the current in the primary switch to decrease to zero as the voltage across the primary switch means increases, resulting in a power dissipation in the primary switch means. The power dissipation during this transition is much less than the dissipation in the transition from the OFF-period to the ON-period, typically between one and two orders of magnitude less. The difference in dissipation is related to the properties of the transistor device, either FET or BJT, and an explanation of the difference is not necessary in order to understand the present invention and enable one of ordinary skill in the art to make and use the same.

Another operational aspect of the basic forward converter relates to the voltage stress on the primary switch means during the OFF-period. During the OFF-period, the voltage across the primary winding reverses and adds with voltage source $V_0$ to produce a voltage stress on the primary switch approximately equal twice the input voltage $V_0$, taking the general case where the number of turns of the first and third windings are the same. This voltage stress on the primary switch affects the reliability of the basic forward converter directly and the conversion efficiency indirectly. The indirect effect on efficiency is explained below as follows. Due to the material properties of semiconductor devices, FET and BJT devices can only withstand a predetermined maximum voltage, known as a breakdown voltage, across their conduction terminals before the devices are destroyed. It is well known within the semiconductor device fabrication art that increasing the breakdown voltage of a BJT or FET device requires increasing the "on"-resistance between the conduction terminals of the semiconductor device. The increased "on"-resistance lowers the conversion efficiency by increasing the power dissipation in the primary switch during the ON-period.

To address the indirect power dissipation losses due to the underutilization of the core and due to voltage stresses on the primary switch means, a modification to the standard forward converter was proposed in U.S. Pat. No. 4,441,146 issued to Vinciarelli and in an article by B. Carsten, entitled "High Power SMPS Require Intrinsic Reliability," PCI Proceedings, March 1982, pp. 456–471. As the present invention builds on the teachings of prior art active clamp circuits, an exemplary such circuit is discussed in greater detail below with reference to FIGS. 1 through 3. Note that this modified circuit does not address the direct power dissipation losses in the primary switch means during transitions between the ON and OFF-periods. Such direct power dissipation losses become more significant as the switching frequency increases since the duration of each switching event comprises a larger fraction of each switching cycle duration as the switching frequency increases.

The exemplary modified forward converter described above is shown at 3000 in FIG. 1. Forward converter 3000 comprises a transformer 3020 having a primary winding 3022 and secondary winding 3024, a primary switch means 3040 ($S_{PR}$) connected in series with primary winding 3022, and rectifiers 3050 (CR1) and 3060 (CR2) which direct power from secondary winding 3024 to a load 3074. A voltage source 3010 having a value of $V_0$ supplies forward converter 3000 with power and a choke inductor 3070 ($L_{OUT}$) and a load capacitor 3072 ($C_{OUT}$) are used to filter the power delivered to load 3074. Additionally, converter 3000 comprises a capacitor 3032 ($C_S$) for representing the stray (parasitic) capacitance associated with primary winding 3022 and primary switch means 3040. Converter 3000 further comprises a series combination of a storage capacitor 3034 and an auxiliary switch means 3030 coupled in parallel with primary winding 3022. The series combination is often referred to as an active clamp because it acts as a voltage clamp which is actively (i.e., selectively) coupled to the transformer's windings. One terminal of the series combination is coupled to the switched terminal of primary winding 3022 (at node $V_1$) and the other end is coupled to a constant voltage reference, which is the positive terminal of voltage source 3010 in this case. Storage capacitor 3034 and auxiliary switch means 3030 comprise means for discharging the magnetizing current in inductor 3023 during OFF-periods when primary switch means 3040 is open. Additionally, storage capacitor 3034 and auxiliary switch means 3030 comprise means for causing converter 3000 to use the third quadrant of transformer 3020's B-H characteristic. Additionally, the latter two components are used to control the reset of the transformer core during the OFF-period, as explained in greater detail below.

As discussed below, an imaginary inductor is used to model the effects of the magnetizing energy of transformer 3020. The modeling inductor is indicated in phantom as inductor 3023 in FIG. 1 and is coupled in parallel with primary winding 3022 (and hence in parallel with the series combination of auxiliary switch means 3030 and capacitor 3034). As such, the magnetizing effects of transformer 3020 can be readily analyzed in the form of a magnetizing current. The use of modeling inductor 3023 in this manner is well known to the transformer art and is discussed in greater detail below. Nonetheless, it is important to recognize that inductor 3023 is not a real component of converter 3000 but rather an imaginary modeling component which aids in explaining the characteristic behavior of the magnetizing energy in real transformer 3020.

Certain voltages and currents in converter 3000 are significant and their symbolic notations are detailed below with reference to FIG. 1. The voltage across primary winding 3022 is designated as $V_P$, the voltage across secondary winding 3024 is designated as $V_S$. Each of these winding voltages is referenced such that the positive terminal coincides with the magnetic reference dot shown in FIG. 1. There are two node voltages of significance. The node coupling the negative terminal of primary winding 3022 to primary switch means 3040 is referred to as node 1 and the voltage at this node with respect to ground is designated as $V_1$. The node coupling rectifiers 3050 and 3060 to choke inductor 3070 is referred to as node 2 and the voltage at this node with respect to ground is designated as $V_2$.

The following currents are significant. The current flowing into primary winding 3022 at the positive terminal is designated as $I_1$, the current flowing into inductor 3023 from voltage source 3010 is designated as $I_M$, and the total primary current flowing into both inductor 3023 and winding 3022 from voltage source 3010 is designated as $I_P$. The current flowing into capacitor 3032 ($C_S$) from node $V_1$ is designated as $I_{CS}$. Rectifiers 3050 (CR1) and 3060 (CR2) have the current reference designations $I_{CR1}$ and $I_{CR2}$, respectively, where the current references flow into the anode terminals of each rectifier. The current flowing through choke inductor 3070 ($L_{OUT}$) is designated by the current reference designation $I_{LOUT}$, where the current reference flows toward load 3074. The current flowing through load 3074 is designated by the current reference designation $I_{LOAD}$, where the current reference flows from choke inductor 3070 to ground. The current flowing in capacitor 3034 ($C_C$) from switch means 3030 is designated by the current reference designation $I_{CC}$.

For the purposes of discussion, primary winding 3022 and secondary winding 3024 are taken to have the same number of turns. The dot notations for windings 3022 and 3024 indicate their polarities. As mentioned above, an imaginary inductor 3023 ($L_M$) is indicated, in phantom, in the circuit diagram for transformer 3020 to model the effects of the magnetizing flux and magnetizing current of transformer 3020. As well known in the transformer art, a current must be provided to one of windings of a real transformer to provide the magnetomotive force required to overcome the magnetic reluctance of the transformer's core. This current is known as the magnetizing current and is generally provided to the primary winding of the transformer. Since an ideal transformer does not have any magnetic reluctance, magnetizing currents are not present in an ideal transformer. In a real transformer, the magnetizing current can be electrically modeled by a phantom inductor coupled in parallel with the primary winding of an ideal transformer, as shown by inductor 3023. This is because the magnetizing current is proportional to the time integral of the voltage appearing across the primary winding of the transformer. The inductance value $L_M$ of the phantom modeling inductor 3023 is set to a value representative of the core reluctance of transformer 3020, as well known in the transformer art.

The magnetizing current is a parasitic effect and does not exist in an ideal transformer. As such, the magnetizing current component in the primary winding circuit is not transformed into current in the secondary winding. The current flowing in secondary winding 3024 is related to the current flowing into primary winding 3022 and is not related to the current flowing in inductor 3023. For the purposes of understanding the operation of transformer 3020, primary winding 3022 and secondary winding 3024 function as an ideal transformer while inductor 3023 functions to account for the magnetizing current in transformer 3020. As such, the above mentioned current $I_P$ represents the current flowing into the primary winding of a real transformer, the above mentioned current $I_M$ represents the component of primary current $I_P$ needed to overcome the reluctance of the real transformer, and the above mentioned current $I_1$ represents the component of primary current $I_P$ which is actually transformed over to the secondary winding of the real transformer. As a point of generality, inductor 3023 can be coupled in parallel with secondary winding 3024 rather than with primary winding 3022 to represent the magnetizing current.

The magnetizing current causes energy to be stored in the transformer's core when the transformer's primary winding is energized by the closing of primary switch means 3040. This energy is stored in the form of magnetic flux in the core and is referred to as the magnetizing flux. The magnetizing flux must be periodically discharged to prevent the flux in the core from reaching a saturation point, at which time the transformer ceases to provide transformer action. The material properties of the core limit the total amount of flux the core can store. The flux energy is discharged by discharging the magnetizing current through one of the transformer's windings. The discharging process is formally known as resetting the core.

The operation of forward converter 3000 is governed by primary switch means 3040, which causes converter 3000 to enter an ON-period when switch means 3040 is closed and to enter an OFF-period when switch means 3040 is open. Auxiliary switch means 3030 operates counter to primary switch means 3040 by opening when primary switch means 3040 closes and by closing when primary switch means 3040 opens. The operation of converter 3000 is explained in greater detail below with the assumption that the voltage at the positive terminal of capacitor 3034 with respect to ground is greater than $V_0$, which is the voltage value of voltage source 3010.

During the ON-period, when primary switch means 3040 is closed and auxiliary switch means 3030 is open, a voltage $V_0$ is applied to primary winding 3022, which is then applied to secondary winding 3024 by transformer action. A current in secondary winding 3024 is induced to flow through rectifier 3050 towards load 3074. Because windings 3022 and 3024 have the same number of turns, a current equal in magnitude to the current in secondary winding 3024 is generated in primary winding 3022 by transformer action. At the same time, a magnetizing current $I_M$ builds up in inductor 3023 at a constant rate (i.e., the waveform of the magnetizing current has a positive linear slope) due to the application of a constant voltage of $V_0$ across inductor 3023 by voltage source 3010. Magnetizing energy builds upon in transformer 3020 due to the magnetizing current $I_M$.

When primary switch means 3040 is opened and auxiliary switch means 3030 is closed to start the OFF-period, the voltage across primary winding 3022 and secondary winding 3024 abruptly reverses to a negative value since the voltage at the positive terminal of capacitor 3034 is greater than $V_0$. As a result, the current flow through secondary winding 3024 abruptly stops due to the reversal in the voltage across the secondary winding and the blocking action of rectifier 3050. In response to secondary winding 3024, the current flow through primary winding 3022 also abruptly stops. The magnetizing current, however, continues to flow and is diverted from primary switch means 3040 into storage capacitor 3034 via auxiliary switch means 3030. For the purposes of discussion and without loss of generality, the capacitance of storage capacitor 3034 is taken to be large enough so that the voltage across storage capacitor 3034 does not substantially change during the OFF-period. Since a constant negative voltage is being applied to inductor 3023 during the OFF-period, the magnetizing current $I_M$ decreases at a constant rate, thereby acting to reset the transformer core. If the OFF-period is sufficiently long, the decrease in $I_M$ continues to the point where current $I_M$ reverses direction and flows out of storage capacitor 3034 and into voltage source 3010.

The ratio of the duration of the ON-period to the time interval between each successive ON-period is known as the duty-cycle of the converter. The time interval between each successive ON-period is known as the switching period T. The duty cycle is a fraction which ranges between 0.0 and 1.0, but can be given as a percentage, which is equal to the fraction multiplied by 100%, i.e., (ON-period)/T*100%. The duty-cycle is adjusted to meet the power requirements of the load, with a higher duty-cycle providing more power to the load. The duration of one ON-period and the subsequent OFF-period is often referred to as the switching cycle. The OFF-period is often referred to as the "flyback" phase due to the abrupt reversals in the voltages and changes of the currents of the transformer windings. It is also referred to as the "reset" phase since the magnetic energy and flux in the transformer core decreases to zero during this time. The voltage that develops across primary switch means 3040 during the OFF-period is greater than $V_0$ and is referred to as the "reset" voltage.

Under steady-state conditions, the output voltage $V_{OUT}$ and the duty-cycle of the forward converter are generally related as follows. When choke inductor 3070 continuously provides current to load 3074 throughout the switching cycle, the output voltage $V_{OUT}$ is equal to the input voltage $V_0$ times the duty cycle, as expressed in the form of a fraction (i.e., divided by 100%). This is because the output voltage $V_{OUT}$ adjusts to a voltage level such that the time-integrated voltage applied across choke inductor 3070 during each switching cycle is equal to zero, under steady-state conditions. During the ON-period duration, $T_{ON}$, the voltage applied to choke inductor 3070 is $(V_0 - V_{OUT})$ volts. During the OFF-period duration, $T_{OFF}$, the voltage applied to choke inductor 3070 is $(-V_{OUT})$ volts. Setting the time-integrated voltage to zero (i.e., $T_{ON}(V_0 - V_{OUT}) - T_{OFF}V_{OUT} = 0$) and solving for $V_{OUT}$ results in $V_{OUT} = V_0 T_{ON}/(T_{ON} + T_{OFF}) = V_0*$(duty-cycle/100%). In the case where choke inductor 3070 does not continuously provide current to load 3074, due to low load-current demand, the relationship between the duty-cycle and the output voltage is considerably more complex and depends upon the output current level required by load 3074. The derivation and presentation of this more complex relationship are not necessary in order to understand the present invention and enable one of ordinary skill in the art to make and use the present invention. (The derivation and presentation of the more complex relationship may be found in the forward converter switching art.) For the purposes of presenting the present invention and without loss of generality, the exemplary operating conditions presented hereinbelow assume that choke 3070 continuously provides current to load 3074 and makes use of the relationship $V_{OUT} =$ (duty−cycle/100%)*$V_0$.

To prevent the core of transformer 3020 from saturating during steady-state operations, the time-integrated voltage across inductor 3023, and hence across each winding of transformer 3020, should be zero for each switching cycle, otherwise the magnetic flux in the core of transformer 3020 will saturate within a finite number of switching cycles. In the steady-state operation of converter 3000, the voltage $V_C$ across capacitor 3034 is at a value which sets the time-integrated voltage across inductor 3023 to zero during each switching cycle. This value is referred to as the required value for $V_C$ which prevents core saturation and may be determined as follows. During the ON-period duration $T_{ON}$, a voltage of $+V_0$ is applied to inductor 3023 by voltage source 3010. During the OFF-period duration $T_{OFF}$, the voltage applied to inductor 3023 is the negative of the voltage across storage capacitor 3034: $-V_C$. In this case, the time-integrated voltage during each switching cycle is determined as:

$$\text{Time Integrated Voltage} = T_{ON}V_0 - T_{OFF}V_C \quad (1)$$

Setting the time integrated voltage to zero and solving for the required value of $V_C$, which sets the time-integrated voltage to zero, results in:

$$V_{CSS} = \frac{T_{ON}}{T_{OFF}} V_0 = \frac{(DC)}{(1 - DC)} V_0 \quad (2)$$

where the symbol $V_{CSS}$ represents the required value of $V_C$ for preventing core saturation during steady-state operations and the symbol DC represents the given duty cycle.

To keep the voltage $V_C$ on storage capacitor 3034 at the required value $V_{CSS}$ under the conditions of constant input voltage, constant output voltage, and constant output load current, the flow of charge into storage capacitor 3034 during the first half of the OFF-period must be equal to the flow of charge out of storage capacitor 3034 during the second half of the OFF-period so that no net accumulation or depletion of charge occurs on storage capacitor 3034 during the OFF-period. Given that the magnetizing current $I_M$ increases at a constant rate during the ON-period, that $I_M$ decreases at a constant rate during the OFF-period and that $I_M$ is continuous, the waveform for the magnetizing current $I_M$ must be centered around a value of zero amperes in order to prevent a net charge accumulation or depletion on storage capacitor 3034 during the OFF-period. Otherwise, the voltage $V_C$ would shift away from the required $V_{CSS}$ value.

If the $I_M$ waveform is not centered around zero amperes, the voltage $V_C$ departs from the value $V_{CSS}$ in order to shift the $I_M$ waveform so that it is centered around zero amperes. For example, if the $I_M$ waveform is initially shifted upwards and centered around a positive current value, the shifted waveform will cause a net charge to flow into storage capacitor $C_C$, thereby raising the voltage $V_C$. In turn, the higher $V_C$ voltage causes the magnetizing current to decrease at a faster rate during the OFF-period, thereby shifting the $I_M$ waveform down to center the $I_M$ waveform around zero amperes within a finite number of switching cycles. Likewise, if the $I_M$ waveform is initially shifted downwards and centered around a negative current value, the shifted waveform will cause a net charge to flow out of storage capacitor $C_C$, thereby lowering the voltage $V_C$. In turn, the lower $V_C$ voltage causes the magnetizing current to decrease at a slower rate during the OFF-period, thereby shifting the $I_M$ waveform up to center the $I_M$ waveform around zero amperes within a finite number of switching cycles.

During power-up and during changing load conditions, the voltage value $V_{CSS}$ for storage capacitor 3034 is reached by the transient charging or discharging of storage capacitor 3034. If the voltage across storage capacitor 3034 is less than $V_{CSS}$. It takes a longer time duration to reverse the current-flow direction of $I_M$ and, consequently, more current flows into storage capacitor 3034 than flows out during the OFF-period. The net current flow into capacitor 3034 during each switching cycle raises the voltage across storage capacitor 3034 until the voltage $V_{CSS}$ is reached. Likewise, if the voltage on storage capacitor 3034 is greater than $V_{CSS}$, it takes a shorter time duration to reverse the current-flow direction of $I_M$ and, consequently, more current flows out of storage capacitor 3034 than flows in during the OFF-period. The net current flow out of capacitor 3034 during each switching cycle lowers the voltage across storage capacitor 3034 until the voltage $V_{CSS}$ is reached. During this transient charging condition, the waveform for the magnetizing current is not centered around a value of zero amperes.

The energy transferred out of storage capacitor 3034 during the latter part of the OFF-period is recycled to voltage source 3010. The reversal of current flow in the magnetizing current $I_M$ though inductor 3023 serves to reset the magnetic flux in the transformer's core at a point inside the third quadrant of the transformer's B-H characteristic. The utilization of the third quadrant in this manner increases the utilization of the transformer's core and, hence, the structure of transformer 3020 may be re-designed to decrease the dissipation losses in transformer 3020, as described above.

The steady-state waveforms for the key voltages and currents of forward converter 3000 are shown in timing diagram 4000 in FIG. 2. For the purposes of this discussion, each winding of transformer 3020 has the same number of turns and has no parasitic resistance and transformer 3020 is operated in the linear regime of its B-H characteristic. Additionally, each rectifier has a nominal voltage drop for forward conducting current, near zero current conduction for reverse applied voltage and has a nominal amount of reverse-recovery current. To simplify the discussion of forward converter 3000, the output voltage across load 3074 is taken to be constant at a value of $V_0/3$. Furthermore, load 3074 is taken to be resistive in nature without loss of generality.

The operation of primary switch means 3040 is shown in graph 4001 in FIG. 2 and the operation of auxiliary switch means 3030 is shown in graph 4009 in FIG. 2. Graph 4001 is in the form of a time line which indicates the ON-periods where primary switch means 3040 ($S_{PR}$) is closed and the OFF-periods where primary switch means 3040 is open. Graph 4009 is also in the form of a time line and indicates when auxiliary switch means 3030 ($S_A$) is closed and when auxiliary switch means 3030 is open. An exemplary duty-cycle of 33.3%, which is consistent with an output voltage $V_{OUT}$ of $V_0/3$, is shown for primary switch means 3040 ($S_{PR}$) in graph 4001.

The winding voltages $V_P$ and $V_S$ and the voltage $V_1$ are shown in graph 4002 in FIG. 2. For the primary circuit, the total primary current $I_P$ and the current $I_{CS}$ into capacitor $C_S$ are shown in graph 4003, the magnetizing current $I_M$ in inductor 3023 and the current $I_1$ in primary winding 3022 are shown in graph 4004, and the current $I_{CC}$ flowing into storage capacitor 3034 is shown in graph 4005 in FIG. 2. For the secondary circuit, the output voltage $V_{OUT}$ at load 3074 and the voltage $V_2$ are shown in graph 4006, the currents $I_{CR1}$ and $I_{CR2}$ in rectifiers 3050 (CR1) and 3060 (CR2) are shown in graph 4007, and the current $I_{LOUT}$ in choke inductor 3070 and the current $I_{LOAD}$ in load 3074 are shown in graph 4008 in FIG. 2. In comparing the rectifier currents in graph 4007 against the inductor current $I_{LOUT}$ in graph 4008, it may be seen that the rectifier current $I_{CR1}$ supports the inductor current $I_{LOUT}$ during the ON-periods and that the rectifier current $I_{CR2}$ supports the inductor current $I_{LOUT}$ during the OFF-periods.

During the ON-period, the voltage across primary winding 3022 and secondary winding 3024 is set by voltage source 3010 at a value of $V_0$ with the voltage $V_1$ across primary switch means 3040 at near zero volts, as shown in graph 4002. The application of $V_0$ across the secondary winding causes rectifier 3050 (CR1) to fully support the current in choke inductor 3070. Via the transformer action of transformer 3020, the rectifier current $I_{CR1}$ is replicated in the current $I_1$ of primary winding 3022, as shown in graph 4004. Also during the ON-period, the magnetizing current $I_M$ increases at a constant rate determined by the voltage applied across inductor 3023 and the magnetizing inductance of inductor 3023, as also shown in graph 4004. As discussed above, the magnetizing current during steady-state conditions is centered around a value of zero amperes, as shown in graph 4004. The total primary current $I_p$ is equal to the sum of $I_1$ and $I_M$ and is shown in graph 4003. During the ON-period, auxiliary switch means 3030 is open and, as such, and the current $I_{CC}$ into capacitor 3034 is zero, as shown in graph 4005.

As switch means 3040 opens to begin the OFF-period, auxiliary switch means 3030 begins to close. During this switching transition, the magnetizing current in inductor 3023 initially flows into capacitor 3032 ($C_S$) and raises the voltage $V_1$ towards the voltage on capacitor 3034. Once auxiliary switch means 3030 closes, the magnetizing current in inductor 3023 flows into storage capacitor 3034. As mentioned above, the capacitance value of storage capacitance 3034 is sufficiently large so that the voltage across capacitor 3034 does not substantially change during the duration of the OFF-period. For an exemplary duty-cycle of 33.3%, the steady-state voltage on storage capacitor 3034 is equal to $V_0/2$, where $V_0$ is the value of voltage source 3010. This value is given by equation (2) above.

The application of $-V_0/2$ volts across primary winding 3022 and secondary winding 3024 by storage capacitor 3034 causes rectifier 3060 (CR2) to fully support the current in choke inductor 3070, as shown in graph 4007. As a result, the current in secondary winding 3024 ceases, as shown by $I_{CR1}$ in graph 4007, and the current in primary winding 3022 ceases, as shown by $I_1$ in graph 4004. Additionally, the magnetizing current $I_M$ in inductor 3023 decreases at a constant rate during the OFF-period, as shown by graph 4004. The magnetizing current $I_M$ initially flows into storage capacitor 3023. The rate of decrease in $I_M$ is equal in magnitude to half of the rate of increase in $I_M$ during the ON-period since the magnitude of applied voltage across inductor 3023 during the OFF-period is half the magnitude during the ON-period. Half way through the OFF-period, under steady-state conditions, $I_M$ reverses sign and flows out of storage capacitor 3023. The waveform of $I_M$ during the OFF-period is reflected in the waveforms for the total primary current $I_p$, as shown in graph 4003, and for the storage capacitor current $I_{CC}$, as shown in graph 4005.

Forward converter 3000 has two main advantages as compared with a basic forward converter. First, the waveform of magnetizing current $I_M$ is centered around zero amperes, indicating that the third quadrant of the transformer core's B-H characteristic is being utilized. In contrast, the magnetizing current waveform of the basic forward converter is non-negative and is not centered around zero amperes, indicating that only the first quadrant is used. The use of first and third quadrants by forward converter 3000 provides a larger range of linearity in the B-H characteristic, and hence the design of transformer 3020 can be optimized to lower the winding resistances and reduce power dissipation, as discussed above. Secondly, the voltage stress applied to the primary switch means 3040 during the OFF-period is reduced compared to that across the primary switch of a basic forward converter since the voltage applied to primary switch means 3040 during the OFF-period is equal to $3V_0/2$, assuming a 33.3% duty-cycle, rather than $2V_0$, as is the case for the primary switch of a basic forward converter. Forward converter 3000, however, does not address the power dissipation that occurs in primary switch means 3040 between the OFF and ON-periods, as discussed above. As can be seen in graphs 4002 and 4003 of FIG. 2, as converter 3000 switches from the OFF-period to the ON-period, the current $I_p$ through primary switch means 3040 is at a substantial negative value while the voltage $V_1$ across primary switch means 3040 is switching from $3V_0/2$ to zero volts.

To address this problem, an improvement to forward converter 3000 was proposed in 1987 by B. Carsten, "Design Tricks, Techniques and Tribulations at High Conversion Frequencies," HPFC, April 1987, p. 139. The proposed improvement uses the magnetizing current present in inductor 3023 during the end of the OFF-period to reduce the voltage at node $V_1$ by discharging stray (parasitic) capacitor 3032. Under some conditions, the voltage $V_1$ can be reduced to zero volts in this manner before primary switch means 3040 is closed, thereby significantly reducing the power dissipation in primary switch means 3040 during switching-on transitions. Under other conditions, however, the voltage $V_1$ can never be reduced to zero volts before primary switch means 3040 closes. As discussed below, the present invention identifies the causes which prevent zero voltage switching and provides means for overcoming these causes.

In this proposed improvement, a short delay period, or time duration, is introduced between the end of the OFF-period and the beginning of the ON-period where both primary switch means 3040 and auxiliary switch means 3030 remain open. This time period is shown at 4020 in FIG. 2 and is referred to as delay period 4020 for the purposes of this discussion. As can be seen in graph 4004, the magnetizing current $I_P$ through inductor 3023 is negative at the beginning of delay period 4020. Since both switch means 3040 and 3030 are open, no definite voltage is applied across inductor 3023 and primary winding 3022. Under this condition, the magnetizing current $I_M$ begins to flow through stray capacitor 3032, thereby reducing the voltage $V_1$ from $3V_0/2$ towards zero volts.

The magnetizing current continues to reduce the voltage $V_1$ until the voltage $V_1$ reaches a value of $V_0$. At this point, the voltages $V_P$ across primary winding 3022 and $V_S$ across secondary winding 3024 become positive and the secondary circuit begins conducting current through rectifier 3050 ($I_{CR1}$). Via transformer action, a current ($I_1$) flows in primary winding 3022 which is equal in magnitude to the current flowing in secondary winding 3024. This current flow in primary winding 3022 diverts some or all of the magnetizing current away from stray capacitor 3032. If the magnitude of the current in choke inductor 3070 is less than the magnitude of the magnetizing current $I_M$ at this point, a portion of the magnetizing current will continue to flow into stray capacitor 3032 and voltage $V_1$ will continue to be decreased. This portion of magnetizing current is equal to the magnetizing current less the current flowing in choke inductor 3070.

As the voltage $V_1$ is decreased, the applied voltage across primary winding 3022 and secondary winding 3024 increases, thereby increasing the current flow in choke inductor 3070 and secondary winding 3024. In turn, this increase in secondary current reduces the portion of magnetizing current which is flowing through stray capacitor 3032. At some point, the decrease in voltage $V_1$ ends because the current in secondary winding 3024 is increased to the point where it equals the magnetizing current in inductor 3023. Under certain load conditions and duty-cycles, it is possible to decrease the voltage $V_1$ to zero volts or less, thereby facilitating a zero-voltage-switching condition for primary switch means 3024. Such an exemplary case is shown in FIG. 2 where the voltage $V_1$ shown in graph 4002 is decreased to a negative value during delay period 4020.

However, it is also possible that the voltage $V_1$ cannot be reduced to zero volts due to the loading effects on secondary winding 3024. In some cases, the reduction of voltage $V_1$ ends at a positive voltage. More likely, however, the current through choke inductor 3070 is greater than the magnetizing current $I_M$ during the beginning of delay period 4020 and oftentimes throughout delay period 4020. In this case, the magnetizing current decreases voltage $V_1$ only to a value of $V_0$ volts, at which point all of the magnetizing current $I_M$ is diverted into secondary winding 3024, via primary winding 3022, and the voltage $V_1$ is clamped at a value of $V_0$. The remainder of the current flow in choke inductor 3070 is provided by rectifier 3060, which clamps voltage $V_2$ near zero volts. The current conduction in both rectifiers 3050 and 3060 clamps the secondary voltage $V_S$ to zero volts and, consequently, ensures that voltage $V_1$ remains at a value of $V_0$ volts. In this case, no zero-voltage switching is possible. Unfortunately, since forward converters are designed to maximize the current delivered to the load and to minimize the magnitude of magnetizing current, it is rarely possible to achieve a zero-voltage-switching condition because the load current is larger than the magnetizing current during the delay period.

The steady-state waveforms for the key voltages and currents of forward converter 3000 under the conditions where the current through choke inductor 3070 is greater than the magnetizing current during the delay period are shown in timing diagram 5000 in FIG. 3. Timing diagram 5000 comprises graphs 5001 through 5009 and a delay period 5020. Graphs 5001 through 5009 display the same information as graphs 4001 through 4009, repectively, as shown in FIG. 2. Once voltage $V_1$ is decreased to a value of $V_0$ volts at or near the beginning of delay period 5020, the current $I_{CR1}$ in secondary winding 3024 begins to flow, thereby clamping the voltage $V_S$ on secondary winding 3024 to zero volts since rectifier 3060 is still conducting. A voltage of zero volts is now applied to the windings of transformer 3020, and the magnetizing current is prevented from flowing into stray capacitor 3032. Instead, the magnetizing current, shown in graph 5004, is diverted in primary winding 3022, as shown by $I_1$ in graph 5004, which sets the current in secondary winding 3024 equal to the magnetizing current, as shown by $I_{CR1}$ in graph 5007. The remainder of the current $I_{LOUT}$ in choke inductor 3070, as shown in graph 5008, is conducted by rectifier 3060, as shown by $I_{CR2}$ in graph 5007. The voltage $V_1$ is thereby clamped at a value of $V_0$ volts and a zero-voltage-switching condition cannot be achieved.

The above described mechanism which diverts magnetizing current into secondary winding 3024 and resulting voltage clamping of the transformer windings during the delay period have thus far not been discussed nor addressed in the prior art. The present invention has recognized this diversion mechanism and clamping effect as a major hindrance to achieving a zero-voltage-switching condition for primary switch means 3040 in forward converter 3000 under all loading conditions. As discussed below, the present invention seeks to eliminate the diverson of magnetizing current and the resulting voltage clamping during the delay period, thereby permitting voltage $V_1$ to decrease to zero volts to provide a zero-voltage-switching condition for the primary switch means.

A first embodiment of a zero-voltage-switching (ZVS) active-clamp forward converter preferably used as one of the two forward converters of the dual active clamp converter according to the present invention is shown at 100 in FIG. 4. A voltage source 110 ($V_0$) provides electrical energy to forward converter 100. Forward converter 100 comprises a transformer 120 (T1) having a primary winding 122 and secondary winding 124, and a primary switch means 140 ($S_{PR}$) coupled in series with primary winding 122 and voltage source 110 for selectively coupling energy from voltage source 110 to transformer 120. Forward converter 100 further comprises a storage capacitor 134 ($C_C$) and a first switch means 130 ($S_1$) for selectively controlling the current flow through storage capacitor 134. First switch means 130 and storage capacitor 134 are coupled in series and the resulting series combination is coupled in parallel with either the primary winding of transformer 120 (as shown in FIG. 4) or the secondary winding of transformer 120 (as shown in FIG. 13). The series combination is often referred to as an active clamp because it acts as a voltage clamp which is actively (i.e., selectively) coupled to the transformer's windings. Additionally, converter 100 includes a capacitor 132 ($C_S$) coupled between the switched terminal of primary winding 122 and ground for representing the combined stray (parasitic) capacitances of primary winding 122, primary switch means 140, and first switch means 130. It may be appreciated that each of primary winding 122, primary switch means 140, and first switch means 130 may include a parasitic capacitance, resulting from the non-ideal elements used in implementing each of these components. The parasitic capacitance of each of these components may, for example, be represented by a parasitic capacitor for each component terminal, each parasitic capacitor being coupled between its respective component terminal and ground. As these capacitances are parasitic in nature, their exact values are not precisely known and may, in fact, vary considerably in manufacturing. In a further embodiment of converter 100, capacitor 132 further comprises a fixed-value capacitor in addition to the parasitic capacitances so as to provide a more predictable capacitance value for capacitor 132, thereby increasing the manufacturing consistency of converter 100.

As discussed above with reference to converter 3000, an imaginary inductor is used to model the effects of the magnetizing energy of transformer 120. The modeling inductor is indicated in phantom as inductor 123 in FIG. 4 and is coupled in parallel with primary winding 122. As such, the magnetizing effects of transformer 120 can be readily analyzed in the form of a magnetizing current. The use of modeling inductor 123 in this manner is well known to the transformer art and not a real component of converter 100, but rather an imaginary modeling component which aids in explaining the characteristic behavior of the magnetizing energy in real transformer 120.

For directing and controlling the flow of power from transformer 120 to an output load 174, forward converter 100 further comprises a second switch means 150 coupled in series with the secondary winding for controlling the flow of current to load 174, and a rectifier 160 (CR2) coupled in parallel with the series combination of second switch means 150 and secondary winding 124. Converter 100 further includes a choke inductor 170 ($L_{OUT}$) coupled between second switch means 150 and load 174, and a load capacitor 172 ($C_{OUT}$) coupled in parallel with load 174. The current through load 174 is represented by the symbol $I_{LOAD}$ and, for the purposes of discussion and without loss of generality, is taken to be constant. Choke inductor 170 ($L_{OUT}$) and load capacitor 172 ($C_{OUT}$) provide means for filtering the power delivered to load 174.

Forward converter 100 further comprises a switch control means 180 for generating signals to control the operation of primary switch means 140, first switch means 130, and second switch means 150. Switch control means 180 comprises a port 181 coupled to primary switch means 140, a port 182 coupled to first switch means 130, and a port 183 coupled to second switch means 150. Port 181 transmits a signal which controls the operation of primary switch means 140, port 182 transmits a signal which controls the operation of first switch means 130, and port 183 transmits a signal which controls the operation of second switch means 150.

Certain voltages and currents in converter 100 are significant and their symbolic notations are detailed below with reference to FIG. 4. The voltage across primary winding 122 is designated as $V_p$, and the voltage across secondary winding 124 is designated as $V_S$. Each of these winding voltages is referenced such that the positive terminal coincides with the magnetic reference dot shown in FIG. 4. There are two node voltages of significance. At the node coupling the negative terminal of primary winding 122 to primary switch means 140, the voltage at this node with respect to the negative terminal of voltage source 110 is designated as $V_1$ and the node itself is referred to as node $V_1$. At the node coupling second switch means 150 and rectifier 160 to choke inductor 170, the voltage at this node with respect to the negative terminal of secondary winding 124 is designated as $V_2$ and the node itself is referred to as node $V_2$.

The following currents in converter 100 are significant. The current flowing into primary winding 122 at the positive terminal is designated as $I_1$, the current flowing into inductor 123 from voltage source 110 is designated as $I_M$, and the total primary current flowing into both inductor 123 and winding 122 from voltage source 110 is designated as $I_p$. The current flowing into stray capacitor 132 ($C_S$) from node $V_1$ is designated as $I_{CS}$ and the current flowing into storage capacitor 134 ($C_C$) from node $V_1$ is designated as $I_{CC}$. The current flowing into second switch means 150 from secondary winding 124 is designated as $I_{S2}$ and the current flowing out of the cathode terminal of rectifier 160 is designated as $I_{CR2}$. The current flowing through choke inductor 170 ($L_{OUT}$) is designated by the current reference designation $J_{LOUT}$, where the current reference flows toward load 174. The current flowing through load 174 is designated by the current reference designation $I_{LOAD}$, where the current reference flows from choke inductor 170 to ground.

For the purposes of discussion and without loss of generality, primary winding 122 and secondary winding 124 are taken to have the same number of turns. The dot notations for windings 122 and 124 indicate their polarities. An inductor 123 ($L_M$) is included, in phantom, in the circuit diagram for transformer 120 to model the effects of the magnetizing flux and magnetizing current of transformer 120, as discussed above. As mentioned above, a magnetizing current must be provided to one of windings of a real transformer to provide the magnetomotive force required to overcome the magnetic reluctance of the transformer's core. For a real transformer, the magnetizing current can be electrically modeled by a phantom inductor coupled in parallel with the primary winding of an ideal transformer, as shown by inductor 123. As such, the above mentioned current $I_p$ represents the current flowing into the primary winding of a real transformer, such as transformer 120, the above mentioned current $I_M$ represents the component of primary current $I_p$ needed to overcome the magnetic reluctance of the real transformer, and the above mentioned current $I_1$ represents the component of primary current $I_p$ which is actually transformed over to the secondary winding of the real transformer.

As with forward converter 3000, the operation of forward converter 100 is governed by primary switch means 140, which causes converter 100 to enter an ON-period when switch means 140 is closed and to enter an OFF-period when switch means 140 is open. First switch means 130 operates substantially counter to primary switch means 140 by closing substantially when primary switch means 140 opens to start an OFF-period and by opening prior to when primary switch means 140 closes to start an ON-period. Second switch means 150 operates substantially synchronously with primary switch means 140 by closing substantially when primary switch means 140 closes and by opening substantially when primary switch means 140 opens. The operation of converter 100 is explained in greater detail below with the assumption that the voltage at the positive terminal of capacitor 134 with respect to ground is greater than $V_0$, which is the voltage value of voltage source 110.

The operations of first switch means 130 and second switch means 150 are discussed in greater detail with reference to a timing diagram shown at 200 in FIG. 5, which shows the timing requirements for the operations of first and second switch means 130,150 with respect to primary switch means 140. A single switching cycle having an ON-period followed by an OFF-period is shown in graph 201. The opening and closing operations of primary switch means 140, which define the ON- and OFF-periods, is shown in graph 205 in FIG. 5. The high sections of graph 205 indicate the time durations where primary switch means 140 is closed and the low sections indicate the time durations where primary switch means 140 is open. The operation and timing requirements for first switch means 130 is shown in graph 210 and the operation and timing requirements for second switch means 150 is shown in graph 220 in FIG. 5.

Shown in graph 210 is a timing window 212 in which switch control means 180 closes first switch means 130. Timing window 212, as well as all other timing windows shown in timing diagram 200, is illustrated using a series of parallel skew lines (/). In the preferred embodiment of converter 100, timing window 212 is of a predetermined length and immediately follows the end of the ON-period. Timing window 212 does not preferably intersect with the ON-period. This is because, as discussed in greater detail below, the delay in closing first switch means 130 with respect to the opening of primary switch means 140 may be used to create a zero-voltage-switching condition for first switch means 130.

Also shown in graph 210 is a predetermined time delay 214 in which first switch means 130 is opened before primary switch means 140 is closed. As discussed below in greater detail, the time delay in closing first switch means 130 with respect to the opening of primary switch means 140 in timing window 212 may be used to provide a zero-voltage-switching condition for first switch means 130 and the time delay 214 between the opening of first switch means 130 and the closing of primary switch means 140 provides a zero-voltage-switching condition for primary switch means 140. As shown in graph 220, second switch means 150 is open during time delay 214 and, thereby, prevents the loading on secondary winding 124 from diverting the magnetizing current away from stray capacitor 132.

Shown in graph 220 is a timing window 222 in which switch control means 180 closes second switch means 150. In the preferred embodiment of converter 100, timing window 222 is of a predetermined length and immediately follows the end of the OFF-period. Timing window 222 preferably does not intersect with the OFF-period. This is because, as discussed in greater detail below, the delay in closing second switch means 150 with respect to the closing of primary switch means 140 may be used to allow primary switch means 140 to reach a full conduction state before primary switch means 140 has to conduct the reflected secondary current, thereby preventing an excessive secondary load current from pulling primary switch means 140 out of a zero-voltage switching condition.

Also shown in graph 220 is a timing window 224 in which switch control means 180 opens second switch means 150. In the preferred embodiment of converter 100, timing window 224 is of a predetermined length which starts during the ON-period and ends before the closing of first switch means 130 in timing window 212. Typically, second switch means 150 is opened synchronously with the opening of primary switch means 140. However, as discussed in greater detail below, the opening of second switch means 150 after the opening of primary switch means 140 may be used to direct the current in secondary winding 124, as reflected in primary winding 122, into stray capacitor 132 before first switch means 130 is closed. This reduces the amount of magnetizing current required to charge capacitor 132 and is useful at low duty-cycle conditions where the magnitude of the magnetizing current is small. As a result of conserving the magnetizing current at low duty-cycles, the range of duty-cycles over which a zero-voltage-switching condition for primary switch means 140 can occur is extended.

In the alternative, second switch means 150 may be opened before the opening of primary switch means 140, as shown at the dotted line 226 in graph 220. This opening may be used to reduce the current in secondary winding 124 and the corresponding reflected current in primary winding 122 before primary switch means 140 is opened. In such a case, only the magnetizing current component remains in primary winding 122 when primary switch means 140 is opened, thereby reducing the power dissipation and current stresses on primary switch means 140. The reduction of such stresses is important during high-load (i.e., high duty-cycle) conditions. Therefore, the opening of second switch means 150 in timing window 224 may be varied to minimize the power dissipation losses in primary switch means 140.

Also shown in timing diagram 200 is a first switching-event sequence 230 and a second switching-event sequence 240, which are used later with reference to FIGS. 6 and 7 in discussing the operation of converter 100. Sequences 230 and 240 each divides a single switching cycle into six continuous, non-overlapping segments: segments 1, 2, 3, 4, 5, and 6 for sequence 230 and segments 1, 2', 3', 4', 5 and 6 for sequence 240. The boundary of each segment is defined by a switching event in one of the switch means, 130, 140, and 150. Sequence 230 corresponds to the case where second switch means 150 is opened after primary switch means 140 is opened, as shown in window 224, and sequence 240 corresponds to the case where second switch means 150 is opened before primary switch means 140 is opened, as indicated by line 226.

Exemplary qualitative steady-state waveforms for the key voltages and currents of forward converter 100 under switching-event sequences 230 and 240 are shown in a timing diagram 300 in FIG. 6 and a timing diagram 400 in FIG. 7, respectively. For the purposes of this discussion and without loss of generality, it is assumed that each winding of transformer 120 has the same number of turns and has no parasitic resistance and transformer 120 is operated in the linear regime of its B-H characteristic. Additionally, rectifier 160 has a nominal voltage drop for forward conducting current, a near zero current conduction for reverse applied voltage and a nominal amount of reverse-recovery current. To simplify the discussion of forward converter 100 and without loss of generality, the output voltage across load 174 is taken to be constant at a value of approximately $V_0/3$ and the voltage on storage capacitor 134 is taken to be substantially constant at a value of approximately $V_0/2$. Without loss of generality, load 174 is taken to be resistive in nature and an exemplary duty-cycle of 33.3%, which is consistent with an output voltage $V_{OUT}$ of $V_0/3$, is used for primary switch means 140.

In FIG. 6, the operation of primary switch means 140 is shown in graph 301, the operation of first switch means 130 is shown in graph 302, and the operation of second switch means 150 is shown in graph 303. Graphs 301-303 are each in the form of a time line waveform which indicates that its corresponding switch means is closed when the waveform is high and that its corresponding switch means is open when the waveform is low. Sequence 230 of FIG. 5 is reproduced as sequence 304 in FIG. 6. Likewise, in FIG. 7, the operation of primary switch means 140 is shown in graph 401, the operation of first switch means 130 is shown in graph 402, and the operation of second switch means 150 is shown in graph 403. Graphs 401-403 are each in the form of a time line waveform which indicates that its corresponding switch means is closed when the waveform is high and its corresponding switch means is open when the waveform is low. Sequence 240 of FIG. 5 is reproduced as sequence 404 in FIG. 7. In order to more easily show the transitions of key voltages and current during segments 1, 3/3', 4/4' and 6, the time-scale during each of these segments is expanded by roughly an order of magnitude with respect to the time-scale used during segments 2/2', and 5 (i.e., the waveforms are "stretched out" during segments 1, 3/3', 4/4' and 6).

In FIG. 6, the winding voltages $V_P$ and $V_S$ and the voltage $V_1$ are shown in graph 310. For the primary circuit, the total primary current $I_P$ and the current $I_{CS}$ into capacitor $C_S$ are shown in graph 320, the magnetizing current $I_M$ in inductor 123 and the current $I_1$ in primary winding 122 are shown in graph 330, and the current $I_{CC}$ flowing into storage capacitor 134 is shown in graph 340 in FIG. 6. For the secondary circuit, the output voltage $V_{OUT}$ at load 174 and the voltage $V_2$ are shown in graph 350, the currents $I_{S2}$ and $I_{CR2}$ in second switch means 150 and rectifier 160 (CR2) are shown in graph 360, and the current $I_{LOUT}$ in choke inductor 170 and the current $I_{LOAD}$ in load 174 are shown in graph 370 in FIG. 6.

Likewise in FIG. 7, the winding voltages $V_P$ and $V_S$ and the voltage $V_1$ are shown in graph 410. For the primary circuit, the total primary current $I_P$ and the current $I_{CS}$ into capacitor $C_S$ are shown in graph 420, the magnetizing current $I_M$ in inductor 123 and the current $I_1$ in primary winding 122 are shown in graph 430, and the current $I_{CC}$ flowing into storage capacitor 134 is shown in graph 440 in FIG. 7. For the secondary circuit, the output voltage $V_{OUT}$ at load 174 and the voltage $V_2$ are shown in graph 450, the currents $I_{S2}$ and $I_{CR2}$ in second switch means 150 and rectifier 160 (CR2) are shown in graph 460, and the current $I_{LOUT}$ in choke inductor 170 and the current $I_{LOAD}$ in load 174 are shown in graph 470 in FIG. 7.

During segment 1 of sequences 230 (cf., FIG. 6) and 240 (cf., FIG. 7), primary switch means 140 is closed and both first switch means 130 and second switch means 150 are open. As discussed below, the voltage across primary switch means 140 has been driven to substantially zero volts in the preceding segment, segment 6, and a zero-voltage-switching condition exits across primary switch means 140 when it closes. The zero-voltage-switching condition is shown at 311 and 313 of graph 310 in FIG. 6 and at 411 and 413 of graph 410 in FIG. 7. During segment 1, a voltage of $V_0$ appears across primary winding 122, secondary winding 124, and magnetizing inductor 123. In this segment, only the magnetizing current $I_M$ flows in inductor 123 and primary switch means 140, since second switch means 150 is open. The magnetizing current increases at a constant rate and, as in converter 3000, increases from a negative value.

In a preferred embodiment of converter 100, primary switch means 140 comprises a transistor switching device and the duration of segment 1 is sufficiently long to allow the transistor switching device to reach a full conducting state (i.e., lowest conducting resistance) after being switched on at the beginning of segment 1. The conduction of current in secondary 124 is held off until segment 2/2', at which time the transistor switching device of primary switch means 140 has lowered its ON-resistance to the point that the addition of the reflected secondary current will not substantially raise the voltage across the device's conducting terminals and, hence, will not increase the power dissipation in the device.

During segment 2 of sequence 230 (cf., FIG. 6) and segment 2' of sequence 240 (cf., FIG. 7), second switch means 150 is closed. During segments 2 and 2', the voltage of $V_0$ appearing across secondary winding 124 and the closing of switch means 150 causes a current to flow through secondary winding 124 and a corresponding current to flow in primary winding 122, due to transformer action. The magnetizing current in inductor 123 continues to increase at a constant rate due to the application of a constant voltage of $V_0$ across inductor 123 by voltage source 110. During this segment, power is transferred to the secondary circuit from the primary circuit.

In sequence 230 (cf., FIG. 6), the power transfer continues until primary switch means 140 is opened, when segment 3 begins. During segment 3, the magnetizing current $I_M$ flows into stray capacitor 132, shown in FIG. 4. This flow raises the voltage $V_1$ and, at the same time, lowers the voltage across primary winding 122 and secondary winding 124. The current in secondary winding 124 is governed by choke inductor 170 and continues to flow because the voltage across secondary winding 124, $V_S$, continues to be positive. The positive value for $V_S$ prevents rectifier 160 from conducting the current in choke inductor 170. As a result, the secondary current continues to be reflected in primary winding 122, which adds constructively with the magnetizing current $I_M$ to charge stray capacitor 132.

The voltage across stray capacitor 132 continues to rise during segment 3 (cf., FIG. 6) until it reaches a value of $V_0$ volts, at which time second switch means 150 is opened to start segment 4. If second switch means 150 is not opened when the voltage $V_1$ across stray capacitor 132 reaches $V_0$ volts, the voltage $V_S$ across secondary winding 124 would be clamped to substantially zero volts by rectifier 160. As a result, the voltage $V_1$ would be clamped to $V_0$ volts and the magnetizing current would be diverted to secondary winding 124. In segment 4, the magnetizing current $I_M$ continues to charge stray capacitor 132 until the voltage $V_1$ substantially reaches the voltage on the positive terminal of storage capacitor 134 at the end of segment 4. First switch means 130 may then be closed with zero volts across its conduction terminals, a zero-voltage-switching condition, to start segment 5. In FIG. 6, the zero-voltage-switching condition for switch means 130 is shown at 312 in graph 310, where voltage $V_1$ reaches the voltage on the positive terminal of storage capacitor 134. For an exemplary duty-cycle of 33.3%, the voltage on the positive terminal of storage capacitor 134 is equal to 3/2 $V_0$.

For sequence 240 (cf., FIG. 7), the power transfer continues during segment 2' until second switch means 150 is opened. The opening ends segment 2' and begins segment 3'. During segment 3', the reflection of secondary current in primary winding 122 ends. The magnetizing current $I_M$, however, continues to flow and increases in value due to the continuing application of $V_0$ volts across magnetizing inductance 123. Nonetheless, the current in primary switch means 140 is significantly reduced so that primary switch means 140 may be opened with lower current stresses and lower power dissipation. This opening of primary switch means 140 ends segment 3' and begins segment 4'.

During segment 4' (cf., FIG. 7), the magnetizing current $I_M$ flows into stray capacitor 132, which raises the voltage $V_1$. Segment 4' ends when the voltage $V_1$ substantially reaches the voltage on the positive terminal of storage capacitor 134. At the end of segment 4', first switch means 130 may be closed with zero volts across its conduction terminals, a zero-voltage-switching condition, to start segment 5. In FIG. 7, the zero-voltage-switching condition is shown at 412 in graph 410, where voltage $V_1$ reaches the voltage on the positive terminal of storage capacitor 134. For an exemplary duty-cycle of 33.3%, the voltage on the positive terminal of storage capacitor 134 is equal to 3/2 $V_0$.

During segment 5 for both sequences 230 (cf., FIG. 6) and 240 (cf., FIG. 7), primary switch means 140 and second switch means 150 are opened and first switch means 130 is closed. The voltage across primary winding 122 and secondary winding 124 is set at a negative value equal to the voltage $V_C$ across storage capacitor 134, approximately $-V_0/2$. The magnetizing current $I_M$ is diverted away from charging stray capacitor 132 and flows into storage capacitor 134. In the preferred embodiment of converter 100 and without loss of generally, the capacitance of storage capacitor 134 is large enough so that the voltage across storage capacitor 134 does not substantially change during segment 5. (The zero-voltage switching on primary switch means 140 and the other benefits of the present invention could be maintained with smaller capacitance values for storage capacitor 134, even though this would cause voltage variations across capacitor 134 during segment 5.) Since a constant negative voltage is being applied to inductor 123 during segment 5, the magnetizing current $I_M$ decreases at a constant rate, thereby acting to reset the transformer core. The duration of segment 5 is sufficiently long that the magnetizing current $I_M$ reverses direction and flows out of storage capacitor 134 into voltage source 110. The magnitude of the current flow $I_M$ out of storage capacitor 134 continues to grow until first switch means 130 opens, at which time segment 6 begins.

In segment 6, the magnetizing current is diverted away from storage capacitor 134 towards stray capacitor 132, where it discharges stray capacitor 132. As a result, the voltage $V_1$ is reduced in value towards zero volts. Unlike converter 3000, the secondary circuit in converter 100 is prevented from interfering with the discharging of stray capacitor 132 since second switch means 150 is opened during segment 6. At the end of segment 6, voltage $V_1$ is decreased to a value of zero volts and primary switch means 140 is closed with a zero-voltage-switching condition to start segment 1. Given the small capacitance value of stray capacitor 132 and the typically large magnitude value of the magnetizing current $I_M$ during segment 6, the magnitude of $I_M$ only decreases slightly during segment 6.

As in forward converter 3000, the time-integrated voltage across inductor 123 should be zero for each switching cycle during the steady-state operation of converter 100 to prevent the core of transformer 120 from saturating. In the steady-state operation of converter 100, the voltage $V_C$ across capacitor 134 is at a value which sets the time-integrated voltage across inductor 123 to zero during each switching cycle. This value is referred to as the required value for $V_C$ which prevents core saturation and is similar to the required value $V_{CSS}$ determined for forward converter 3000. Given the additional segments present for converter 100, specifically segments 1, 3/3', 4/4' and 6, the calculation of the exact value for $V_{CSS}$ is more complex. In practice, however, the duration of segments 1, 3/3', 4/4' and 6 are extremely small compared to the duration of segments 2/2' and 5, and the above equation (2) for $V_{CSS}$ in converter 3000 serves as a good approximation for $V_{CSS}$ in converter 100.

To keep the voltage $V_C$ on storage capacitor 134 at the required value $V_{CSS}$ under the conditions of constant input voltage, constant output voltage, and constant output load current, the flow of charge into storage capacitor 134 during the first half of segment 5 must be equal to the flow of charge out of storage capacitor 134 during the second half of segment 5 so that no net accumulation or depletion of charge occurs on storage capacitor 134 during the OFF-period. As discussed above, this same requirement was found for converter 3000. As in converter 3000, the waveform for the magnetizing current $I_M$ in converter 100 under steady-state conditions is centered around a value of zero amperes in order to prevent a net charge accumulation or depletion on storage capacitor 134 during the OFF-period. Otherwise, the voltage $V_C$ would shift away from the required $V_{CSS}$ value.

As found in converter 3000, the voltage $V_C$ and the magnetizing current $I_M$ interact so as to center the $I_M$ waveform around a value of substantially zero amperes. Additionally, the voltage value $V_{CSS}$ for storage capacitor 134 is reached during power-up conditions by transient charging or discharging of storage capacitor 134 in the same manner found in converter 3000. Also, the energy transferred out of storage capacitor 134 during the latter part of segment 5 is recycled to voltage source 110. The reversal of current flow in the magnetizing current $I_M$ though inductor 123 serves to reset the magnetic flux in the transformer's core at a point inside the third quadrant of the transformer's B-H characteristic.

The following exemplary component parameters and operating conditions of converter 100 are provided as an aid in practicing the present invention. In an exemplary embodiment of converter 100, the input voltage ($V_0$) is set at 300 V to deliver a typical output current of 1.0 A at an output voltage ($V_{OUT}$) of approximately 100 V. A switching frequency of 400 kHz is used in this exemplary embodiment with a typical duty-cycle of approximately 45%. Primary switch means 140 comprises a field-effect transistor having a breakdown voltage of 800 V and an on-resistance of 3 ohms (part number IRFBE30 from International Rectifier Corporation), first switch means 130 comprises a field-effect transistor having a breakdown voltage of 800 V and an on-resistance of 6 ohms (part number IRFBE20 from International Rectifier Corporation), and second switch means 150 comprises a field-effect transistor having a breakdown of 600 V and an on-resistance of 2.2 ohms (part number IRFBC30 from International Rectifier Corporation). In this exemplary embodiment, storage capacitor 134 ($C_C$) has a capacitance of approximately 2200 pF, stray capacitor 132 ($C_S$) has a capacitance of approximately 140 pF, and transformer 120 has an effective magnetizing inductance ($L_M$ of inductor 123) of approximately 600 μH. With this value of magnetizing inductance and under the above operating conditions, the magnetizing current has a peak-to-peak value of approximately 0.6 A.

It may now be appreciated that the following modifications of forward converter 100 shown in FIG. 4 are equivalent to the specific topology shown in FIG. 4. First, it may be appreciated that the series combination of storage capacitor 134 and first switch mean 130 may be coupled in parallel with secondary winding 124 instead of primary winding 122. This is shown and discussed in greater detail below with reference to FIG. 13. In the present invention, the coupling of the series combination must be placed before second switch means 150. Second, it may be appreciated that the negative terminal of storage capacitor 134 may be coupled to any constant voltage reference, such as ground. In the case where the negative terminal is coupled to ground, the current flow through capacitor 134 returns back to transformer 120 by way of voltage source 110. In this sense, it may be said that the series combination is coupled in parallel with the primary winding. Third, it may be appreciated that the positions of storage capacitor 134 and first switch means 130 in the series combination may be reversed. Fourth, it may be appreciated that rectifier 160, choke inductor 170, and output capacitor 172 are not essential in providing zero-voltage-switching conditions for primary switch means 140 and for first switch means 130.

It may be appreciated that switch control means 180 shown in FIG. 4 may comprise a digital microprocessor for generating the control signals for primary switch means 140, first switch means 130, and second switch means 150 according to the timing constraints detailed in timing diagram 200 shown in FIG. 5. Given the inductance $L_M$ of the magnetizing inductor 123 and capacitance $C_S$ of stray capacitor 132, the duration of the segments 1, 2/2', 3/3', 4/4', 5 and 6 required for providing zero-voltage switching can be calculated as a function of duty-cycle for the steady-state operation of converter 100. These values may be stored in a conventional memory accessible to the microprocessor and the microprocessor may select the appropriate value for each segment as dictated by the then current value of the duty-cycle. In a further microprocessor-based embodiment of switch control means 180, it may be appreciated that active voltage sensors may be coupled to primary switch means 140 and first switch means 130 for detecting zero-voltage conditions across their respective switch means. The microprocessor of switch control means 180 may then use this information in setting the duration of segments 3/3', 4/4' and 6 rather than using predetermined stored values for such segments.

As a less complex approach, which is more fully discussed in U.S. patent application Ser. No. 07/668,587, each of switch means 130 and 140 comprises a switch transistor coupled in parallel with a rectifier (e.g., the body diode of a FET transistor). Each switching transistor is responsive to the control signal provided to its corresponding switch means 130 and 140. Each rectifier is oriented to enable current to be conducted through its respective switch means in the desired direction when a zero-voltage switching condition occurs across its corresponding switch means, which often occurs before the corresponding switching transistor is rendered conductive by its control signal. As such, each rectifier provides means for detecting a zero-voltage-switching condition across its switch means and means for initially conducting current through its switch means upon the occurrence of a zero-voltage-switching condition across the switch means. This allows the timing constraints for generating the control signals to the switching transistors to be relaxed, which enables switch control means 180 to be implemented with circuitry which is substantially less complex than the above-described microprocessor-based embodiment. In this approach, the control signal to the second switch means is also generated in a less complex manner, being a delayed version of the control signal provided to the switching transistor of primary switch means 140. An example of such an approach is described in greater detail below with reference to FIGS. 9-14.

Having thus described an exemplary embodiment of a zero-voltage-switching forward converter preferably used as one of the two forward converters of the dual active clamp (DAC) forward converter according to the present invention, the DAC forward converter is now described. The DAC forward converter according to the present invention comprises two ZVS forward converters 100 coupled in parallel and operated in a manner so as to substantially reduce the input ripple current of the DAC converter. This enables the resultant compact size and low cost of the active clamp forward converter to be exploited for low-noise and high efficiency power supply applications. In one embodiment of the present invention, two ZVS active-clamp forward converters are operated out of phase by substantially 180 degrees, thereby reducing the input and output ripple currents.

A block diagram of a first embodiment of the dual active clamp forward converter according to the present invention is shown at 800 in FIG. 8. Dual active clamp (DAC) converter 800 includes an input port 801 for receiving a source of input power to be converted and an output port 802 for providing converter power derived from input port 801. Additionally, DAC converter 800 comprises an input capacitor 803 coupled across input port 801 and an output capacitor 172 coupled across output port 802. DAC converter 800 further comprises a first forward converter 100, as described above with reference to FIG. 4, a second forward converter 100', and a control means 820 for coordinating the operation of converters 100 and 100'. In order to more clearly show the arrangement of converters 100 and 100', terminals and ports have been included for each of converters 100 and 100', as described below. In a preferred embodiment of the present invention, the components and structure of second converter 100' are essentially identical to the components and structure of first converter 100. DAC converter 800 further includes a first control bus 805 for coupling switch control signals from switch control means 820 to first converter 100, and a second control bus 806 for coupling switch control signals from switch control means 820 to second converter 100'. Each control bus 805 and 806 includes a control signal for the primary switch means, first switch means, and second switch means of converter 100 and 100', respectively.

Converters 100 and 100' include input terminals 101 and 101' coupled to the positive terminal of input port 801 and input terminals 102 and 102' coupled to the negative terminal of port 802. Terminals 101 and 102 comprise an input port for receiving an input source of power for converter 100 from input port 801, and terminals 101' and 102' comprise an input port for receiving an input source of power for converter 100' from input port 801. Converters 100 and 100' also include output terminals 107 and 107' coupled to the positive terminal of output port 802 and output terminals 108 and 108' coupled to the negative terminal of port 802. Terminals 107 and 108 comprise an output port for providing power to a load output port 802, and terminals 107' and 108' comprise an output port for providing power to port 802. As such, the input and output power paths of converters 100 and 100' are coupled in parallel. Additionally, each of converters 100 and 100' includes a port 106 and 106', respectively, for providing to control means 820 a signal representative of the instantaneous input current drawn by the converter. These signals are used by control means 820 in generating the control signals for the switch means of converters 100 and 100'.

FIG. 9 shows a more detailed partial block and schematic diagram of the first embodiment of DAC converter 800 where the structure of converter 100 and 100' and their coupling to control means 820 is more clearly shown. As indicated above, converter 100' preferably has a structure which is essentially the same as that of converter 100. Accordingly, the reference numbers for the components of second converter 100' are the same as the corresponding reference numbers of converter 100 with the exception that a prime indication "'" has been appended to each of the reference numbers of second converter 100'.

First converter 100 comprises transformer 120, including windings 122 and 124 and magnetizing inductor 123, storage capacitor 134, primary switch means 140, first switch means 130, second switch means 150, rectifier 160, inductor 170, and stray capacitor 132, all as described above. These components of first converter 100 are coupled to one another as described above with reference to FIG. 4. Additionally, the output terminal of filter inductor 170 is coupled to output terminal 107 and the negative terminal of secondary winding 124 (i.e., the secondary-side ground) is coupled to output terminal 108. First converter 100 further includes an input port 103 for receiving a control signal from control means 820 for controlling primary switch means 140, an input port 104 for receiving a control signal from control means 820 for controlling first switch means 130, and an input port 105 for receiving a control signal from control means 820 for controlling second switch means 150. These control signals are provided by way of bus 805 (bus 806 for converter 100'). Not shown in FIG. 9 are a voltage source 110 and a load 174 for converters 100 and 100'. However, it may be appreciated that a voltage source 110 may be coupled to input port 801 and a load 174 may be coupled to output port 802.

First converter 100 further comprises a current sense transformer 135 for sensing the current flowing into the primary circuit of first converter 100. Sense transformer 135 includes a primary winding 136 having a first terminal coupled to terminal 101 and a second terminal coupled to primary winding 122 of power transformer 120. Sense transformer 135 further includes a secondary winding 137 having a first terminal coupled to ground and a second terminal coupled to a current sense output port 106 of first converter 100. Sense transformer 135 provides a current at port 106 which is proportional to the current being drawn from the input supply at port 801 by converter 100. As described below in greater detail, the current signal at port 106 is used by control means 820 in controlling the time duration switch means 140 and 130 are closed. In a preferred embodiment of the present invention, sense transformer 135 has a turns ratio of 1:40 (primary:secondary) and the current provided to port 106 is substantially 1/40th of the current being drawn by the primary circuit of converter 100. As such, very little voltage is dropped across sense transformer 135, typically less than 25 mV. Thus, it may be assumed that the voltage drop across current sense transformer 135 does not appreciable affect the operation of first converter 100, as described above.

In the first converter 100 shown in FIG. 9, primary switch means 140 comprises a parallel combination of a field-effect transistor 543 and rectifier 541, and first switch means 130 comprises a parallel combination of a field-effect transistor 533 and rectifier 531. Rectifiers 531 and 541 and their respective functions are described in greater detail below. Second switch means 150 comprises field effect transistor 752, and optionally a blocking rectifier 756 and a parasitic substrate diode 754. These elements and their respective functions are described in greater detail below. Each of transistors 533, 543, and 752 includes a control terminal (gate) and two conduction terminals (source and drain). The gate and source terminals of transistor 543 are coupled to control input port 103, the gate and source terminals of transistor 533 are coupled to control input port 104, and the gate and source terminals of transistor 752 are coupled to control input port 105. Each of ports 103, 104, and 105 includes two terminals for receiving two signal lines for respective coupling to these gate and source terminals. In a preferred embodiment of the present invention, each of transistors 533, 543, and 752 comprises an n-channel enhancement-type MOS field-effect transistor device. However, it may be appreciated that each of switch means 130, 140 and 150 may alternatively comprise other transistor devices, such as bipolar-junction transistors (BJTs).

Rectifiers 531 and 541 enable their respective switch means 130 and 140 to conduct under zero-voltage conditions before the corresponding switching transistors 533 and 543 are rendered conductive by their respective control signals. This enables the timing constraints for the signals provided to switching transistors 533 and 543 to be relaxed in order to achieve zero-voltage switching on switch means 130 and 140. More specifically, transistor 543 may be rendered conductive a predetermined time duration after transistor 533 is rendered non-conductive, and transistor 533 may be rendered conductive a predetermined time duration after transistor 543 is rendered non-conductive. As indicated above, the time durations for segments 3/3', 4/4', and 6 shown in FIGS. 5-7 required for zero-voltage switching are a function of the inductance $L_M$ of magnetizing inductor 123, the capacitance $C_S$ of stray capacitor 132, and the duty cycle. Thus, as the duty cycle varies in response to changes in the input voltage or the load current demand, the time duration (segment 6) between the opening of first switch means 130 and the closing of primary switch means 140 needed for zero-voltage switching on primary switch means 140 varies. Likewise, the time duration (segment 3/3' plus segment 4/4') between the opening of primary switch means 140 and the closing of first switch means 130 needed for zero-voltage switching on first switch means 130 varies. Rectifiers 531 and 541 sense the zero voltage switching condition across their corresponding switch means and selectively conduct before the corresponding switching transistors are rendered conductive, thereby automatically adjusting for variations in the required durations of segments 3/3', 4/4', and 6 caused by variations in the duty cycle and component values $C_S$ and $L_M$.

More specifically, rectifier 541 is oriented such that it conducts a forward current from the negative terminal of port 801 to the positive terminal of port 802 (e.g., the cathode of rectifier 541 is coupled to voltage node $V_1$). Rectifier 531 is oriented such that it conducts a forward current from voltage node $V_1$ to storage capacitor 134 (e.g., the anode of rectifier 531 is coupled to voltage node $V_1$). With reference to timing diagrams 300 and 400 shown in FIGS. 6 and 7, respectively, the following properties of operation for rectifiers 541 and 531 in converter 100 are apparent. Rectifier 541 conducts current from supply input port 801 to the node $V_1$ when the voltage between node $V_1$ and the negative terminal input port 801 becomes zero or negative. In timing diagrams 300 and 400 shown in FIGS. 6 and 7, this condition occurs when voltage $V_1$ is driven to zero volts in segment 6, as shown at points 311 and 313. Thus, the current in primary switch means 140 may be conducted by rectifier 541 during the first part of segment 1 and, possibly, segment 2/2', if switching transistor 543 is not rendered conductive by its control signal. If transistor 543 remains open, rectifier 541 will continue to conduct current during segments 1 and 6 as long as the primary current, shown at graph 320 in FIG. 6 and 420 in FIG. 7, remains negative. Thus, the incorporation of rectifier 541 with switch means 140 provides a relatively wide window in which transistor 543 may be closed with respect to the opening of first switch means 130.

Likewise, rectifier 531 conducts current from node $V_1$ to the positive terminal of storage capacitor 134 when the voltage at node $V_1$ is equal to or greater than the voltage at the positive terminal of capacitor 134. In timing diagrams 300 and 400 shown in FIGS. 6 and 7, this condition occurs when the voltage $V_1$ is being driven to a high positive voltage at the end of segments 4/4' by the magnetizing current $I_M$, as shown at 312 and 412, respectively. Thus, if switching transistor 533 is not closed, the current in first switch means 130 may be conducted by rectifier 531 during the first part of segment 5 since the direction of the magnetizing current is the same as the conducting direction of rectifier 531, as shown at graphs 330,340 and 430,440 in FIGS. 6 and 7. If transistor 533 remains open during segment 5, rectifier 531 will continue to conduct the current through first switch means 130 until the magnetizing current $I_M$ reverses direction half-way through segment 5, assuming steady-state operating conditions. The closing of transistor 533 may then be delayed until the midpoint of segment 5, assuming steady-state operating conditions. Thus, the incorporation of rectifier 531 with switch means 130 provides a relatively wide window in which switch means 533 may be closed with respect to the opening of primary switch means 140.

In a broader viewpoint, rectifier 531 comprises means for detecting a zero-voltage-switching condition across first switch means 130 and means for initially conducting current through switch means 130 upon the occurrence of a zero-voltage-switching condition across switch means 130. Likewise, rectifier 541 comprises means for detecting a zero-voltage-switching condition across primary switch means 140 and means for initially conducting current through switch means 140 upon the occurrence of a zero-voltage-switching condition across switch means 140. As such, the delay in closing transistor 543 after the opening of transistor 533 may be set to a predetermined, or fixed, value. The fixed delay value is applicable to a predetermined range of duty-cycles and is set to the longest time duration for segment 6 in the given range of duty-cycles. Assuming a steady-state operation for converter 100, the longest duration for segment 6 occurs for the lowest duty-cycle in the given range. Operating at the lowest duty-cycle value in the range, rectifier 541 begins to conduct at the same point that transistor 543 is closed. As the duty-cycle increases with respect to the lowest value, rectifier 541 conducts prior to the closing of transistor 543 and provides for zero-voltage switching for primary switch means 540.

Likewise, the delay in closing transistor 533 after the opening of transistor 543 may be set to a predetermined, or fixed, value for a predetermined range of duty-cycles. In the case of sequence 230, shown in FIG. 5, the fixed delay value is set to the longest time duration of the sum of segments 3 and 4 in the given range of duty-cycles. Assuming a steady-state operation for converter 100, the longest duration for the sum of segments 3 and 4 occurs for the lowest duty-cycle in the given range. In the case of sequence 240, shown in FIG. 5, the fixed delay value is set to the longest time duration of segment 4' in the given range of duty-cycles. Assuming a steady-state operation for converter 100, the longest duration for segment 4' also occurs for the lowest duty-cycle in the given range. Operating at the lowest duty-cycle value in the range, rectifier 531 begins to conduct at the same point transistor 533 is closed. As the duty-cycle increases with respect to the lowest value, rectifier 531 conducts prior to the closing of transistor 533 and provides for zero-voltage switching for first switch means 130. Such fixed delay are employed by the embodiment of switch control means 820 shown in FIGS. 11A and 11B. The above discussion also applies to second converter 100', which includes corresponding switching transistors 533' and 543' and rectifiers 531' and 541'.

In second switch means 150, field effect transistor 752 may further include a parasitic substrate diode, as indicated at 754 in FIG. 9. The inclusion of parasitic substrate diode 754 depends upon the particular transistor component used for transistor 752. If parasitic substrate diode 754 exists as part of field effect transistor 752, an undesired current will be conducted from the source terminal to the drain terminal when a negative drain-to-source voltage is applied across transistor 752. To block this undesired current, a blocking rectifier 756 coupled in series between the drain terminal of transistor 752 and secondary winding 124 may be included. As shown in FIG. 9, blocking rectifier 756 is oriented such that current conducted by parasitic substrate diode 754 is prevented from entering secondary winding 124.

If transistor 752 does not include parasitic substrate diode 754, blocking rectifier 756 may be removed so as to directly couple the drain of transistor 752 to secondary winding 124. In the case where blocking rectifier 756 can and is eliminated and where transistor 752 comprises an n-channel enhancement-type MOSFET, sufficient negative voltage should be applied between the gate and source terminals of transistor 752 during the non-conducting periods of second switch means 150 in order to maintain transistor 752 in a non-conducting state. This is because, during the non-conducting state (e.g., the converter's OFF-period), a negative voltage of between $-5$ V to $-15$ V appears at the drain terminal of transistor 752 when rectifier 756 is not present, which could cause transistor 752 to inadvertently conduct if the gate voltage is not sufficiently negative with respect to the negative voltage at the drain. The control signal at port 105 may be generated to provide such a negative voltage by circuits well known in the transistor drive art and a detailed explanation thereof is not needed for one of ordinary skill in the art to understand this aspect of the present invention and to make and use the same. It may be appreciated that some transistor switching devices (e.g., BJT devices) may not require the above-described application of negative voltage during the non-conductive state.

The operation of first converter 100, including the zero-voltage switching conditions for switch means 140 and 130, is as described above with reference to FIGS. 4–7. As described in greater detail below, control means 820 provides the control signals to switch means 130, 140, and 150 for this operation. Likewise, in a preferred embodiment of the present invention, the operation of second converter 100', including the zero-voltage switching conditions for switch means 140' and 130', is as described above with reference to FIGS. 4–7. As is also described in greater detail below, control means 820 provides the control signals to switch means 130', 140', and 150' for this operation. However, the switching cycle for second converter 100' is substantially different from the switching cycle for first converter 100. This difference is discussed below in greater detail with reference to the operation of control means 820.

For each of converters 100 and 100', the symbolic notations $V_S$, $V_P$, $V_1$, $V_2$, $I_P$, $I_M$, $I_1$, $I_{S2}$, $I_{CR2}$, $I_{LOUT}$, $I_{CC}$, and $I_{CS}$ shown in FIG. 9 have the same designations and references as the corresponding notations shown in FIG. 4. The total current flow into first converter 100 is shown by the current designation $I_{IN}$ at input terminal 101 and the total current flow into first converter 100' is shown by the current designation $I'_{IN}$ at input terminal 101'. The combined input currents of converters 100 and 100' is shown by the current designation $I_{MAIN}$, which is equal to $I_{IN}+I'_{IN}$. The output current of DAC converter 800 is equal to the combined output current $I_{LOUT}$ and $I'_{LOUT}$ of converters 100 and 100', respectively, and is shown by the current designation $I_{OUT}$ in FIG. 9.

Current $I_{IN}$ into converter 100 is equal to the sum of the magnetizing current $I_M$ and the reflected current $I_1$ of secondary winding 124 less the current $I_{CC}$ through clamp capacitor 134. In mathematical terms, this is stated as $I_{IN}=I_M+I_1-I_{CC}$. The subtraction of, rather than the addition of, the clamp capacitor current $I_{CC}$ in this embodiment of the present invention is due to the choice of the reference direction of $I_{CC}$ into capacitor 134 from first switch means 130. As discussed above, the magnetizing current $I_M$ is first directed into clamp capacitor 134 during the first half of the OFF period and then reversed and directed out of clamp capacitor 134 towards node $V_1$ during the second half of the OFF period. Because the current path into clamp capacitor 134 is completed via a path which is in parallel with primary winding 122, the magnetizing current $I_M$ and clamp-capacitor current $I_{CC}$ cancel one another in the relationship for $I_{IN}$ during the OFF period. Thus, the reversal of the magnetizing current $I_M$ during the OFF period is not coupled to the input source connected to input port 121. In a similar manner, the current $I'_{IN}$ into second converter 100' is equal to the sum of the magnetizing current $I'_M$ and the reflected current $I'_1$ of secondary winding 124' less the current $I'_{CC}$ through clamp capacitor 134': $I'_{IN}=I'_M+I'_1-I'_{CC}$.

Shown at 850 in FIG. 10 is a timing diagram of exemplary waveforms of key voltages and currents of DAC converter 800, shown as a function of time. Timing diagram 850 includes graphs 851–861 for showing the key voltages and currents and is discussed more fully below. As an aid in practicing the present invention, Table I lists the component values for a preferred embodiment of DAC converter 800 which provides a 44 VDC-to-5 VDC converter capable of providing a maximum output current of 40 A.

TABLE I

| Input Capacitor 803 | 1.8uF, 100V |
|---|---|
| Output Capacitor 172 | 96uF, 10V (Two 47uF Capacitors) |
| Power Transformer 120 | Turns ratio = 8:2 = 4:1 (pri:sec) |
| Transistor 140 | IRFP250 (International Rectifier) |
| Transistor 130 | IRFR220 (International Rectifier) |
| Transistor 150 | IRFP054 (International Rectifier) |
| Capacitor 134 | 47nF, 200V |
| Sense Transformer 135 | Turns ratio = 1:40 (pri:sec) |
| Rectifier 160 | ~0.5V forward Voltage |
| Inductor 170 | 1.8uH |
| Switching Frequency | 500KHz |

Having thus described the structure and operation of first converter 100 and second converter 100', the operation of control means 820 and the coordination of operating converters 100 and 100' are now described. For first converter 100, control means 820 includes an output control port 821 coupled to input control port 103 for providing a control signal to transistor 543 of primary switch means 140, an output control port 822 coupled to input control port 104 for providing a control signal to transistor 533 of first switch means 130, and an output control port 823 coupled to input control port 105 for providing a control signal to transistor 752 of second switch means 150. Each of ports 821, 822, and 823 comprises two terminals which are coupled to respective terminals of input ports 103, 104, and 105, respectively. In a preferred embodiment of DAC converter 800, each of the control signals at ports 821, 822, and 823 appears as a voltage across the terminals of ports 821, 822, and 823, respectively. For second converter 100', control means 820 further includes an output control port 824 coupled to input control port 103' for providing a control signal to transistor 543' of primary switch means 140', an output control port 825 coupled to input control port 104' for providing a control signal to transistor 533' of first switch means 130', and an output control port 826 coupled to input control port 105' for providing a control signal to transistor 752' of second switch means 150'. Each of ports 824, 825, and 826 comprises two terminals which are coupled to respective terminals of input ports 103', 104', and 105', respectively. In a preferred embodiment of DAC converter 800, each of the control signals at ports 824, 825, and 826 appears as a voltage across the terminals of ports 824, 825, and 826, respectively.

Control means 820 further includes a power port 830 coupled to input port 801 for receiving a source of power and an output monitoring port 827 coupled to output 802 for receiving the voltage provided to port 802. Control means 820 further includes an input port 828 coupled to port 106 of first converter 100 for receiving a signal representative of the primary current of first converter 100 and an input port 829 coupled to port 106' of second converter 100' for receiving a signal representative of the primary current of second converter 100'. As described below in greater detail, control means 820 senses the output voltage at port 802 via port 827 and respective converter primary currents at ports 828 and 829, and, in response thereto, adjusts the duty-cycle of the control signals present on control ports 821–826.

In operation, control means 820 coordinates the operation of first converter 100 and second converter 100' such that the amount of ripple current at input port 801 is minimized. This is done by providing coordinated pulse-width modulated signals to ports 821–826. In one embodiment of the present invention, the signals at ports 821–823 (bus 805) have a common switching cycle period T, or time duration T, which is preferably substantially constant during operation of DAC converter 800. Additionally, the signals at ports 824–826 (bus 806) have a common switching cycle period T', or time duration T', which is substantially equal to the duration of period T. The signals at ports 821–826, along with key currents of converters 100 and 100', are shown as a function of time by a timing diagram at 850 in FIG. 10. Specifically, the signals at ports 821–826 are shown by graphs 851–856, respectively. In a preferred embodiment of DAC converter 800, each of the signals at ports 821–826 has a "resting" state of substantially zero volts and a "pulse" state of substantially 10 volts, as seen in graphs 851–856, respectively. For each of ports 821–826, the voltage appears across the port's terminals, and in turn, across the gate and source terminals of the MOSFET transistor coupled to the port. In the pulse state, a positive voltage is applied between the gate and source terminals, with the gate terminal being more positive.

The signals at ports 821 and 822 for primary switch means 140 and first switch means 130, respectively, are complimentary to one another, and the signals at ports 824 and 825 for primary switch means 140' and first switch means 130', respectively, are complimentary to one another. For example, the signal at port 821 is in its pulse state when the signal at port 822 is in its resting state, and the signal at port 822 is in its pulse state when the signal at port 821 is in its resting state. The ensures that switch means 140 and 130 are switched opposite to one another and that neither are conducting at the same time. The same applies to switch means 140' and 130' of second converter 100'. In one embodiment of DAC converter 800, the signals at ports 823 and 826 for second switch means 150 and 150' are substantially delayed versions of the signals at ports 821 and 824, respectively. This may be seen by comparing graphs 853 and 851, and graphs 856 and 854. This is according to the first switching-event sequence 230 discussed above with reference to FIGS. 5 and 6. However, it may be appreciated that the second switching-event sequence 240 discussed above with reference to FIGS. 5 and 7 may also be used.

Each of the control signals at ports 821 and 824 (primary switch means) starts its respective switching cycle with its pulse state, thereby being in its pulse state during the beginning portion of its switching period T and being in its resting state during the latter portion of its switching period T (time duration T). Additionally, the control signal at port 824, which is for primary switch means 140' of second converter 100', starts its switching cycle substantially one-half switching-cycle period (T/2) after the control signal at port 821 starts its switching cycle, the signal at port 821 being for primary switch means 140 of first converter 100. Thus, converters 100 and 100' operate substantially 180 degrees out of phase. This offset is shown at the beginning of graph 854 at 865.

Also in a preferred embodiment of the present invention, the duty cycle of the control signals at ports 821 and 824 is nominally set to a value of substantially 0.50 (50%). Additionally, the control signals at ports 821 and 824 are coordinated to have substantially the same duty cycle during operation in their respective switching periods T and T'. The pulse duration for each of the control signals at ports 821 and 824 (primary switch means 140 and 140', respectively) is equal to the duty cycle multiplied by the corresponding switching period, e.g., (duty cycle)*T. The pulse duration for each of the control signals at ports 822 and 825 (first switch means 130 and 130', respectively) is equal to the fraction 1.0 less the duty cycle, the difference multiplied by the corresponding switching period, e.g., (1-(duty cycle))*T.

In a further embodiment of the present invention, the duty cycle for the control signals at ports 821 and 824 (for the primary switch means) is targeted for a nominal operating value of substantially 0.50 (50%) and an operating range of 0.30 (30%) to 0.70 (70%). This allows a substantial amount of ripple-current reduction during nominal operation at 0.50 (50%) and allows for compensating over- and under-voltages at the input by moving the duty-cycle towards 0.30 (30%) and 0.70 (70%), respectively, while still maintaining good input and output ripple current characteristics. Examples of the input and output ripple reduction as a function of duty-cycle are provided below.

In a preferred embodiment of the present invention, the duty cycle for the control signals at ports 821 and 824 (for the primary switch means) ranges between 0.40 and 0.65 about a nominal value of 0.50. As such, the corresponding, complimentary duty cycle for the control signals at ports 822 and 825 (for the first switch means) ranges between 0.60 and 0.35. As is known in the forward converter art, the duty cycle for the primary switch means (ports 821 and 824) is adjusted to regulate the voltage at output port 802 and to compensate for variations in the voltage at input port 801. If the output voltage decreases from its targeted nominal value, control means 820 increases the duty cycle to provide more current to output capacitor 172 and the load at port 802 in order to increase the output voltage. If the output voltage increases above its nominal value, the duty cycle is decreased to provide less current. If the input voltage decreases from its nominal value, less voltage is provided to the secondary circuits of converters 100 and 100' during their respective ON periods and, hence, less energy is coupled to the output by the secondary circuits. To compensate for the energy loss, control means 820 increases the duration of the ON periods to increase the amount of energy coupled so as to maintain the output voltage at its nominal value.

The steady-state output voltage for each of converters 100 and 100' under nominal current loads is related to the input voltage and duty-cycle by the following equation:

$$(V_{OUT} + V_F) = \frac{(DutyCycle) \cdot V_{IN}}{N_{TURNS}} \quad (3)$$

where $V_{OUT}$ is the output voltage, $V_F$ is the voltage losses in the secondary circuit (mainly from the secondary-side rectifiers 160, 160', 756, and 756', and transistors 752 and 752'), $V_{IN}$ is the input voltage, and $N_{TURNS}$ is the turns ratio of the power transformer, such as 120 and 120' (number of primary turns divided by the number of secondary turns). In the present invention, the duty cycle is varied in response to changes in the input voltage, so as to maintain the output voltage $V_{OUT}$ at a targeted nominal value.

To realized a 50% duty cycle operation for converters 100 and 100' at the nominal output voltage $V_{OUT,NOM}$, the ratio of the nominal input voltage $V_{IN,NOM}$ to the transformer turns ratio $N_{TURNS}$ is set as follows:

$$\frac{V_{IN,NOM}}{N_{TURNS}} = \frac{(V_{OUT,NOM} + V_F)}{0.50} \quad (4)$$

Generally, the nominal input voltage $V_{IN,NOM}$ is a given parameter, i.e., a constraint, leaving the transformer turns ratio $N_{TURNS}$ as the parameter to be chosen to satisfy equation (4). For example, if DAC converter 800 is to have a nominal input voltage of $V_{IN,NOM} = 48$ V with a nominal output voltage of $V_{OUT,NOM} = 5$ V and a typical voltage loss $V_F$ of 0.5 V, the transformer turns ratio $N_{TURNS}$ for each converter 100 and 100' would be substantially set to 4.36:1, or 13:3, to satisfy equation (4). In this way, the transformer turns ratio may be used to effectively set the duty cycle for each of converters 100 and 100' to substantially 50% (0.50) for operation at the given nominal input voltage and nominal output voltage. For a nominal input voltage of 44 V and a nominal output voltage of 5 V, $N_{TURNS}$ would be substantially 4:1, or an integer multiple thereof. As described below in greater detail, control means 820 operates to keep the output voltage close to the nominal output voltage. Thus, when the input voltage is at its nominal value, control means 820 operates to keep the duty cycle for each of converters 100 and 100' near 50%.

For generating the control signals at port 821-826, control means 820 further comprises a pulse width modulation (PWM) means 910, as shown in FIG. 8., for generating a first duty-cycle signal $S_1$ for controlling first converter 100 and a second duty-cycle signal $S_2$ for controlling second converter 100'. Each of the first and second duty-cycle signals has a first state and a second state, and each alternates in time between its respective first and second states. Additionally, the second duty-cycle signal is phase-shifted in time by substantially 180 degrees from the first duty-cycle signal. In a preferred embodiment of the present invention and as described below in greater detail, the first duty-cycle signal is coupled to port 821 (for primary switch means 140 of converter 100) substantially unchanged and the second duty-cycle signal is coupled to port 824 (for primary switch means 140' of converter 100') substantially unchanged. Each of the duty-cycle signals is generated as a function of the measured output voltage and the targeted nominal output voltage such that the output voltage is regulated to be within a specified range around the nominal output voltage. An exemplary range is ±10 mV around a nominal output voltage of 5 V. In a preferred embodiment of DAC converter 800, each of the duty-cycle signals is also a function of the primary input current of its respective converter (current-mode control). In turn, the primary input current waveform is a function of the input voltage, as described in greater detail below, thereby making each of the duty cycle signals a function of the input voltage. As such, with the transformer turns ratio $N_{TURNS}$ for each converter 100 and 100' set for 50% duty-cycle operation as described above, each of the duty cycle signals is substantially 0.50 (50%) when the input and output voltages are at their respective nominal values.

As indicated above, first switch means 130 and 130' are operated in a complimentary manner with respect to their corresponding primary switch means 140 and 140', respectively. For this, control means 820 further comprises a first control means 970, as shown in FIG. 8, which is responsive to the first duty-cycle signal and is for operating primary switch means 140 and first switch means 130 of first converter 100 in a complimentary manner. Specifically, first control means 970 generates a pulse state at port 821 to cause primary switch means 140 to close substantially when the first duty-cycle signal enters its respective first state, and generates a resting state at port 821 to cause primary switch means 140 to open substantially when the first duty-cycle signal enters its respective second state. Additionally, first control means 970 generates a resting state at port 822 to cause first switch means 130 to open substantially when the first duty-cycle signal enters its respective first state, and generates a pulsed state at port 822 to close substantially when the first duty-cycle signal enters its respective second state. In a preferred embodiment of the present invention, the pulse state for the signals at ports 821 and 822 are non-overlapping such that switch means 130 and 140 are not rendered conductive at the same time. In an embodiment described below, the pulsed states of the signals at ports 821 and 822 are separated by predetermined time durations. In one embodiment of the present invention, first control means 970 is also for operating second switch means 150 and generates a signal at port 823 to cause second switch means 150 to close a time duration after primary switch means 140 closes and to open substantially when primary switch means 140 opens. In this embodiment, as described in greater detail below with reference to FIGS. 11 and 12, the first control means causes second switch means 150 to open a short time duration after primary switch means 140 opens.

In a similar manner, control means 820 further comprises a second control means 999, as shown in FIG. 8, which is responsive to the second duty-cycle signal and is for operating primary switch means 140' and first switch means 130' of second converter 100' in a complimentary manner. Specifically, second control means 999 generates a pulse state at port 824 to cause primary switch means 140' to close substantially when the second duty-cycle signal enters its respective first state, and generates a resting state at port 824 to cause primary switch means 140' to open substantially when the second duty-cycle signal enters its respective second state. Additionally, second control means 999 generates a resting state for the signal at port 825 to cause first switch means 130' to open substantially when the second duty-cycle signal enters its respective first state, and generates a pulse state at port 825 to close substantially when the second duty-cycle signal enters its respective second state. In a preferred embodiment of the present invention, the signals at ports 824 and 825 are non-overlapping such that switch means 140' and 130' are not rendered conductive at the same time. In an embodiment described below, the pulsed states of the signals at ports 824 and 825 are separated by predetermined time durations. In one embodiment of the present invention, the second control means is also for operating second switch means 150' and generates a signal at port 826 to cause second switch means 150' to close a time duration after primary switch means 140' closes and to open substantially when primary switch means 140' opens. In this embodiment, as described in greater detail below with reference FIGS. 11 and 12, the second control means causes second switch means 150' to open a short time duration after primary switch means 140' opens.

In a further preferred embodiment of the present invention, PWM means 910 generates the duty cycles signals $S_1$ and $S_2$ such that the first state of each duty-cycle signal is the pulse state and the second state is the resting state. Additionally, each of the duty-cycle signals $S_1$ and $S_2$ further comprises a plurality of consecutive switching periods, each said switching period have a substantially constant time duration T. Each switching period begins when its corresponding duty-cycle signal enters its respective first state from its respective state, continues when its corresponding duty-cycle signal enters its respective second state from its respective first state, and ends when its corresponding duty-cycle signal next enters its respective first state from its respective second state. Further, the consecutive switching periods of the second duty-cycle signal start substantially one-half of the time duration T after the consecutive switching periods of the first duty-cycle signal start. Stated in another way, the second duty-cycle signal enters its respective first (pulse) state substantially T/2 after the first duty-cycle signal enters its respective first (pulse) state. In this way, PWM means 910 generates the duty cycle signals such that the second duty-cycle signal is phase-shifted by substantially 180 degrees from the first duty-cycle signal.

In a preferred embodiment of the present invention, the duration of the first (pulse) states of the duty cycle signals are substantially the same. In other words, the first and second duty-cycle signals are coordinated to have substantially the same duty-cycle value by PWM means 910. This aids in having first converter 100 and second converter 100' equally provide power to output port 802.

The reduction of the input ripple current at input port 801 by the coordination of control signals at ports 821-826 is explained with reference to timing graphs 857-860 shown in FIG. 10. The following parameters are taken; a duty cycle of 0.50 (50%); a 4:1 turns ratio for power transformers 120 and 120'; a nominal input voltage of 44 V, a nominal output voltage of 5 V, 40 A output load current (maximum), 20 A for each of converters 100 and 100'; a nominal output ripple current of 3 A in each of converters 100 and 100'; and a nominal magnetizing ripple current of 0.25 A for each of converters 100 and 100'. Graph 857 shows the magnetizing currents $I_M$ and $I'_M$ of converters 100 and 100', respectively; graph 858 shows the clamp currents $I_{CC}$ and $I'_{CC}$ of converters 100 and 100', respectively; graph 859 shows the output currents $I_{LOUT}$ and $I'_{LOUT}$ of converters 100 and 100', respectively; and graph 860 shows the primary input currents $I_{IN}$ and $I'_{IN}$ of converters 100 and 100', respectively. The currents $I_M$, $I_{CC}$, $I_{LOUT}$, and $I_{IN}$ for first converter 100 are shown by solid lines in graphs 857-860, and the currents $I'_M$, $I'_{CC}$, $I'_{LOUT}$, and $I'_{IN}$ for second converter 100' are shown by dashed lines in graphs 857-860.

As seen in graph 857, the magnetizing currents $I_M$ and $I'_M$ rise during the ON periods of their respective converters and fall during the OFF periods of their respective converters. In a preferred embodiment of the present invention, both magnetizing currents are centered around zero amperes. As indicated above, each of the magnetizing currents $I_M$ and $I'_M$ is directed into its corresponding clamp capacitor 134 and 134', respectively, during the OFF period of its converter. This may be seen in graph 858 where $I_{CC}$ is substantially equal to $I_M$ during the OFF period of first converter 100 and where $I'_{CC}$ is substantially equal to $I'_M$ during the OFF period of second converter 100'. As indicated above, currents $I_{CC}$ and $I'_{CC}$ are substantially zero during the ON periods of their respective converters because first switch means 130 and 130' are not conducting during the respective OFF periods.

Each of the inductor currents $I_{LOUT}$ and $I'_{LOUT}$, as shown in graph 859, rises at a substantially uniform rate during its converter's ON period and falls at a substantially uniform rate during its converter's OFF period. The rates of increase and decrease (i.e., slopes) of these currents have substantially the same magnitude, which is due to the duty-cycle being at substantially 0.50 (50%). Each of current $I_{LOUT}$ and $I'_{LOUT}$ are centered about an average D.C. value, which represents the average curent delivered to the output by converters 100 and 100', respectively. Due to the substantially 180 degree phase difference in the operation of first converter 100 and second converter 100', current $I'_{LOUT}$ decreases when current $I_{LOUT}$ increases, and current $I'_{LOUT}$ increases when current $I_{LOUT}$ decreases. Thus, the ripple in currents $I_{LOUT}$ and $I'_{LOUT}$ are complimentary to one another and, when combined at output port 802, cancel one another to leave substantially no ripple current at output port 802 for a duty cycle of 0.50 (50%).

The output current at port 802 is designated as current $I_{OUT}$ and is shown in FIG. 9. The waveform characteristic of $I_{OUT}$ is shown in graph 859 of FIG. 10 as $I_{OUT}/2$ (dotted line) to better shown the cancellation of the ripple components in currents $I_{LOUT}$ and $I'_{LOUT}$. With this reduction in the output ripple current, the capacitance value and displacement volume of output capacitor 172 may be significantly reduced over that required by a single active clamp forward converter providing the same power capability. (As a comparison, such a single converter would have an output ripple current twice that of current $I_{LOUT}$, or that of current $I'_{LOUT}$.) In the best case of a 50% duty cycle, no output capacitance would be needed to absorb the ripple current. However, as indicated above, the duty-cycle is often varied to compensate for changes in input voltage and output current demand. As the duty cycle of DAC converter 800 is changed from a value of 0.50 (50%), the amount of ripple current increases in proportion to the magnitude of the deviation away from 0.50, i.e., $\alpha \| 0.50 - \text{duty cycle} \|$. A more detailed analysis of the output ripple current is given below after the input current $I_{IN}$ and $I'_{IN}$ are discussed.

The primary input currents $I_{IN}$ and $I'_{IN}$ to converters 100 and 100', respectively, are shown in graph 860 of FIG. 10. Each of the input currents $I_{IN}$ and $I'_{IN}$ rises at a substantially linear rate during the ON period of its corresponding converter, and drops to zero during the OFF period of its corresponding converter. As indicated above, the current $I_{IN}$ during the ON period of converter 100 is equal to the sum of the magnetizing current $I_M$ and to the reflected secondary current $I_1$, which is substantially equal to $I_{LOUT}/4$ since the turns ratio of transformer 120 is taken as 4:1. Thus, these components in graphs 857 and 859 add to give $I_{IN}$ in graph 860. During the OFF period, as indicated above, the magnetizing current $I_M$ is directed into clamp capacitor 134, and therefore is not reflected in $I_{IN}$. Additionally, the secondary current flow during the OFF period is substantially supported by rectifier 160 (CR2), and therefore is not reflected in $I_{IN}$. Thus, $I_{IN}$ is substantially zero during the OFF periods, as shown in graph 860. A similar analysis applies to primary input current $I'_{IN}$ for second converter 100' in relation to its waveform shown in graph 860.

The summation of the input currents $I_{IN}$ and $I'_{IN}$ occurs at input port 801, and is designated as $I_{MAIN}$ in FIG. 9 and graph 860 of FIG. 10 (dotted line). As can be seen in graph 860, the current $I_{MAIN}$ follows the alternating "ripples" of $I_{IN}$ and $I'_{IN}$. $I_{MAIN}$ comprises a DC component and an AC ripple component, which includes the ripple currents from the magnetizing currents and the ripple currents of the reflected secondary currents. In the exemplary embodiment indicated above, each magnetizing ripple current has a peak-to-peak variation of ~0.25 A and each of the secondary ripple currents has a peak-to-peak variation of ~3 A. When reflected to the primary circuit with a 4:1 turns ratio, the peak-to-peak variation of each reflected secondary ripple current is ~0.75 A. Thus, the peak-to-peak variation of the ripple current of $I_{MAIN}$ in this exemplary embodiment is approximately 1.0 A (0.25 A + 0.75 A). This ripple current is approximately 25% of the maximum DC component of $I_{MAIN}$, which is ~5 A. The AC ripple current of $I_{MAIN}$ is shown in greater detail by a timing diagram 1300 in FIG. 15, which shows at a graph 1310 the input ripple currents of a single active clamp forward converter, of a DAC converter 800 comprising converters 100, and another of a DAC converter 800 according to the present invention discussed in greater detail below. The AC ripple current of $I_{MAIN}$ is shown at 1314 in FIG. 15.

As indicated above, the active clamp comprising capacitor 134 and first switch means 130 may also be coupled in parallel with the secondary winding of transformer 120. Such a converter suitable for use in DAC converter 800 is shown at 1100 in FIG. 13 as a second embodiment of the active-clamp forward converter according to the present invention. Converter 1100 comprises the same elements as those of converter 100 shown in FIG. 9. The reference number of each element of converter 1100 comprises the reference number of the corresponding element of converter 100 plus an appended designation "a". The elements of converter 1100 are coupled to one another is the same manner as the elements of converter 100 shown in FIG. 9 with the exception that the series combination of capacitor 134a and first switch means 130a is coupled in parallel with the secondary winding 124a, before second switch means 150a. (It may also be appreciated that the active clamp may also be coupled in parallel to a third winding of power transformer 120, which would be dedicated for the active clamp.) A DAC converter 800 comprising converters 100a has input-ripple-current and output-ripple-current characteristics substantially similar to those of a DAC converter 800 which comprises comverters 100.

The active clamp comprising capacitor 134 and first switch means 130 may also be coupled in parallel with primary switch means 140. Such a converter suitable for use in DAC converter 800 is shown at 1200 in FIG. 14 as a third embodiment of the active-clamp forward converter according to the present invention. Converter 1200 comprises the same elements as those of converter 100 shown in FIG. 9. The reference number of each element of converter 1200 comprises the reference number of the corresponding element of converter 100 plus an appended designation "b". The elements of converter 1200 are coupled to one another is the same manner as the elements of converter 100 shown in FIG. 9 with the exception that the series combination of capacitor 134b and first switch means 130b is coupled in parallel with primary switch means 140b. A DAC converter 800 comprising converters 100b has an output-ripple-current characteristic substantially similar to that of a DAC converter 800 which comprises converters 100.

However, a DAC converter 800 which comprises a first converter 100b and a second converter 100b' has an input-ripple-current characteristic in comparison to that of a DAC converter 800 which comprises two converters 100. This is because the magnetizing currents of the converters 100b and 100b' are "counter-balanced" against one another. The parallel coupling of the active clamp with the primary switch means (140b, 140b') allows the magnetizing current ($I_M$, $I'_M$) during the OFF period of its respective converter (100b, 100b') to be coupled through to input port 801 and capacitor 803 and, therefore, to show up in the converter input current ($I^*_{IN}$, $I^*_{IN}'$) during the OFF period. The input currents of two such converters 100b and 100b' are designated as $I^*_{IN}$ and $I^*_{IN}'$, respectively, and are shown in a graph 861 in FIG. 10. As indicated above with regard to forward converter 100, the primary input current $I_{IN}$ of converter 100 is equal to the sum of the magnetizing current $I_M$ and the reflected secondary current $I_1$ less the clamp capacitor current $I_{CC}$, of which the currents $I_M$ and $I_{CC}$ substantially canceled one another in the formation of $I_{IN}$ during the OFF period of converter 100. Therefore, in converter 100 shown in FIG. 9, the current $I_{IN}$ is substantially zero during the OFF period (as indicated above, the reflected secondary current is zero during this time). In converter 100b, however, the primary input current $I^*_{IN}$ is equal to the sum of the magnetizing current $I_M$ and the reflected secondary current $I_1$. The current $I_{CC}$ does not form part of the mathematical summation of the input current $I^*_{IN}$ and, as such, the currents $I_M$ and $I_{CC}$ of converter 100b (and 100b') do not cancel one another in the formation of $I^*_{IN}$ during the OFF period of converter 100b (and 100b'). Therefore, the current $I^*_{IN}$ is substantially equal to the current $I_M$ during the OFF period of converter 100b (and 100b').

When combined at input port 801 of a DAC converter 800, the magnetizing current component of $I^*_{IN}$ during the OFF period of the first converter 100b substantially cancels the magnetizing current component of $I^*_{IN}'$ during the ON period of the second converter 100b and, vice-versa, the magnetizing current component of $I^*_{IN}'$ during the OFF period of the second converter 100b' substantially cancels the magnetizing current component of $I^*_{IN}'$ during the ON period of the first converter 100b. The cancellation may be seen in the waveform of the combined currents $I^*_{MAIN}$ ($=I^*_{IN}+I^*_{IN}'$), which is shown in graph 861 of FIG. 10 (dotted line). As can be seen by comparing graphs 861 and 860, the ripple of input current $I^*_{MAIN}$ is substantially less than that of the current $I_{MAIN}$ of DAC converter 800 comprising converters 100. The ripple current that remains in current $I^*_{MAIN}$ is due to the ripple current present in the inductor currents $I_{LOUT}$ and $I_{LOUT}'$, as reflected to the primary circuit. As discussed above, the inductor currents $I_{LOUT}$ and $I_{LOUT}'$ are reflected to the primary circuit substantially only during the ON periods of their respective converters. Thus, the rising edge ripples in currents $I_{LOUT}$ and $I_{LOUT}'$ are propagated to $I^*_{MAIN}$. Using the component values listed in TABLE I and a peak-to-peak value of 3 A for the output ripple current of each converter 100b and 100b', the peak-to-peak value of the output ripple current as reflected in $I^*_{MAIN}$ of the DAC converter is ~0.75 A. This is approximately 0.25 A less than the ripple current of $I_{MAIN}$ for a DAC converter comprising converters 100, which is 1.0 A, and represents a 25% reduction in the amount of input ripple current. The AC ripple current of $I^*_{MAIN}$ is shown in greater detail at 1316 in graph 1310 of timing diagram 1300, which is shown in FIG. 15.

The ripple current for a single active clamp forward converter having the same output power capability as DAC converter 800 is shown at 1312 in graph 1310 of timing diagram 1300. This characteristic may be obtained by multiplying the waveform of $I_{IN}$ shown in graph 860 (FIG. 10) by 2 (to equalize output power capabilities) and centering the resulting waveform above an average value. The peak-to-peak variation for the input ripple current of the single active clamp forward converter shown at 1312 is approximately 11.25 A, which is approximately eleven times the peak-to-peak variation for $I_{MAIN}$ of DAC converter 800, which is ~1.0 A.

Timing diagram 1300 also shows at a graph 1320 the ripple voltages that result from the input ripple currents being applied to a fixed reference capacitor of 1 Farad. To obtain the waveforms for the corresponding ripple voltages, the ripple currents are integrated as a function time over a switching period according to the formula:

$V = (1/C) * \int I \, dt$, C is taken as 1 Farad for a ready basis of comparison. The ripple voltage for the single active clamp converter is shown at 1322 in FIG. 15, and the ripple voltage for DAC converter 800 comprising converters 100 and 100' is shown at 1324. (The ripple voltage shown at 1322 has been scaled by a factor of one-half so that it may be shown with the other voltages and currents of FIG. 15.) The ripple voltage shown at 1324 has a peak-to-peak value which is roughly forty times smaller than the ripple voltage shown at 1322. This is because the peak-to-peak value for the ripple current of DAC converter 800 is roughly 11 times smaller than that for the single active clamp converter, because the ripple current for DAC converter 800 is triangular whereas the ripple current of the single converter is substantially rectangular, and because the repetition period for the ripple current of DAC converter 800 (i.e., T/2) is one-half that of the single active clamp converter (i.e., T). This means that DAC converter 800 comprising converters 100 and 100' may have, for the same amount of power output capability, an input capacitance which is 2.5% of that required for a single active clamp converter or, conversely, has 2.5% of the input ripple voltage for the same amount of input capacitance.

The input ripple current component of $I^*_{MAIN}$ for a DAC converter 800 comprising converters 100b and 100b' is shown at 1316 in FIG. 15. As seen, $I^*_{MAIN}$ has a peak-to-peak variation which is roughly 75% that of $I_{MAIN}$ shown at 1314. The corresponding input ripple voltage is shown at 1326 in FIG. 15, and is calculated in the same manner as that for $I_{MAIN}$. The peak-to-peak variation in the input ripple voltage for a DAC converter 800 comprising converters 100b and 100b' is roughly 75% that of a DAC converter 800 comprising converters 100 and 100', and roughly 1/50$^{th}$ that of the single active clamp forward converter. This means that a DAC converter 800 converter comprising converters 100b and 100b' may have, for the same amount of power output capability, an input capacitance which is 2% of that required for a single active clamp converter or, conversely, may have 2% of the output ripple voltage for the same amount of input capacitance.

As indicated above, the output ripple current for DAC converter 800 is essentially zero at a duty cycle of 0.50 (50%). This would be an "infinite" improvement over that of the single active clamp forward converter. However, as indicated above, a finite output ripple current is produced when the duty cycle varies away from 0.50. An analysis of the output ripple current shows that, in the range of duty cycles from 0.3 to 0.7, the peak-to-peak variation in the ripple current ($I_{RPP}$) divided by the corresponding variation in a single active clamp forward converter providing the same power capability is given approximately as $(0.88*D + 0.25*D^{0.5})$, where $D = \| 0.50\text{-duty-cycle} \|$. In a preferred embodiment of DAC converter 800, the duty cycle ranges between 0.40 (D=0.10) and 0.65 (D=0.15). Thus, taking the larger value of D at 0.15 (duty cycle=0.65), the maximum output ripple current of DAC converter 800 is only 23% of the output ripple current of a single active clamp forward converter providing the same output power capability.

A further analysis shows that the repetition period of the output ripple current of DAC converter 800 is half that of the single active clamp converter. The combination of halving the repetition period and of reducing the peak-to-peak variation by approximately a factor of 4.3 reduces the amount of ripple voltage at the output by approximately a factor of 8.6. As indicated above with regard to the input ripple current, the amount of output ripple voltage induced by the output ripple current can be calculated by integrating the capacitance formula $I_{RPP} = C_{OUT} dV_{RPP}/dt$ to solve for $V_{RPP}$. Rather than performing the integration, however, the magnitude of the differential $V_{RPP}$ can be estimated with the formula: $dV_{RPP} = 1/C_{OUT} * I_{RPP} * dt$. Thus, reducing the rippled current $I_{RPP}$ by a factor of 4.3 reduces $dV_{RPP}$ by approximately a factor of 4.3, and reducing the integration time dt by a factor of 2 (by halving the repetition period) further reduces $dV_{RPP}$ by approximately a factor of 2, for a total reduction of approximately 8.6. Thus, for a given output capacitance value, the "noise" at the output of DAC converter 800 is roughly an order of magnitude less than that of the single active clamp forward converter.

Exemplary embodiments of PWM means 910, first control means 970, and second control means 999 of control means 820 shown in FIG. 9 are now described in greater detail with reference to a more detailed schematic diagram of control means 820 shown in FIGS. 11A and 11B. Shown in FIGS. 11A and 11B are output control ports 821–826 for the switch means of converters 100 and 100', power port 830, and output monitoring port 827 for receiving a signal related to the voltage provided to output port 802 of DAC converter 800. Also shown in FIGS. 11A and 11B are input ports 828 and 829, each for receiving signals representative of the primary current of converters 100 and 100', respectively.

PWM means 910 is for generating a first duty-cycle signal $S_1$ at a port 911 for controlling first converter 100, shown in FIG. 9, and for generating a second duty-cycle signal $S_2$ at a port 912 for controlling second converter 100'. First control means 970 is responsive to the first duty-cycle signal at port 911 and is for operating primary switch means 140 and first switch means 130 of first converter 100 in a complementary manner, as describe above. First control means 970 is also for operating second switch means 150, causing it to close a time duration after primary switch means 140 closes and to open a short time duration after primary switch means 140 opens. First control means 970 provides a control signal for primary switch means 140 at control port 821, a control signal for first switch means 130 at control port 822, and a control signal for second switch means 150 at control port 823. Likewise, second control means 999 is responsive to the second duty-cycle signal at port 912 and is for operating primary switch means 140' and first switch means 130' of second converter 100' in a complementary manner, as described above. Second control means 999 is also for operating second switch means 150', causing it to close a time duration after primary switch means 140' closes and to open a short time duration after primary switch means 140' opens. Second control means 999 provides a control signal for primary switch means 140' at control port 824, a control signal for first switch means 130' at control port 825, and a control signal for second switch means 150' at control port 826.

PWM means 910 comprises a dual clock generator 920, a first pulse width controller 950 and associate circuitry, and a second pulse width controller 960 and associated circuitry. In a preferred embodiment of control means 820, each of controllers 950 and 960 comprises an AS3843 current mode PWM controller manufactured by Astec Semiconductor. Dual clock generator 920 provides two anti-phase clock signals at two terminals 921 and 922, respectively, which are for driving the two controllers 950 and 960. The anti-phase clock signals are phase shifted with respect to one another by substantially 180°. Controller 950 is responsive to the first anti-phase clock at terminal 921, to the signal at port 827, which is related to the output voltage of converter 800, and to the signal at port 828, which is representative of the primary current of converter 100. In response to these signals, controller 950 generates the first duty-cycle signal at port 911 so as to maintain the output voltage of DAC converter 800 near its nominal value. Specifically, controller 950 begins the pulse of the first duty cycle signal in response to the clock signal at terminal 921 and ends the pulse in response to the signals representative of the output voltage and primary current of converter 100.

Controller 960 is responsive to the second anti-phase clock signal at terminal 922, to the signal at port 829, which is representative of the primary current of converter 100', and to a signal generated by controller 950 (provided by the "COMP" pin), which is described in greater detail below. In response to these signals, controller 960 generates the second duty-cycle signal at port 912. Specifically, controller 960 begins the pulse of the second duty cycle signal in response to the clock signal at terminal 922 and ends the pulse in response to the signal provided by controller 950 and to the signal representative of the primary current of converter 100'. Since the pulse state of each of the duty cycle signals is initiated in response to its respective clock signal and since the clock signals are phase shifted with respect to one another by substantially 180° (i.e., in anti-phase), the first and second duty cycle signals are phase shifted with respect to one another by substantially 180°.

PWM means 910 further includes an internal power supply 915 for providing a low level supply of approximately 12 volts at a terminal 918 to power the various components of PWM means 910 and control means 970 and 999. Internal supply 915 comprises an input port 916 coupled to port 830 for receiving a source of power from the input supply, a ground terminal 917 for providing a ground reference for control means 820, and a power terminal 918 for supplying 12 volts to the various components of means 910, 970, and 999. Internal supply 915 preferably comprises its own power transformer having a primary winding coupled to the input supply at port 830 and a secondary winding coupled between terminals 917 and 918. This power transformer facilitates a ready isolation of the secondary ground at terminal 917 from the input supply at port 830. Ground terminal 917 is preferably coupled to the secondary-side grounds of converters 100 and 100' and to the secondary output ground at output port 802 of DAC converter 800, as shown in FIG. 9. As such, the secondary outputs of converters 100 and 100' and the circuitry of control means 820 share the same ground. This allows control means 820 to directly sense the voltage at output port 802 of DAC converter 800 without the need for an optocoupler device. Internal supply 915 need only supply the amount of current required by the components of control means 820, which is typically less than 0.1 A.

The two anti-phase clocks generated at terminals 921 and 922 by dual clock generator 920 are designated as $\Phi_1$ and $\Phi_2$, respectively. Each of the clock signals $\Phi_1$ and $\Phi_2$ preferably has a first logic state of approximately zero volts and a second logic state of preferably approximately 2.5 volts, and each of the clock signals alternates between its respective first and second states. Additionally, each of the clock signals $\Phi_1$ and $\Phi_2$ has a switching cycle period T of approximately 2.0 microseconds and a duty-cycle of 0.75 (75%), with the first state being the pulsed state. Also, as indicated above, clock signals $\Phi_1$ and $\Phi_2$ are phase shifted with respect to one another by substantially 180°, or equivalently, offset in time by one-half of a switching cycle period (T/2=1.0 microseconds). Each of the clock signals $\Phi_1$ and $\Phi_2$ are shown as a function of time by a timing diagram 1000 in FIG. 12 in respective timing graphs 1005 and 1006 of timing diagram 1000. Timing diagram 1000 also shows a number of additional signals generated by PWM means 910 which will aid in explaining the generation of $\Phi_1$, $\Phi_2$, and the first and second duty cycle signals at ports 911 and 912. These additional signals are shown at timing graphs 1001-1004, and 1007-1012.

For generating clock signals $\Phi_1$ and $\Phi_2$, dual clock generator 920 comprises a conventional crystal oscillator for generating a base clock signal, and a D-type flip-flop 930 which is responsive to the base clock and is configured as a toggle flip-flop. Flip-flop 930 includes a clock port "CK" which is coupled to the base clock signal, a data input port "D", an output "Q" and a complementary output "Q/" coupled back to the D input. Flip-flop 930 provides two anti-phase signals at the Q and Q/ outputs, which switch at half the switching frequency of the base clock signal. Dual clock generator further comprises two logic OR gates for digitally OR-ing the base clock signal with each of the anti-phase signals of flip-flop 930. One OR gate includes two rectifiers 931-932 and two resistors 935-936 and the other OR gate includes two rectifiers 933-934 and two resistors 937-938.

The crystal oscillator includes a crystal 926, a first inverter 924, and a second inverter 929. Crystal 926 is preferably a 1.0 MHz crystal and is coupled between the input and output of first inverter 924, which is preferably a Schmitt-trigger CMOS inverter. A 1 M-ohm resistor 925 is also coupled between the input and output of inverter 924 and is for biasing inverter 924 near the middle of its gain curve characteristic. Additionally, a capacitor 927 of approximately 33 pF is coupled to the input of inverter 924 and a second capacitor 928 of approximately 33 pF is coupled to the output of oscillator 924. With this configuration, a substantially square wave is produced at the output of inverter 924. This output is designated as "OSC" in FIG. 11A and is shown in a timing graph 1001 in FIG. 12. Second inverter 929 serves to isolate the crystal oscillator from the remaining circuitry of clock generator 920. The input of second inverter 929 is coupled to the "OSC" output. The output of second inverter 929 is the base clock signal and is provided to the clock input of D flip-flop 930 and to the anodes of rectifiers 931 and 934. The output of inverter 929 is designated as "CK" in FIG. 11A and is shown in a timing graph 1002 of FIG. 12.

As indicated above, the base clock signal at the output of inverter 929 is coupled to the clock input of flip-flop 930. Additionally, the complementary output Q is coupled to the data input D. With this configuration, as known in the digital art, the output Q of flip-flop 930 toggles between logic 0 and logic 1 each time the clock input undergoes a logic low-to-high transition. The Q output of flip-flop 930 is shown in a timing diagram 1003 of FIG. 12. The toggle action of the output with respect to the clock input may be seen by comparing timing graphs 1002 and 1003. The output $\bar{Q}$ of flip-flop 930 is the complement of the Q output of flip-flop 930. The complementary output is shown in a timing graph 1004 in FIG. 12.

The Q output flip-flop 930 is coupled to the anode terminal of rectifier 932, which is a first input of the two-input OR gate formed by rectifiers 931 and 932 and resistors 935 and 936. The second input of this OR gate is provided by the anode of rectifier 931, which is coupled to the base clock (output of inverter 929). The output of this OR gate is coupled to terminal 921 and provides the first clock signal $\Phi_1$ thereto. Resistors 935 and 936 are coupled in series to provide the "pull-down resistor" for the OR gate. One terminal of resistor 935 is coupled to terminal 921 and the other terminal is coupled to each of the cathode terminals of rectifiers 931 and 932. One terminal of resistor 936 is coupled to ground and the other terminal is coupled to terminal 921. As such, the output of the OR gate is generated across resistor 936 and is logic high whenever the base clock or the Q output of flip-flop 930 is high. Each of resistors 935 and 936 preferably has a resistance value of 470 ohms. With these values, the first clock signal $\Phi_1$ has a logic high value of approximately 2.5 volts whenever the clock output of inventer 929 or the Q output of flip-flop 930 is logic high. This is more fully shown in FIG. 12 by logically OR-ing timing graphs 1002 and 1003 to obtain the timing graph 1005 for the $\Phi_1$ clock signal at terminal 921.

In a similar manner, the $\bar{Q}$ output of flip-flop 930 is coupled to the anode terminal of rectifier 933, which is a first input of the two-input OR gate formed by rectifiers 933 and 934 and resistors 937–938. The second input of this OR gate is provided by the anode of rectifier 934, which is coupled to the base clock (output of inventer 929). The output of this OR gate is coupled to terminal 922 and provides the second clock signal $\Phi_2$ thereto. Resistors 937 and 938 are coupled in series to provide the "pull-down resistor" for the OR gate. One terminal of resistor 937 is coupled to terminal 922 and the other terminal is coupled to each of the cathode terminals of rectifiers 933 and 934. One terminal of resistor 938 is coupled to ground and the other terminal is coupled to terminal 922. As such, the output of the OR gate is generated across resistor 938 and is logic high whenever the base clock or the $\bar{Q}$ output of flip-flop 930 is high. Each of resistors 937 and 938 preferably has a resistance value of 470 ohms. With these values, the second clock signal $\Phi_2$ has a logic high value of approximately 2.5 volts whenever the clock output of inventer 929 of the $\bar{Q}$ output is logic high. This is more fully shown in FIG. 12 by logically OR-ing timing graphs 1002 and 1004 to obtain the timing graph 1006 for the $\Phi_2$ clock signal.

As indicated previously, each of controllers 950 and 960 comprises a current mode pulse width modulator, preferably an AS3843 PWM controller manufactured by Astec Semiconductor. Each of controllers 950 and 960 includes a $V_{CC}$ pin for receiving a source of power at approximately 12 volts, a ground pin GND for receiving a ground reference potential of zero volts, and R/C clock pin for receiving its respective clock signal ($\Phi_1$ or $\Phi_2$), a $V_{FB}$ terminal for receiving a signal representative of the output voltage of the converter (DAC converter 800), a COMP compensation terminal for providing a compensation signal to be fed back to the $V_{FB}$ pin, an $I_S$ current sense pin for receiving a voltage related to the output inductor current (or primary current), and an output pin OUT for providing a duty-cycle signal as a function of the signals present on the R/C, $V_{FB}$, COMP, $I_S$ pins. The R/C clock pin of controller 950 is coupled to terminal 921 of dual clock generator 920 for receiving first clock signal $\Phi_1$, and the R/C clock pin of controller 960 is coupled to terminal 922 for receiving the second clock signal $\Phi_2$. Additionally, the $V_{CC}$ pins for each of the controllers 950 and 960 is coupled to power terminal 918 of internal supply 915, and each of the ground pins is coupled to ground terminal 917 of internal supply 915. The OUT pin of controller 950 provides the first duty-cycle signal at port 911 and the OUT pin of controller 960 provides the second duty-cycle signal at port 912. The first and second duty cycle signals are shown in timing graphs 1007 and 1008, respectively, of FIG. 12, and are designated as $S_1$ and $S_2$, respectively, in FIGS. 11 and 12. Each of the remaining pins, COMP, $V_{FB}$, and $I_S$, are discussed in greater detail below with reference to controller 950.

A voltage proportional to the output voltage of DAC converter 800 is provided to the $V_{FB}$ pin of controller 950. This voltage is generated by a voltage divider comprising two resistors 941 and 942 coupled together at an intermediate node 940. The voltage divider is coupled to port 827 of control means 820 and intermediate node 940 provides the proportional voltage to the $V_{FB}$ pin of controller 950. In a preferred embodiment of control means 820, each of resistors 941 and 942 has a resistance value of 2.2 K-ohms. As such, the voltage at intermediate node 940 is approximately half of the output voltage of DAC converter 800. Thus, when the value of the output voltage is at its nominal value of five volts, the voltage provided to pin $V_{FB}$ is 2.5 volts.

Within controller 950, the voltage at the $V_{FB}$ pin is compared to an internally generated voltage of 2.5 volts. This comparison is preferably performed by a differential amplifier, often called the error amplifier, having an inverting input coupled to the $V_{FB}$ pin and a non-inverting input coupled to a 2.5 volt reference, which serves to represent the desired output voltage. The output of the error amplifier provides a signal which is related to the difference between the desired output voltage and the measured output voltage. Hence, this voltage is called the error voltage. As the voltage at the $V_{FB}$ pin decreases from 2.5 volts, the error voltage increases, and vice-versa. The error voltage is used to govern the pulse width of the signal $S_1$ at the output OUT pin. The pulse width increases as this voltage increases and decreases as this voltage decreases. Thus, the pulse width of the first duty-cycle signal at port 911 increases as the sensed output voltage at pin $V_{FB}$ decreases from the reference of 2.5 volts and decreases as the sensed output voltage increases. The increase pulse width causes more power to be delivered to the output, thus increasing the output voltage and thus the voltage at pin $V_{FB}$. This forms a negative feedback loop which brings the output voltage in regulation to the targeted 5.0 volts.

As is known in the art, such negative feedback control loops often require some form of compensation, or frequency-dependent damping, to ensure that the control loop is stable and does not oscillate in an uncontrolled manner. When the control loop is operated without compensation, the output voltage will typically oscillate at a natural resonant frequency of the control loop. This natural resonant frequency is due to the fact that there is finite delay between the time that the error amplifier causes a correction in the duty cycle of the PWM output signal and the time the converter's filter inductor and output capacitor respond to the corrected duty cycle. In general, the error amplifier can generate an error correction signal to the pulse width modulation faster than the output filter and capacitor can react. A compensation network comprising of two capacitors 951 and 952 and a resistor 953 is connected between the COMP and $V_{FB}$ pins of controller 950. The compensation network is, in turn, coupled between the inverting input of the error amplifier and the output of the error amplifier. The compensation network feeds back a portion of the output signal to the inverting input so as to slow the operation of the error amplifier down to the response time scale of the output filter and output capacitor. In this way, errant oscillations in the output voltage are mitigated. Exemplary component values for this compensation network are: 2.2 nF for capacitor 951, 100 pF for capacitor 952, and 8.3 K-ohms for resistor 953.

The output voltage of the error amplifier controls the pulse width at the OUT pin in the following manner. The pulse state of the signal $S_1$ at the OUT pin is initiated by the rising edge at the R/C clock pin. This is shown at 1021 in graph 1007 of FIG. 12. To determine when the pulse state is to end, the error voltage from the error amplifier is compared to the voltage present on the $I_S$ pin. The $I_S$ voltage is proportional to the output filter inductor current of converter 100 during the converter's ON period (i.e., during the pulse state at the OUT pin). In the present invention, this current is sampled by way of the primary circuit current $I_{IN}$, which is shown at timing graph 860 in FIG. 10. It has a trapezoidal shape, with the slope of the trapezoid being determined by the input voltage, the inductance of the output filter inductor 170 of first converter 100, and the magnetizing inductance of inductor 123 of first converter 100. This current is preferably sensed by a current transformer (e.g., transformer 135 in FIG. 9) and coupled to a resistor to convert it to a voltage, which is then provided to the $I_S$ pin. In operation, the output error voltage sets a threshold level which the voltage signal at the $I_S$ pin must reach before controller 950 ends the pulse state of the signal at the OUT pin (i.e. the first duty-cycle signal). However, if the $I_S$ voltage does not reach this threshold before the falling edge of the signal at the R/C clock pin occurs, controller 950 will terminal the pulsed state at the OUT pin. This limits the maximum duty-cycle of the signal at the OUT pin to be substantially equal to the duty cycle of the signal at the R/C clock pin, which is preferably 0.75 (75%). The maximum duty cycle for the signal $S_1$ is shown at 1022 in graph 1007 of FIG. 12.

In a preferred embodiment of controller 950, the output error signal is preferably level-shifted and/or scaled before it is compared to the $I_S$ voltage so that it varies between a value of zero and 1 V. Additionally, the $I_S$ signal is generated such that it has a range of zero to ~1 V, with the maximum value of ~1 V corresponding to the maximum allowable current through output filter inductor 170. In a preferred embodiment of the present invention, the maximum output current for inductor 170 is approximately 23 amperes.

Depending upon the load coupled to the converter, the magnitude of the load current may vary between zero and its maximum value even though the output voltage is at its nominal value. This means that the voltage at the $I_S$ pin may vary between near zero volts and ~1 V even though the output voltage is at its nominal value. This would appear to be incompatible with the threshold level set by the error amplifier output. However, the negative feedback in the control loop automatically adjusts the threshold level set by the error amplifier to account for changes in the load current. In other words, the threshold level set by the error amplifier is a function of both the output voltage and the average load current.

As known in the art, the comparison of the $I_S$ current with the output error voltage comprises a current mode control loop. Such a current mode control has several advantages. As a first advantage, the current control mode scheme can instantaneously correct for input voltage variations without having the error amplifier swing through large dynamic ranges. This is because the slope of the $I_S$ current is related to the input voltage, decreasing (becoming more shallow) as the input voltage decreases from the nominal value and increasing (becoming steeper) as the input voltage increases above the nominal value. This allows the duty-cycle to vary within one switching cycle of a change in the input voltage. For example, if the input voltage decreases by a predetermined amount, the slope will also decrease by a predetermined amount, which in turn will extend the duration of the pulse. (i.e., increase the duty-cycle). This in turn increases the amount of power provided to the load within one switching cycle. As a second advantage, the compensation network can be simplified over the conventional voltage mode control loops. This allows for faster response and fewer components.

The voltage signal at the $I_S$ pin of controller 950 is generated in the following manner. A current proportional to the primary circuit current of the first converter 100 is coupled to port 828 of control means 820. This is provided by the current sensing transformer 135 shown in FIG. 9, as discussed above. This current is typically 1/40th of the current ($I_{IN}$) flowing in the primary circuit. This current is fed to a resistor 944, which generates a voltage in proportion to the current provided at port 828. In a preferred embodiment of control means 820, resistor 944 has a value of 5 ohms and is preferably formed by coupling two 10 ohm resistors in parallel. The voltage developed across resistor 944 is then coupled to the $I_S$ pin by way of a resistor 945 and a capacitor 946. Resistor 945 and capacitor 946 filter the voltage developed across resistor 944 such that any leading edge spikes are removed. Such leading edge spikes may cause controller 950 to prematurely end the pulse period of the signal at its OUT pin. In a preferred embodiment, resistor 945 has a value of approximately 200 ohms and capacitor 946 has a value of approximately 100 pF.

As is known in the current art, current control mode schemes have stability problems when the duty-cycle exceeds 50%. This instability is unconditional and occurs regardless of the state of the voltage feedback loop. It is known that by adding a ramp voltage to the voltage generated at resistor 944 this instability can be eliminated. With this added ramp voltage, a current mode controlled converter may operate at duty-cycles greater than 50%. For generating the added ramp voltage, PWM means 910 comprises a ramp generation means including a capacitor 956, a rectifier 958, and three resistors 955, 957, and 959. Resistor 955 and capacitor 956 are coupled in series, and the series combination is coupled between the OUT pin of controller 950 and ground. At the beginning of the pulse period, the voltage at the OUT pin switches from zero volts to approximately 10 volts. This generates an R/C ramp voltage across capacitor 956. This ramp is coupled to the $I_S$ terminal by resistor 957. At the end of the pulse period, the voltage signal at the OUT pin switches from approximately 10 volts to zero volts. Rectifier 958 and resistor 959 discharge the voltage built up on capacitor 956. Rectifier 958 and resistor 959 are coupled in series, and this series combination is coupled between the OUT pin and capacitor 956.

During the pulse period, or ON period, the rising voltage at capacitor 956 injects a current into resistor 945 by way of resistor 957. This injected current causes a voltage drop across resistor 945, which adds to the voltage generated across resistor 944, as indicated above. In this way, the compensation ramp voltage is added to the voltage proportional to the primary circuit current. Preferred values for these components are as follows: resistor 955, 2.2 K-ohm; capacitor 956, 1 nF; resistor 957, 2.2 K-ohms; and resistor 959, 220 ohms. With these values, the ramp voltage across capacitor 956 has a time constant of approximately 1.2 microseconds. With the value of 220 ohms for resistor 945, approximately 1/10 th of the ramp voltage at the capacitor 956 is generated across resistor 945. At a 50% duty-cycle and a full load of 20 A per converter, resistor 944 provides approximately 0.4 volts to the $I_S$ pin by the end of the pulse period and resistor 945 provides approximately 0.7 volts to the $I_S$ pin by the end of the pulse period. As is known in the art, the slope of the ramp, as provided across resistor 945, must be greater than ½ of the absolute value of the "ripple down slope". The ripple down slope is the slope of the voltage that would be generate across resistor 944 if the output filter inductor's current during the OFF period could be coupled to resistor 944 during the OFF period. Since primary switch means 140 of converter 100 is opened during the OFF period, the output filter inductor's current is prevented from being coupled to resistor 944. Nonetheless, given the nominal output voltage, the inductance of filter inductor 170, and the turns ratios of transformers 120 and 135, the ripple down current may be readily calculated.

The functions of the COMP, $V_{FB}$, and $I_S$ pins for second controller 960 are the same as those of the corresponding pins of controller 950. However, different signals are coupled to the COMP and $V_{FB}$ pins of second controller 960. Specifically, the $V_{FB}$ pin is grounded, which effectively disables the error amplifier of second controller 960. Additionally, the COMP pin of first controller 950 is coupled to the COMP pin of second controller 960, causing the output error signal generated by controller 950 to be used as the output error signal for controller 960. This causes the duty cycles generated at the OUT pins of controllers 950 and 960 to be substantially the same since the same threshold level is used to compare the voltages at the $I_S$ pins of controllers 950 and 960.

The voltage at the $I_S$ pin of controller 960 is generated in the same manner as that for controller 950. Specifically, a current proportional to the primary circuit current of second converter 100' is coupled to port 829 of control means 820. This is provided by the current sensing transformer 135' shown in FIG. 9, as discussed above. This current is typically 1/40 th of the current ($I'_{IN}$) flowing in the primary circuit. This current is fed to a resistor 947, which generates a voltage in proportion to the current provided at port 829. Resistor 947 preferably has the same resistance as resistor 944. The voltage developed across resistor 947 is coupled to the $I_S$ pin by way of a resistor 948 and a capacitor 949. Resistor 948 preferably has the same resistance as resistor 945 and capacitor 949 preferably has the same capacitance as capacitor 946.

As with controller 950, a ramp voltage from the OUT pin of controller 960 is added to the $I_S$ pin of controller 960 to ensure stable operation for duty cycles above 50%. The ramp generation circuit is substantially the same as that for controller 950 and comprises a capacitor 966, a rectifier 968, and three resistors 965, 967, and 969. These components have substantially the same component values as capacitor 956, rectifier 958, and resistors 955, 957, and 959, respectively.

Having discussed the operation of PWM means 910, the operation of first control means 970 is discussed. As indicated above, first control means 970 is responsive to the first duty-cycle signal $S_1$ at port 911 and is for operating primary switch means 140 by way of port 821, first switch means 130 by way of port 822, and second switch means 150 by way of port 823 in the manner indicated above. The control signals at ports 821–823 are shown in timing graphs 1009, 1010, and 1013 respectively, of FIG. 12. First control means 970 comprises a first transistor drive circuit for driving primary switch means 140, a second transistor drive circuit for driving first switch means 130, and a third transistor drive circuit for driving second switch means 150.

The first drive circuit comprises a buffer amplifier 972 having an input and an output, an isolation transformer 974 having a primary winding coupled to the output of amplifier 972 and a secondary winding coupled to port 821, a first coupling capacitor 973 coupled between the output of amplifier 972 and the primary winding of transformer 974, and a second coupling capacitor 975 coupled between the secondary winding of transformer 974 and port 821. Buffer amplifier 972 is responsive to the signal at port 911 and provides the necessary power for driving primary switch means 140, transformer 974 provides isolation between the different ground references used by control means 820 and primary switch means 140, and coupling capacitors 973 and 975 prevent transformer 974 from becoming saturated. The first drive circuit further comprises a rectifier 976 for clamping the negative voltage at port 821 and for establishing a "ground" reference potential for port 821. In operation, amplifier 972 provides an output of approximately 10 V when signal $S_1$ is in its pulse state and an output of approximately 0 V when signal $S_1$ is in its resting state. Transformer 974 and capacitors 973 and 975 couple the output of amplifier 972 to port 821.

The first drive circuit further comprises a delay unit coupled between port 911 and the input of amplifier 972. The delay unit includes a resistor 977 and a rectifier 978, each of which are coupled between port 911 and the input of amplifier 972 (cathode of rectifier 978 coupled port 911), and a capacitor 979 coupled between the input of amplifier 972 and ground. This delay unit, along with a similar delay unit in the second transistor drive circuit described below, comprises means for ensuring that the control signals at ports 821 and 822 are not pulsed at the same time, thereby preventing both switch means 130 and 140 from conducting at the same time. In response to the leading edge transition of the pulse state for the first duty cycle signal $S_1$, resistor 977 and capacitor 979 function as an RC delay means which delays the propagation of the leading edge of signal $S_1$ to the input of amplifier 972. This causes a delay between the leading edge of signal $S_1$ and the corresponding leading edge of the control signal at port 821. This delay is shown at 1025 in graph 1009. In response to the falling edge transition of signal $S_1$, rectifier 978 discharges capacitor 979 with little delay. As such, relatively little delay occurs between the falling edge of signal $S_1$ and the corresponding falling edge of the control signal at point 821. This is shown at 1026 in graph 1009 of FIG. 12.

The second drive circuit comprises an inverting buffer amplifier 982 having an input and an output, an isolation transformer 984 having a primary winding coupled to the output of amplifier 982 and a secondary winding coupled to port 822, a third coupling capacitor 983 coupled between the output of inverting amplifier 982 and the primary winding of transformer 984, and a fourth coupling capacitor 985 coupled between the secondary winding of transformer 984 and port 822. Inverting amplifier 982 is responsive to the signal $S_1$ at port 911 and provides the necessary power for driving first switch means 130, transformer 984 provides isolation between the different ground references used by control means 820 and first switch means 130, and coupling capacitors 983 and 985 prevent transformer 984 from becoming saturated. The second drive circuit further comprises a rectifier 986 for clamping the negative voltage at port 822 and for establishing a "ground" reference potential for port 822. In operation, inverting amplifier 982 provides an output of approximately 0 V when signal $S_1$ is in its pulse state and an output of approximately 10 V when signal $S_1$ is in its resting state. Transformer 984 and capacitors 983 and 985 couple the output of amplifier 982 to port 822.

The second drive circuit further comprises a delay unit coupled between port 911 and the input of inverting amplifier 982. The delay unit includes a resistor 987 and a rectifier 988, each of which are coupled between port 911 and the input of amplifier 982 (anode of rectifier 988 coupled port 911), and a capacitor 989 coupled between the input of amplifier 982 and ground. The orientation of rectifier 988 is the reverse of the orientation of rectifier 978. In response to the rising edge transition of the pulse state for the first duty cycle signal $S_1$, rectifier 988 charges up capacitor 989 relatively quickly. As such, relatively little delay occurs between the rising edge of signal $S_1$ and the corresponding falling edge of the control signal at port 822. This is shown at 1028 in graph 1010 of FIG. 12. In response to the falling edge transition of signal $S_1$, rectifier 988 is non-conducting and resistor 987 and capacitor 989 functions as an RC delay means which delays the propagation of the falling edge of signal $S_1$ to the input of inverting amplifier 982. This causes a delay between the falling edge of signal $S_1$ and the corresponding leading edge of the control signal at port 822. This delay is shown at 1029 in graph 1010.

This delay unit, along the delay unit in the first transistor drive circuit, comprises means for ensuring that the control signals at ports 821 and 822 are not pulsed at the same time, thereby preventing both switch means 130 and 140 from conducting at the same time. This may be seen by comparing graphs 1009 and 1010 shown in FIG. 12 and by noting the locations of the time delays at 1025 and 1029.

The third drive circuit comprises a buffer amplifier 992 having an input and an output, an isolation transformer 994 having a primary winding coupled to the output of amplifier 992 and a secondary winding coupled to port 823, a fifth coupling capacitor 993 coupled between the output of amplifier 992 and the primary winding of transformer 994, and a sixth coupling capacitor 995 coupled between the secondary winding of transformer 994 and port 823. Buffer amplifier 992 is responsive to the signal at the output of buffer amplifier 972, which drives primary switch means 140, and provides the necessary power for driving second switch means 150. Transformer 994 provides isolation between the different ground references used by control means 820 and second switch means 150, and coupling capacitors 993 and 995 prevent transformer 994 from becoming saturated. The third drive circuit further comprises a rectifier 996 for clamping the negative voltage at port 823 and for establishing a "ground" reference potential for port 823. In operation, amplifier 992 provides an output of approximately 10 V when the output signal of amplifier 972 is in its pulse state ($\sim +10$ V) and an output of approximately 0 V when the output signal of amplifier 972 is in its resting state ($\sim 0$ V). Transformer 994 and capacitors 993 and 995 couple the output of amplifier 992 to port 823.

The third drive circuit further comprises a delay unit coupled between the output of buffer amplifier 972 and the input of amplifier 992. The delay unit includes a resistor 997 and a rectifier 998, each of which are coupled between the output of amplifier 972 and the input of amplifier 992 (cathode of rectifier 978 coupled to the output of amplifier 972), and a capacitor 991 coupled between the input of amplifier 992 and ground. This delay unit causes second switch means 150, by way of the control signal at port 823, to close a time duration after primary switch means 140 closes, as directed by the control signal at port 921, and to open a short time duration after primary switch means 140 opens. In response to the leading edge transition of the pulse state at the output of amplifier 972, resistor 997 and capacitor 991 function as an RC delay means which delays the propagation of the leading edge of the output of amplifier 972 to the input of amplifier 992. This causes a delay between the leading edge of control signal at port 821 and the corresponding leading edge of the control signal at port 823. This delay is shown at 1030 in graph 1013. In response to the falling edge transition of the pulse state at the output of amplifier 972, rectifier 998 discharges capacitor 991 with little delay. As such, relatively little delay occurs between the falling edge of the control signal at port 821 and the corresponding falling edge of the control signal at port 823. This is shown at 1031 in graph 1013 of FIG. 12.

In a similar manner, second control means 999 shown in FIG. 11B is responsive to the second duty-cycle signal $S_2$ at port 912 and is for operating primary switch means 140', first switch means 130', and second switch means 150' in the manner indicated above. Second control means 999 provides a control signal for primary switch means 140' at control port 824, a control signal for first switch means 130' at control port 825, and an control signal for second switch means 150' at control port 826. The control signals at ports 824–826 are shown in timing graphs 1011, 1012, and 1014 respectively, of FIG. 12. The structure and operation of second control means 999 is substantially identical to those of first control means 970. Therefore, reference is made to the above discussion of first control means 970 for a detailed description of second control means 999.

A further object of the present invention is to provide a switch control means for second switch means 150 of the present invention which is autonomous from the control circuitry for switch means 130 and 140, i.e., autonomous from PWM means 910 and buffer 972. The autonomous feature of the switch control means for second switch means 150 provides greater manufacturing flexibility and circuit robustness. Such an exemplary autonomous switch control means is shown at 730 in FIG. 11C and may be used in place of the third transistor drive circuit comprising elements 991–998 shown in FIG. 11B. Switch control means 730 is shown in the context of a partial block diagram 700 of forward converter 100, which is shown in FIG. 4, along with switching transistor 752, diode 754, and blocking rectifier 756.

The present invention recognizes that a control signal for controlling second switch means 150 may be derived from the voltage across secondary winding 124 in the following manner. Referring back to timing diagram 300 shown in FIG. 6, it may be seen that for switching sequence 230 (of FIG. 5), the voltage waveform $V_s$ for secondary winding 124 crosses zero volts, as indicated at a point 314 in FIG. 6, at substantially the same time second switch means 150 is closed. The zero crossing occurs as $V_s$ changes from a positive value to a negative value and is referred to as a negative transition due to the negative slope of the $V_s$ waveform. It may be further seen from timing diagram 300 that second switch means 150 thereafter opens a time duration after the voltage waveform $V_s$ for secondary winding 124 crosses zero volts, indicated at a point 315 in FIG. 6, as $V_s$ changes from a negative value to a positive value. This is referred to as a positive transition due to the positive slope of the $V_s$ waveform.

In the case of switching sequence 230, it may then be appreciated that second switch means 150 may be controlled in response to the voltage $V_s$ of secondary winding 124 by detecting the transitions of the $V_s$ waveform with respect to a predetermined voltage value, e.g., zero volts, and by directing second switch means 150 to open a short time (short time duration) after voltage $V_s$ makes a negative transition through the predetermined voltage value and to close a somewhat longer time (longer time duration) after voltage $V_s$ makes a positive transition through the predetermined voltage value. The length of the second duration may be chosen (i.e., made large enough) such that second switch means 150 is closed after primary switch means 140 closes for a wide range of duty-cycles and load conditions. In this manner, a switch control means may be constructed for second switch control means 150 which may be autonomous from the switch control means for primary switch means 140 and first switch means 130. Such an autonomous switch control means is provided by switch control means 730 shown in FIG. 11C.

Autonomous switch control means 730 comprises a series combination of a resistor 732 and a Zener diode 734 which is coupled in parallel across secondary winding 124. The cathode terminal of Zener diode 734 is coupled to a node 738 and the anode terminal of Zener diode 734 is connected to the negative terminal of secondary winding 124, which serves as a secondary-side ground. Resistor 732 is connected between the positive terminal of secondary winding 124 and node 738. Additionally, a rectifier 736 is coupled in parallel with Zener diode 734 with its cathode terminal coupled to the secondary-side ground.

In operation, a positive voltage of, for example, 4.8 V is generated at node 738 by Zener diode 734 when a positive potential appears across secondary winding 124 to direct current towards load 174. When a negative voltage appears across secondary winding 124, a negative voltage of approximately −0.6 V is generated at node 734 by rectifier 736. As such, it may be appreciated that resistor 732, diode 734, and rectifier 736 comprise detection means for detecting the voltage across secondary winding 124 and for generating a signal at node 738 having a first state (4.8 V, logic high) when the voltage across secondary winding 124 is positive and a second state (−0.6 V, logic low) when the voltage across secondary winding 124 is negative.

Autonomous switch control means 730 further comprises a delay generation means responsive to the signal at node 738 for generating a switch control signal at a node 746 to control second switch means 150. As discussed below in greater detail, the control signal at node 746 has a first state (logic-high) for directing second switch means 150 to close and a second state (logic low) for directing second switch means 150 to open. The delay generation means comprises a first inverter 740 having an input coupled to node 738 and an output, a second inverter 745 having an input coupled to the output of first inverter 740 and an output terminal coupled to node 746 for providing the control signal. Inverters 740 and 745 are powered by the potential difference between a conventional digital $V_{CC}$ supply (for example +5 V) and the secondary-side ground. As such, the outputs of inverters 740 and 745 have a logic low state at around zero volts and a logic high state at around $V_{CC}(+5)$ volts. In addition, inverter 745 preferably comprises a Schmitt trigger input, as described below in greater detail.

The delay generation means of control means 730 further comprises a delay means having a rectifier 741, a resistor 742 and a capacitor 744 for introducing first and second predetermined time delays into the signal propagation between first inverter 740 and second inverter 745. Specifically, the delay means introduces a first predetermined signal propagation delay between first inverter 740 and second inverter 745 when the output of inverter 740 makes a transition from a logic-low level to a logic-high level. Additionally, the delay means introduces a second predetermined signal propagation delay between first inverter 740 and second inverter 745 when the output of inverter 740 makes a transition from a logic-high level to a logic-low level. In the delay means, the anode terminal of rectifier 741 is connected to the output of inverter 740 and the cathode terminal of rectifier 741 is connected to the input of inverter 745 at a node 743. Capacitor 744 is coupled between the input of inverter 745 and ground and resistor 742 is also coupled between the input of inverter 745 and ground.

When the output of inverter 740 makes a transition from a logic-low level to a logic-high level, rectifier 741 conducts and current from inverter 740 charges capacitor 744 to raise the voltage at node 743. The component values of rectifier 741, resistor 742, and capacitor 744 are chosen in a manner well known in the art such that the voltage at node 743 rises to a logic-high value in a time duration which is relatively short with respect to the switching cycle time. This provides the above first predetermined signal propagation delay. When the output of inverter 740 makes a transition from a logic-high level to a logic-low level, rectifier 741 blocks current from flowing from capacitor 744 into inverter 740 and, as such, the charge on capacitor 744 supporting the voltage on node 743 is discharged to ground by resistor 742. The component values of resistor 742 and capacitor 744 are chosen in a manner well known in the art such that the voltage at node 743 falls to a logic-low level in a time duration which is relatively longer than the rise time duration for the voltage at node 743. This provides the above second predetermined signal propagation delay.

Given the slow rise time at node 743, it may be appreciated that the use of a Schmitt trigger at the intut of inverter 745 (i.e., a Schmitt triggered inverter) would improve the output switching characteristics of inverter 745. It may also be appreciated that means other than rectifier 741, resistor 742, capacitor 744, and the particular arrangement of these components may be used to provide the first and second predetermined propagation delays.

The control signal at node 746 tracks the detected signal at node 738 and is delayed with respect to the signal at node 738 by one of two predetermined time durations, the time duration being selected by the direction of the logic transition (positive transition and negative transition). As a result, the control signal at node 746 enters its first state (logic-high level) a first predetermined time duration after the signal at node 738 enters its first state (logic-high level), the first predetermined time duration being related to the second (longer) signal propagation delay generated by resistor 742 discharging capacitor 744. Further, the control signal at node 746 enters its second state (logic-low level) a second predetermined time duration after the signal at node 738 enters its second state (logic-low level), the second predetermined time duration being related to the first (shorter) signal propagation delay generated by the charging of capacitor 744 through rectifier 741.

The control signal generated at node 746 in this way is provided to second switch means 150 via a coupling means including a coupling transformer 780. Coupling transformer 780 includes a first winding 782 and a second winding 784. First winding 782 has a first terminal coupled to node 746 for receiving the switch control signal and a second terminal coupled to the secondary-side ground. Second winding 784 has a first terminal coupled to the gate of transistor 752 and a second terminal coupled to the source of transistor 752. The magnetic reference convention for transformer 780 is such that a reference dot appears at the first terminals of windings 782 and 784. As is well known to the transformer coupling art, a resistor 786 may be included in series with second winding 784 to damp any oscillations that may occur by any resonance formed by the gate capacitance of transistor 752 and the leakage inductance of second winding 784.

The configuration of transformer 780 in this manner provides means for translating the potential voltage generated at node 746 to a potential difference generated across the gate and source terminals of transistor 752. As a result, transistor 752 conducts current between its drain and source terminals when the control signal at node 746 is in its first state (logic-high level) since the positive voltage at node 746 is translated by transformer 780 to provide a positive gate-to-source voltage for transistor 752. Additionally, transistor 752 blocks current between its drain and source terminals when the control signal at node 746 is in its second state (logic-low level) since the near zero voltage at node 746 is translated by transformer 780 to provide a near zero gate-to-source voltage for transistor 752. It may thus be appreciated that transformer 780 comprises means for coupling the control signal at node 746 to transistor 752 of second switch means 150.

Thus, it may be appreciated that, in place of the third drive circuit, the autonomous switch control means 730 described above may be used to control second switch means 150 and that a corresponding autonomous switch control means 730' may also be used to control second switch means 150'. In such a case, each of the autonomous switch control means 730 and 730' are responsive to the voltage across the transformer secondary windings of converters 100 and 100', respectively, as described above.

While the invention has been described in connection with what is presently considered to be the most practical and preferred embodiments, it is to be understood that the present invention is not limited to the disclosed embodiments but, on the contrary is intended to cover various modifications and equivalent arrangements included within the scope of the appended claims.

What is claimed is:

1. A dual active clamp forward converter comprising:

an input port for receiving a source of power and an output port for providing power to a load;

a first converter and a second converter, each said converter having a power transformer including a primary winding coupled to said input port and a secondary winding coupled to said output port, a primary switch means coupled in series between said primary winding of said power transformer and said input port, a series combination of a first switch means and a first capacitor, said series combination of said first switch means and said first capacitor coupled in parallel with one of said primary winding, said secondary winding, and said primary switch means, and a second switch means coupled in series with said secondary winding of said power transformer, said primary switch means when closed causing a first portion of energy from the source of power at said input port to be coupled through said power transformer to the load by means of said secondary winding and causing a second portion of said energy to be stored in said power transformer;

means for generating a first duty-cycle signal and a second duty-cycle signal, each of said first and second duty-cycle signals having a first state and a second state and operative to alternate in time between said first and second states, said second duty-cycle signal being phase-shifted in time by substantially 180 degrees from said first duty-cycle signal;

means responsive to said first duty-cycle signal for operating the primary switch means and first switch means of said first converter, said means causing the primary switch means of said first converter to close substantially when said first duty-cycle signal enters its respective first state and to open substantially when said first duty-cycle signal enters its respective second state, said means causing the first switch means of said first converter to open substantially when said first duty-cycle signal enters its respective first state and to close substantially when said first duty-cycle signal enters its respective second state, said means opening the first switch means of said first converter prior to when the primary switch means of said first converter closes to create a zero-voltage switching condition on said primary switch means when said primary switch means next is caused to close;

means for operating the second switch means of said first converter, said means opening the second switch means of said first converter substantially when the primary switch means of said first converter opens and closing said second switch means substantially when said primary switch means closes, said second switch means being operated such that substantially no current is conducted by said secondary winding of said first converter during the interval after said first switch means is opened and before said primary switch means is closed;

means responsive to said second duty-cycle signal for operating the primary switch means and the first switch means of said second converter, said second control means causing the primary switch means of said second converter to close substantially when said second duty-cycle signal enters its respective first state and to open substantially when said second duty-cycle signal enters its respective second state, said means causing the first switch means of said second converter to open substantially when said second duty-cycle signal enters its respective first state and to close substantially when said second duty-cycle signal enters its respective second state, said means opening the first switch means of said second converter prior to when the primary switch means of said second converter closes to create a zero-voltage switching condition on said primary switch means when said primary switch means next is caused to close; and means for operating the second switch means of said second converter, said means opening the second switch means of said second converter substantially when the primary switch means of said second converter opens and closing said second switch means substantially when said primary switch means, said second switch means being operated such that substantially no current is conducted by the secondary winding of said second converter during the interval after said first switch means is opened and before said primary switch means is closed.

2. The dual active clamp forward converter of claim 1 wherein each of said first and second duty-cycle signals further comprises a plurality of consecutive switching periods, each said switching period having a substantially constant time duration T, each said switching period beginning when its corresponding duty-cycle signal enters its respective first state from its respective second state, continuing when its corresponding duty-cycle signal enters its respective second state from its respective first state, and ending when its corresponding duty-cycle signal next enters its respective first state from its respective second state.

3. The dual active clamp forward converter of claim 2 wherein the consecutive switching periods of said second duty-cycle signal start substantially one-half of said time duration T after the consecutive switching periods of said first duty-cycle signal start.

4. The dual active clamp forward converter of claim 2 wherein the ratio of the duration said first duty-cycle signal is in its said first state to the duration of said time duration T is between 0.30 and 0.70, and wherein the ratio of the duration said second duty-cycle signal in its said first state to the duration of said time duration T is between 0.30 and 0.70.

5. The dual active clamp forward converter of claim 2 wherein the ratio of the duration said first duty-cycle signal is in its said first state to the duration of said time duration T is between 0.40 and 0.65, and wherein the ratio of the duration said second duty-cycle signal in its said first state to the duration of said time duration T is between 0.40 and 0.65.

6. The dual active clamp forward converter of claim 2 wherein the ratio of the duration said first duty-cycle signal is in its said first state to the duration of said time duration T is substantially the same as the ratio of the duration said second duty-cycle signal in its said first state to the duration of said time duration T.

7. The dual active clamp forward converter of claim 2 wherein said means for generating said first and second duty cycle signals comprises means for regulating the output voltage at said output port within a range around a predetermined target value, wherein the voltage at said input port is at a nominal value when the voltage at said output port is substantially at said predetermined target value, and wherein the ratio of the duration said first duty-cycle signal is in its said first state to the duration of said time duration T is substantially 0.50 and the ratio of the duration said second duty-cycle signal in its said first state to the duration of said time duration T is substantially 0.50 when said input voltage is at its nominal value and the voltage at said output port is at said predetermined target value.

8. The dual active clamp forward converter of claim 1 wherein said means for operating the second switch means of said first converter opens said second switch means after the primary switch means of said first converter opens and before the first switch means of said first converter is closed.

9. The dual active clamp forward converter of claim 8 wherein said means for operating the second switch means of said second converter opens said second switch means of said second converter after the primary switch means of said second converter opens and before the first switch means of said second converter is closed.

10. The dual active clamp forward converter of claim 1 wherein said means for operating the second switch means of said first converter closes said second switch means after the primary switch means of said first converter closes such that the primary switch means of said first converter become completely conductive before it is caused to conduct the current of the secondary winding of said first converter which is reflected to the primary winding of said first converter by transformer action and thereby to said primary switch means.

11. The dual active clamp forward converter of claim 10 wherein said means for operating the second switch means of said second converter closes the second switch means of said second converter after the primary switch means of said second converter closes such that the primary switch means of said second converter become completely conductive before it is caused to conduct the current of the secondary winding of said second converter which is reflected to the primary winding of said second converter by transformer action and thereby to said primary switch means.

12. The dual active clamp forward converter of claim 1 wherein the primary switch means of said first converter comprises:
- a switch connected in series between the primary winding of said first converter and said input port, said switch responsive to said first control means; and
- means coupled in parallel with said switch for detecting a zero voltage switching condition across the primary switch means of said first converter and for conducting current upon the detection of said zero voltage switching condition across the primary switch means of said first converter.

13. The dual active clamp forward converter of claim 12 wherein said input port includes a positive terminal and a negative terminal, a more positive voltage being applied to said positive terminal by the source of power, and wherein said means for detecting a zero voltage switching condition across the primary switch means of said first converter comprises a rectifier having an anode terminal and a cathode terminal, said rectifier connected in parallel with said switch of the primary switch means such that said rectifier conducts current directed toward said positive terminal of said input port.

14. The dual active clamp forward converter of claim 1 wherein the series combination of the first switch means and the first capacitor of said first converter is coupled in parallel with the primary winding of said first converter.

15. The dual active clamp forward converter of claim 1 wherein the series combination of the first switch means and the first capacitor of said first converter is coupled in parallel with the secondary winding of said first converter.

16. The dual active clamp forward converter of claim 1 wherein the series combination of the first switch means and the first capacitor of said first converter is coupled in parallel with the primary switch means of said first converter.

17. The dual active clamp forward converter of claim 1 wherein said dual active clamp converter further comprises a second capacitor coupled in parallel with said output port, and wherein each said converter further comprises:
- a choke inductor coupled in series with said second capacitor, the series combination of said choke inductor and said second capacitor being coupled in parallel with the series combination of the second switch means of said converter and the secondary winding of said converter; and
- a rectifier coupled in parallel with said series combination of said choke inductor and said second capacitor, said rectifier for coupling current from said choke inductor to said output port when the second switch means of said converter is open.

18. The dual active clamp forward converter of claim 1 wherein said means for operating the primary switch means and the first switch means of said first converter comprises means for generating a first control signal for controlling the operation of the primary switch means of said first converter and a second control signal for controlling the operation of the first switch means of said first converter, wherein said means for operating the second switch means of said first converter comprises means for generating a third control signal for controlling the operation of the second switch means of said first converter, each of said control signals having a first state for directing its respective switch to close and a second state for directing its respective switch to open, wherein said first and second control signals are generated such that only one of said first and second control signals is in its respective said first state at any given time, and wherein said third control signal enters its said first state a predetermined time duration after said first control signal enters its said first state and enters its said second state a predetermined time duration after said first control signal enters its said second state.

19. The dual active forward converter of claim 1 wherein said means for operating the second switch means of said first converter comprises:
- detection means for detecting the voltage across the secondary winding of said first converter and for generating a first signal having a first state when the voltage across said secondary winding is positive and a second state when the voltage across said secondary winding is negative;
- delay generation means responsive to said first signal for generating a switch control signal to control the second switch means of said first converter, said switch control signal having a first state for directing said second switch means to close and a second state for directing said second switch means to open, said switch control signal entering said first state a first predetermined time duration after said first signal enters its first state and entering said second state a second predetermined time duration after said first signal enters its second state; and
- coupling means for coupling said switch control signal to the second switch means of said first converter.

20. The dual active claim forward converter of claim 19 wherein said first predetermined time duration is longer than said second predetermined time duration.

21. The dual active clamp forward converter of claim 19 wherein said detection means comprises a series combination of a resistor and a Zener diode, said Zener diode having an anode terminal and a cathode terminal, said resistor having a first terminal and a second terminal coupled to said cathode terminal of said Zener diode, said series combination coupled across the secondary winding of said first converter such that a positive voltage is produced at said cathode terminal of said Zener diode when said secondary winding provides current to said load, said first signal being provided at said cathode terminal of said Zener diode.

22. The dual active clamp forward converter of claim 21 wherein said detection means further comprises a rectifier coupled in parallel with said Zener diode, said rectifier having a anode terminal connected to said anode terminal of said Zener diode and a cathode terminal connected to the cathode terminal of said Zener diode.

23. The dual active clamp forward converter of claim 19 wherein said delay generation means comprises:
- a first inverter having an input coupled to said first signal and an output, said output having a logic high state and a logic low state;
- a second inverter having an input coupled to said output of said first inverter and an output for providing said switch control signal for the second switch means of said first converter; and
- delay means for introducing a first signal propagation delay between said first and second inverters when said output of said first inverter changes from its said logic low state to its said logic high state and for introducing a second signal propagation delay between said first and second inverters when said output of said first inverter changes from its said logic high state to its said logic low state, said first and second signal propagation delays such that said switch control signal enters its said first state said first predetermined time duration after said first signal enters its first state and said switch control signal enters its said second state said second predetermined time duration after said first signal enters its second state.

24. The dual active clamp forward converter of claim 23 wherein said delay means comprises:
a rectifier having an anode terminal connected to said output of said first inverter and a cathode terminal connected to said input of said second inverter;
a capacitor having a first terminal connected to said input of said second inverter and a second terminal coupled to a fixed potential reference; and
a resistor having a first terminal connected to said input of said second inverter and a second terminal coupled to said fixed potential reference.

25. The dual active clamp forward converter of claim 19 wherein the second switch means of said first converter comprises a field effect transistor having a gate terminal, a drain terminal connected to the secondary winding of said first converter, and a source terminal coupled to said output port, and wherein said coupling means for coupling said control signal to said second switch means of said first converter comprises a coupling transformer having a first winding coupled to said control signal and a second winding having a first terminal coupled to said gate terminal of said second switch means and a second terminal coupled to said source terminal of said second switch means.

26. The dual active clamp forward converter of claim 25 wherein said coupling means for coupling said control signal to said second switch means further comprises a resistor coupled in series between said gate terminal and said second terminal of said second winding.

27. A dual active clamp forward converter comprising:
an input port for receiving a source of power and an output port for providing power to a load;
a first converter and a second converter, each said converter having a power transformer including a primary winding coupled to said input port and a secondary winding coupled to said output port, a primary switch means coupled in series between said primary winding of said power transformer and said input port, a series combination of a first switch means and a first capacitor, said series combination of said first switch means and said first capacitor coupled in parallel with one of said primary winding, said secondary winding, and said primary switch means, and a second switch means coupled in series with said secondary winding of said power transformer, said primary switch means when closed causing a first portion of energy from the source of power at said input port to be coupled through said power transformer to the load by means of said secondary winding and causing a second portion of said energy to be stored in said power transformer;
means for generating a first duty-cycle signal and a second duty-cycle signal, each of said first and second duty-cycle signals having a first state and a second state and operative to alternate in time between said first and second states, said second duty-cycle signal being phase-shifted in time by substantially 180 degrees from said first duty-cycle signal;
a first control means responsive to said first duty-cycle signal for operating the primary switch means, the first switch means, and the second switch means of said first converter, said first control means causing the primary switch means of said first converter to close substantially when said first duty-cycle signal enters its respective first state and to open substantially when said first duty-cycle signal enters its respective second state, said first control means causing the first switch means of said first converter to open substantially when said first duty-cycle signal enters its respective first state and to close substantially when said first duty-cycle signal enters its respective second state, said first control means opening the first switch means of said first converter prior to when the primary switch means of said first converter closes to create a zero-voltage switching condition on said primary switch means when said primary switch means next is caused to close, said first control means opening the second switch means of said first converter substantially when the primary switch means of said first converter opens and closing said second switch means substantially when said primary switch means closes, said second switch means being operated such that substantially no current is conducted by said secondary winding of said first converter during the interval after said first switch means is opened and before said primary switch means is closed; and
a second control means responsive to said second duty-cycle signal for operating the primary switch means, the first switch means, and the second switch means of said second converter, said second control means causing the primary switch means of said second converter to close substantially when said second duty-cycle signal enters its respective first state and to open substantially when said second duty-cycle signal enters its respective second state, said second control means causing the first switch means of said second converter to open substantially when said second duty-cycle signal enters its respective first state and to close substantially when said second duty-cycle signal enters its respective second state, said second control means opening the first switch means of said second converter prior to when the primary switch means of said second converter closes to create a zero-voltage switching condition on said primary switch means when said primary switch means next is caused to close, said second control means opening the second switch means of said second converter substantially when the primary switch means of said second converter opens and closing said second switch means substantially when said primary switch means, said second switch means being operated such that substantially no current is conducted by the secondary winding of said second converter during the interval after said first switch means is opened and before said primary switch means is closed.

28. The dual active clamp converter of claim 27 wherein said first control means opens the second switch means of said first converter after the primary switch means of said first converter opens and before the first switch means of said first converter is closed.

29. The dual active clamp converter of claim 28 wherein said second control means opens the second switch means of said second converter after the primary switch means of said second converter opens and before the first switch means of said second converter is closed.

* * * * *

UNITED STATES PATENT AND TRADEMARK OFFICE
CERTIFICATE OF CORRECTION

PATENT NO. : 5,309,344
DATED : May 3, 1994
INVENTOR(S) : David A. Smith

It is certified that error appears in the above-identified patent and that said Letters Patent is hereby corrected as shown below:

In column 3, line 28, after "prior" insert —to—.
In column 8, line 1, after "equal" insert —to—.
In column 9, line 65, after "As" insert —is—.
In column 9, line 66, after "of" insert —the—.
In column 10, line 15, after "as" insert —is—.
In column 11, line 12, delete "upon" and insert therefor —up—.
In column 13, line 68, after "resistance" insert —,—.
In column 14, line 62, after delete the second occurrence of "and".
In column 18, line 46, after "and" insert —is—.
In column 19, line 44, delete "$J_{LOUT}$" and insert therefor —$I_{OUT}$—.
In column 19, line 58, after "of" insert —the—.
In column 20, line 63, after "130" insert —,—.

In column 24, lines 61–62, delete "generally" and insert therefor —generality—.
In column 26, line 40, delete "mean" and insert therefor —means—.

In column 31, line 68, delete "delay" and insert therefor —delays—.
In column 36, line 31, delete the second occurrence of "is" and insert therefor —represents—.
In column 36, line 41, delete "realized" and insert therefor —realize—.
In column 38, line 43, delete "cycles" and insert therefor —cycle—.
In column 38, line 48, delete "have" and insert therefor —having—.
In column 38, line 51, after the second occurrence of "respective" insert —second—.
In column 40, line 2, delete "shown" and insert therefor —show—.
In column 41, line 15, delete "is" and insert therefor —in—.

UNITED STATES PATENT AND TRADEMARK OFFICE
CERTIFICATE OF CORRECTION

PATENT NO. : 5,309,344
DATED : May 3, 1994
INVENTOR(S) : David A. Smith

It is certified that error appears in the above-identified patent and that said Letters Patent is hereby corrected as shown below:

In column 41, line 39, delete "is" and insert therefor —in—.

In column 42, line 21, delete "100b" and insert therefor —100b'—.

In column 44, line 41, delete "describe" and insert therefor —described—.

In column 46, line 64, delete "Q" and insert therefor —Q/—.

In column 47, line 3, delete "Q" and insert therefor —Q/—.

In column 47, line 32, delete "Q" and insert therefor —Q/—.

In column 47, line 48, delete "Q" and insert therefor —Q/—.

In column 47, line 52, delete "inventer" and insert therefor —inverter—.

In column 47, line 53, delete "Q" and insert therefor —Q/—.

In column 49, line 6, delete "modulation" and insert therefor —modulator—.

In column 49, line 48, delete "terminal" and insert therefor —terminate—.

In column 50, line 27, after "pulse" delete ". "

In column 53, line 59, after "along" insert —with—.

In column 57, line 12, delete "intut" and insert therefor —input—.

In column 59, line 43, delete "means," and insert therefor —means closes,—.

In column 62, line 34, delete "claim" and insert therefor —clamp—.

In column 63, line 5, after "delays" insert —having values—.

UNITED STATES PATENT AND TRADEMARK OFFICE
CERTIFICATE OF CORRECTION

PATENT NO. : 5,309,344
DATED : May 3, 1994
INVENTOR(S) : David A. Smith

It is certified that error appears in the above-indentified patent and that said Letters Patent is hereby corrected as shown below:

Column 64, line 60, delete "means," and insert --means-- closes,--.

Signed and Sealed this

Third Day of January, 1995

Attest:

BRUCE LEHMAN

*Attesting Officer*    *Commissioner of Patents and Trademarks*